US011129018B2

(12) United States Patent
Kim et al.

(10) Patent No.: US 11,129,018 B2
(45) Date of Patent: Sep. 21, 2021

(54) PAYMENT MEANS OPERATION SUPPORTING METHOD AND ELECTRONIC DEVICE FOR SUPPORTING THE SAME

(71) Applicant: Samsung Electronics Co., Ltd., Suwon-si (KR)

(72) Inventors: Ki Bong Kim, Daegu (KR); Seon Sook Lee, Gumi-si (KR); Myung Hwa Jun, Gumi-si (KR); Beom Soo Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 536 days.

(21) Appl. No.: 15/054,808

(22) Filed: Feb. 26, 2016

(65) Prior Publication Data

US 2017/0337542 A1 Nov. 23, 2017

Related U.S. Application Data

(60) Provisional application No. 62/126,121, filed on Feb. 27, 2015.

(30) Foreign Application Priority Data

Jan. 29, 2016 (KR) .................. 10-2016-0011052

(51) Int. Cl.
*H04W 12/06* (2021.01)
*G06F 3/041* (2006.01)
(Continued)

(52) U.S. Cl.
CPC ............ *H04W 12/06* (2013.01); *G06F 3/041* (2013.01); *G06F 3/048* (2013.01); *G06K 9/00* (2013.01);
(Continued)

(58) Field of Classification Search
CPC ...... G06Q 20/02; G06Q 20/10; G06Q 20/105; H04W 12/06; G06F 3/041; G06F 3/048; G06K 9/00
(Continued)

(56) References Cited

U.S. PATENT DOCUMENTS 5,649,115 A 7/1997 Schrader et al.
5,815,657 A 9/1998 Williams et al.
(Continued)

FOREIGN PATENT DOCUMENTS

AU 2015200102 A1 2/2015
CN 1820279 A 8/2006
(Continued)

OTHER PUBLICATIONS

Reddy et al., A Practical Approach for Implementation of Public Key Infrastructure for Digital Signatures, Journal of Information Engineering and Applications, ISSN 2224-5758 (print) ISSN 2224-896X (online), vol. 1, No. 2, 2011.
(Continued)

*Primary Examiner* — James D Nigh
*Assistant Examiner* — Yin Y Choi
(74) *Attorney, Agent, or Firm* — Jefferson IP Law, LLP

(57) ABSTRACT

An electronic device is provided. The electronic device includes a display and a processor. The processor transmits registration information relating to a user's payment means to an external electronic device, receives state information on the payment means, which is generated by the external electronic device using the registration information, from the external electronic device, and displays an indication corresponding to the state information in relation to an object for representing the payment means, through the display.

21 Claims, 42 Drawing Sheets

(51) Int. Cl.

| | | |
|---|---|---|
| *G06Q 20/22* | (2012.01) | |
| *G06Q 20/32* | (2012.01) | |
| *G06Q 20/40* | (2012.01) | |
| *G06K 9/00* | (2006.01) | |
| *G06F 3/048* | (2013.01) | |
| *G06Q 20/16* | (2012.01) | |
| *G06Q 20/38* | (2012.01) | |
| *G06Q 20/36* | (2012.01) | |
| *G06Q 20/02* | (2012.01) | |
| *G06Q 20/10* | (2012.01) | |
| *G06Q 40/02* | (2012.01) | |
| *G06Q 20/34* | (2012.01) | |
| *G06Q 20/20* | (2012.01) | |

(52) U.S. Cl.
CPC ............ *G06Q 20/02* (2013.01); *G06Q 20/10* (2013.01); *G06Q 20/105* (2013.01); *G06Q 20/1085* (2013.01); *G06Q 20/16* (2013.01); *G06Q 20/204* (2013.01); *G06Q 20/206* (2013.01); *G06Q 20/227* (2013.01); *G06Q 20/32* (2013.01); *G06Q 20/3227* (2013.01); *G06Q 20/3255* (2013.01); *G06Q 20/3274* (2013.01); *G06Q 20/3276* (2013.01); *G06Q 20/3278* (2013.01); *G06Q 20/34* (2013.01); *G06Q 20/36* (2013.01); *G06Q 20/363* (2013.01); *G06Q 20/367* (2013.01); *G06Q 20/3674* (2013.01); *G06Q 20/38* (2013.01); *G06Q 20/382* (2013.01); *G06Q 20/3823* (2013.01); *G06Q 20/38215* (2013.01); *G06Q 20/4012* (2013.01); *G06Q 20/40145* (2013.01); *G06Q 40/02* (2013.01); *G06K 9/00087* (2013.01)

(58) Field of Classification Search
USPC .......................................................... 705/72
See application file for complete search history.

(56) References Cited

U.S. PATENT DOCUMENTS

| | | |
|---|---|---|
| 6,357,006 B1 | 3/2002 | Pham et al. |
| 6,675,153 B1 | 1/2004 | Cook et al. |
| 7,610,492 B2 | 10/2009 | Awatsu et al. |
| 7,715,593 B1 | 5/2010 | Adams et al. |
| 7,743,254 B2 | 6/2010 | Sauve et al. |
| 7,767,430 B2 | 8/2010 | Neeser et al. |
| 7,865,577 B1 | 1/2011 | ONeil et al. |
| 7,982,615 B2 | 7/2011 | Kennedy |
| 8,055,545 B2 | 11/2011 | Mages et al. |
| 8,126,782 B1 | 2/2012 | Zhu et al. |
| 8,144,941 B2 | 3/2012 | Adams et al. |
| 8,299,928 B2 | 10/2012 | Kennedy |
| 8,452,882 B2 | 5/2013 | Schneider |
| 8,467,768 B2 | 6/2013 | Mahaffey et al. |
| 8,621,075 B2 | 12/2013 | Luna |
| 8,628,012 B1 | 1/2014 | Wallner |
| 8,670,748 B2 | 3/2014 | Slack et al. |
| 8,676,709 B2 | 3/2014 | Kunz et al. |
| 8,682,400 B2 | 3/2014 | Mahaffey et al. |
| 8,682,802 B1 | 3/2014 | Kannanari |
| 8,700,729 B2 | 4/2014 | Dua |
| 8,718,602 B2 | 5/2014 | Wu et al. |
| 8,732,451 B2 | 5/2014 | Viswanathan et al. |
| 8,744,403 B2 | 6/2014 | Wu et al. |
| 8,774,788 B2 | 7/2014 | Mahaffey et al. |
| 8,775,757 B2 | 7/2014 | Polzin et al. |
| 8,814,046 B1 | 8/2014 | Wallner |
| 8,825,007 B2 | 9/2014 | Mahaffey et al. |
| 8,831,677 B2 | 9/2014 | Villa-Real |
| 8,843,125 B2 | 9/2014 | Kwon et al. |
| 8,843,749 B2 | 9/2014 | Sauve et al. |
| 8,862,504 B2 | 10/2014 | Sobek |
| 8,929,874 B2 | 1/2015 | Mahaffey et al. |
| 8,954,122 B2 | 2/2015 | Wilmhoff et al. |
| 8,954,515 B2 | 2/2015 | Guo et al. |
| 8,966,268 B2 | 2/2015 | Marien |
| 8,972,298 B2 | 3/2015 | Kunz et al. |
| 9,027,079 B2 | 5/2015 | Comay et al. |
| 9,055,314 B2 | 6/2015 | Yin et al. |
| 9,077,543 B2 | 7/2015 | Luft et al. |
| 9,092,772 B2 | 7/2015 | Fernandez et al. |
| 9,100,873 B2 | 8/2015 | Luna et al. |
| 9,100,925 B2 | 8/2015 | Mahaffey et al. |
| 9,112,703 B2 | 8/2015 | Wood et al. |
| 9,118,464 B2 | 8/2015 | Nix |
| 9,053,471 B2 | 9/2015 | Mages et al. |
| 9,130,910 B1 | 9/2015 | Logue |
| 9,135,424 B2 | 9/2015 | Taveau et al. |
| 9,161,196 B2 | 10/2015 | Ballantyne et al. |
| 9,161,218 B2 | 10/2015 | Bae et al. |
| 9,161,225 B2 | 10/2015 | Pecen et al. |
| 9,166,953 B2 | 10/2015 | Luukkala et al. |
| 9,167,428 B2 | 10/2015 | Buntinx |
| 9,167,550 B2 | 10/2015 | Mahaffey et al. |
| 9,179,434 B2 | 11/2015 | Mahaffey et al. |
| 9,191,813 B2 | 11/2015 | Lim et al. |
| 9,209,851 B1 | 12/2015 | Wilmhoff et al. |
| 9,232,491 B2 | 1/2016 | Mahaffey |
| 9,235,839 B2 | 1/2016 | Dua |
| 9,408,075 B2 | 8/2016 | Wang et al. |
| 9,582,598 B2 | 2/2017 | Kalgi |
| 9,712,632 B2 | 7/2017 | Chen |
| 9,723,482 B2 | 8/2017 | Wang et al. |
| 9,887,983 B2 | 2/2018 | Lindemann et al. |
| 9,934,500 B2 | 4/2018 | Guyot |
| 9,965,137 B2 | 5/2018 | Yun et al. |
| 9,979,776 B2 | 5/2018 | Slack et al. |
| 10,121,144 B2 | 11/2018 | Khan |
| 10,154,084 B2 | 12/2018 | Kalgi |
| 10,419,529 B2 | 9/2019 | Kalgi |
| 10,621,576 B1 | 4/2020 | Kannanari |
| 10,678,908 B2 | 6/2020 | Grobman et al. |
| 2002/0174068 A1 | 11/2002 | Marsot |
| 2002/0186845 A1 | 12/2002 | Dutta et al. |
| 2005/0039054 A1 | 2/2005 | Satoh et al. |
| 2005/0138384 A1 | 6/2005 | Brickell et al. |
| 2005/0154886 A1 | 7/2005 | Birk et al. |
| 2006/0080550 A1 | 4/2006 | Awatsu et al. |
| 2006/0165060 A1 | 7/2006 | Dua |
| 2006/0200410 A1 | 9/2006 | Kelley et al. |
| 2006/0209016 A1 | 9/2006 | Fox et al. |
| 2006/0218403 A1 | 9/2006 | Sauve et al. |
| 2008/0155268 A1 | 6/2008 | Jazayeri et al. |
| 2008/0182592 A1 | 7/2008 | Cha et al. |
| 2008/0320308 A1 | 12/2008 | Kostiainen et al. |
| 2009/0114716 A1 | 5/2009 | Ramachandran |
| 2009/0119184 A1 | 5/2009 | Mages et al. |
| 2009/0171836 A1 | 7/2009 | Olliphant et al. |
| 2009/0307132 A1 | 12/2009 | Phillips |
| 2010/0082991 A1 | 4/2010 | Baldwin et al. |
| 2010/0088188 A1 | 4/2010 | Kumar et al. |
| 2010/0117794 A1 | 5/2010 | Adams et al. |
| 2010/0138912 A1 | 6/2010 | Bauchot et al. |
| 2010/0156627 A1 | 6/2010 | Kennedy |
| 2010/0210240 A1 | 8/2010 | Mahaffey et al. |
| 2010/0216429 A1 | 8/2010 | Mahajan |
| 2010/0217989 A1 | 8/2010 | Sauve et al. |
| 2010/0242110 A1 | 9/2010 | Louch et al. |
| 2010/0275259 A1 | 10/2010 | Adams et al. |
| 2010/0279675 A1 | 11/2010 | Slack et al. |
| 2011/0082737 A1 | 4/2011 | Crowe et al. |
| 2011/0099112 A1 | 4/2011 | Mages et al. |
| 2011/0145932 A1 | 6/2011 | Nerger et al. |
| 2011/0214158 A1 | 9/2011 | Pasquero et al. |
| 2011/0271301 A1 | 11/2011 | Kennedy |
| 2012/0024947 A1 | 2/2012 | Naelon |
| 2012/0074217 A1 | 3/2012 | Block et al. |
| 2012/0101938 A1 | 4/2012 | Kasower |
| 2012/0101939 A1 | 4/2012 | Kasower |
| 2012/0101951 A1 | 4/2012 | Li et al. |

(56) References Cited

U.S. PATENT DOCUMENTS

| | | |
|---|---|---|
| 2012/0149331 A1 | 6/2012 | Wu et al. |
| 2012/0149332 A1 | 6/2012 | Wu et al. |
| 2012/0166795 A1 | 6/2012 | Wood et al. |
| 2012/0171992 A1 | 7/2012 | Cheong et al. |
| 2012/0172026 A1* | 7/2012 | Kwon et al. |
| 2012/0172089 A1 | 7/2012 | Bae et al. |
| 2012/0174189 A1 | 7/2012 | Lim et al. |
| 2012/0221422 A1 | 8/2012 | Sobek |
| 2012/0231844 A1 | 9/2012 | Coppinger |
| 2012/0254290 A1 | 10/2012 | Naaman |
| 2012/0254624 A1 | 10/2012 | Malkhasyan et al. |
| 2012/0290449 A1 | 11/2012 | Mullen et al. |
| 2012/0316992 A1 | 12/2012 | Oborne |
| 2012/0317370 A1 | 12/2012 | Luna |
| 2013/0006756 A1 | 1/2013 | Heo |
| 2013/0013480 A1 | 1/2013 | Venter |
| 2013/0042111 A1 | 2/2013 | Fiske |
| 2013/0124349 A1 | 5/2013 | Khan et al. |
| 2013/0124420 A1 | 5/2013 | Duri et al. |
| 2013/0139230 A1 | 5/2013 | Koh et al. |
| 2013/0141567 A1 | 6/2013 | Walker et al. |
| 2013/0159186 A1 | 6/2013 | Brudnicki et al. |
| 2013/0208893 A1* | 8/2013 | Shablygin et al. |
| 2013/0226812 A1 | 8/2013 | Landrok et al. |
| 2013/0238455 A1 | 9/2013 | Laracey |
| 2013/0294250 A1 | 11/2013 | Berelejis et al. |
| 2013/0314214 A1 | 11/2013 | Leica et al. |
| 2013/0317928 A1 | 11/2013 | Laracey |
| 2013/0325712 A1 | 12/2013 | Park et al. |
| 2013/0332740 A1 | 12/2013 | Sauve et al. |
| 2013/0339122 A1 | 12/2013 | Truitt et al. |
| 2013/0340064 A1 | 12/2013 | Kostiainen et al. |
| 2013/0346302 A1* | 12/2013 | Purves et al. |
| 2013/0347064 A1 | 12/2013 | Aissi |
| 2014/0007215 A1 | 1/2014 | Romano et al. |
| 2014/0025444 A1 | 1/2014 | Willis |
| 2014/0025520 A1 | 1/2014 | Mardikar et al. |
| 2014/0040125 A1 | 2/2014 | Kunz et al. |
| 2014/0040126 A1 | 2/2014 | Andrews et al. |
| 2014/0040130 A1 | 2/2014 | Kunz et al. |
| 2014/0040131 A1 | 2/2014 | Andrews et al. |
| 2014/0058935 A1 | 2/2014 | Mijares |
| 2014/0068744 A1 | 3/2014 | Bran et al. |
| 2014/0073270 A1 | 3/2014 | Chou et al. |
| 2014/0075349 A1 | 3/2014 | Yun et al. |
| 2014/0095286 A1 | 4/2014 | Drewry et al. |
| 2014/0095865 A1 | 4/2014 | Yerra et al. |
| 2014/0101034 A1 | 4/2014 | Tanner et al. |
| 2014/0101048 A1 | 4/2014 | Gardiner et al. |
| 2014/0114777 A1 | 4/2014 | Guyot |
| 2014/0114860 A1 | 4/2014 | Ozvat et al. |
| 2014/0115125 A1 | 4/2014 | Chen |
| 2014/0122328 A1 | 5/2014 | Grigg |
| 2014/0122873 A1 | 5/2014 | Deutsch et al. |
| 2014/0138435 A1 | 5/2014 | Khalid |
| 2014/0149198 A1 | 5/2014 | Kim et al. |
| 2014/0149285 A1* | 5/2014 | De et al. |
| 2014/0149292 A1 | 5/2014 | Kunz et al. |
| 2014/0162598 A1 | 6/2014 | Villa-Real |
| 2014/0172724 A1 | 6/2014 | Dua |
| 2014/0180787 A1 | 6/2014 | Sarkissian |
| 2014/0180931 A1 | 6/2014 | Lie et al. |
| 2014/0181962 A1 | 6/2014 | Seo et al. |
| 2014/0187207 A1 | 7/2014 | Slack et al. |
| 2014/0191028 A1 | 7/2014 | Laracey |
| 2014/0222663 A1 | 8/2014 | Park et al. |
| 2014/0222682 A1 | 8/2014 | Dua |
| 2014/0222688 A1 | 8/2014 | Haggerty et al. |
| 2014/0244494 A1 | 8/2014 | Davis et al. |
| 2014/0244496 A1 | 8/2014 | Langus et al. |
| 2014/0244514 A1 | 8/2014 | Rodriguez et al. |
| 2014/0258110 A1 | 9/2014 | Davis et al. |
| 2014/0258132 A1 | 9/2014 | Swamy et al. |
| 2014/0269946 A1 | 9/2014 | Wallner |
| 2014/0279437 A1 | 9/2014 | Lee et al. |
| 2014/0281500 A1 | 9/2014 | Ignatchenko |
| 2014/0282878 A1 | 9/2014 | Ignatchenko et al. |
| 2014/0283006 A1 | 9/2014 | Korkishko et al. |
| 2014/0289130 A1 | 9/2014 | Savolainen et al. |
| 2014/0297438 A1 | 10/2014 | Dua |
| 2014/0297539 A1 | 10/2014 | Swamy et al. |
| 2014/0297540 A1 | 10/2014 | Swamy et al. |
| 2014/0317686 A1 | 10/2014 | Vetillard |
| 2014/0329500 A1 | 11/2014 | Wang et al. |
| 2014/0337227 A1 | 11/2014 | Dua |
| 2014/0358794 A1 | 12/2014 | Finley |
| 2014/0364099 A1 | 12/2014 | Pai et al. |
| 2014/0370851 A1 | 12/2014 | Wang et al. |
| 2014/0372293 A1 | 12/2014 | Leung et al. |
| 2014/0372299 A1 | 12/2014 | Singh et al. |
| 2014/0372300 A1 | 12/2014 | Blythe |
| 2015/0004934 A1 | 1/2015 | Qian et al. |
| 2015/0006392 A1 | 1/2015 | Brand et al. |
| 2015/0006404 A1 | 1/2015 | Beidl et al. |
| 2015/0011273 A1 | 1/2015 | Wilmhoff et al. |
| 2015/0012427 A1 | 1/2015 | Phillips et al. |
| 2015/0012439 A1 | 1/2015 | Sakurai et al. |
| 2015/0019944 A1 | 1/2015 | Kalgi |
| 2015/0020160 A1 | 1/2015 | Goncalves et al. |
| 2015/0026040 A1 | 1/2015 | Kasower |
| 2015/0032524 A1 | 1/2015 | Fisher |
| 2015/0032635 A1 | 1/2015 | Guise |
| 2015/0046324 A1 | 2/2015 | De La Cropte De Chanterac et al. |
| 2015/0046339 A1 | 2/2015 | Wong et al. |
| 2015/0058227 A1 | 2/2015 | Dua |
| 2015/0077228 A1 | 3/2015 | Dua |
| 2015/0081559 A1 | 3/2015 | Dua |
| 2015/0088750 A1 | 3/2015 | Dua |
| 2015/0095174 A1 | 4/2015 | Dua |
| 2015/0095175 A1 | 4/2015 | Dua |
| 2015/0095235 A1 | 4/2015 | Dua |
| 2015/0100488 A1 | 4/2015 | Dua |
| 2015/0100499 A1 | 4/2015 | Dua |
| 2015/0102047 A1* | 4/2015 | Tsou et al. |
| 2015/0112868 A1 | 4/2015 | Swamy et al. |
| 2015/0121068 A1 | 4/2015 | Lindemann et al. |
| 2015/0127549 A1 | 5/2015 | Khan |
| 2015/0134439 A1 | 5/2015 | Maxwell et al. |
| 2015/0161386 A1 | 6/2015 | Gupta et al. |
| 2015/0163222 A1 | 6/2015 | Pal |
| 2015/0178732 A1 | 6/2015 | Laracey |
| 2015/0199058 A1* | 7/2015 | Zhang |
| 2015/0200774 A1 | 7/2015 | Le Saint |
| 2015/0201322 A1 | 7/2015 | Kim et al. |
| 2015/0220932 A1 | 8/2015 | Mardikar et al. |
| 2015/0248671 A1 | 9/2015 | Mages et al. |
| 2015/0254636 A1 | 9/2015 | Yoon et al. |
| 2015/0264024 A1 | 9/2015 | Frank |
| 2015/0278796 A1 | 10/2015 | Jiang et al. |
| 2015/0287018 A1 | 10/2015 | Iqbal et al. |
| 2015/0302396 A1 | 10/2015 | Jeon |
| 2015/0302413 A1 | 10/2015 | Dua |
| 2015/0339667 A1 | 11/2015 | Dua |
| 2015/0371234 A1 | 12/2015 | Huang et al. |
| 2015/0381634 A1 | 12/2015 | Lal et al. |
| 2016/0134660 A1 | 5/2016 | Ponsini et al. |
| 2016/0162879 A1 | 6/2016 | Mu |
| 2017/0039368 A1 | 2/2017 | Grobman et al. |
| 2017/0039561 A1 | 2/2017 | Finley |
| 2017/0039562 A1 | 2/2017 | Finley |
| 2017/0134479 A1 | 5/2017 | Kalgi |
| 2017/0357960 A1 | 12/2017 | Quentin |
| 2018/0204197 A1 | 7/2018 | Guyot |
| 2018/0234410 A1 | 8/2018 | Lindemann et al. |
| 2018/0337974 A1 | 11/2018 | Slack et al. |
| 2019/0075156 A1 | 3/2019 | Kalgi |
| 2019/0139040 A1 | 5/2019 | Khan |

FOREIGN PATENT DOCUMENTS

| | | |
|---|---|---|
| CN | 101034449 A | 9/2007 |
| CN | 101996446 A | 3/2011 |
| CN | 102103683 A | 6/2011 |

(56) References Cited

FOREIGN PATENT DOCUMENTS

| | | |
|---|---|---|
| CN | 102685692 A | 9/2012 |
| CN | 103020825 A | 4/2013 |
| CN | 103188653 A | 7/2013 |
| CN | 103220637 A | 7/2013 |
| CN | 103337023 A | 10/2013 |
| CN | 103426084 A | 12/2013 |
| CN | 103500404 A | 1/2014 |
| CN | 103765454 A | 4/2014 |
| CN | 103793815 A | 5/2014 |
| CN | 103942678 A | 7/2014 |
| CN | 104050559 A | 9/2014 |
| CN | 104200362 A | 12/2014 |
| CN | 104252675 A | 12/2014 |
| CN | 104320779 A | 1/2015 |
| CN | 104331796 A | 2/2015 |
| CN | 105393259 A | 3/2016 |
| EP | 0 949 595 A2 | 10/1999 |
| EP | 1 176 844 A3 | 5/2002 |
| EP | 2 515 472 A1 | 10/2012 |
| JP | 2002-278939 A | 9/2002 |
| JP | 2005-62556 A | 3/2005 |
| JP | 2010-224807 A | 10/2010 |
| JP | 2014-128028 A | 7/2014 |
| KR | 2003-0009830 A | 2/2003 |
| KR | 10-2011-0032735 A | 3/2011 |
| KR | 10-20110019887 A | 3/2011 |
| KR | 10-2011-0112594 A | 10/2011 |
| KR | 10-2011-0137033 A | 12/2011 |
| KR | 10-2012-0046376 A | 5/2012 |
| KR | 10-2012-0094544 A | 8/2012 |
| KR | 10-2013-0083029 A | 7/2013 |
| KR | 10-2013-0089902 A | 8/2013 |
| KR | 10-2013-0125344 A | 11/2013 |
| KR | 10-2013-0142864 A | 12/2013 |
| KR | 10-2014-0068443 A | 6/2014 |
| KR | 10-2014-0079960 A | 6/2014 |
| KR | 10-2014-0096208 A | 8/2014 |
| KR | 10-2014-0112785 A | 9/2014 |
| KR | 10-2014-0117105 A | 10/2014 |
| KR | 10-2014-0133240 A | 11/2014 |
| KR | 10-2015-0019956 A | 2/2015 |
| KR | 10-2015-0097325 A | 8/2015 |
| KR | 10-2015-0104700 A | 9/2015 |
| KR | 10-2015-0141321 A | 12/2015 |
| WO | 2012/068094 A1 | 5/2012 |
| WO | WO2013166507 A1 * | 5/2012 |
| WO | 2012/091349 A2 | 7/2012 |
| WO | 2013/166185 A1 | 11/2013 |
| WO | 2013/166507 A1 | 11/2013 |
| WO | 2014/189569 A1 | 11/2014 |
| WO | 2015/004677 A1 | 1/2015 |
| WO | 2015/004803 A1 | 1/2015 |

OTHER PUBLICATIONS

About Apple Pay in the US, Apple Support, https://support.apple.com/en-US/HT201469, Oct. 22, 2015.
Wallner, Stronger Security and Mobile Payments—Dramatically Faster and Cheaper to Implement, LoopPay White Paper, 2014 LoopPay, Inc.
Ibrahim, Receiver-deniable Public-Key Encryption, International Journal of Network Security, vol. 8, No. 2, pp. 159-165, Mar. 2009.
U.S. Appl. No. 15/042,671.
U.S. Appl. No. 15/054,601.
U.S. Appl. No. 15/055,026.
U.S. Appl. No. 15/054,949.
U.S. Appl. No. 15/054,642.
U.S. Appl. No. 15/056,113.
U.S. Appl. No. 15/056,827.
European Office Action dated Feb. 18, 2019, issued in European Patent Application No. 16755950.9.
Chinese Office Action dated Mar. 22, 2019, issued in Chinese Patent Application No. 201610084771.2.
U.S. Non-final Office Action dated Jan. 28, 2019, issued in U.S. Appl. No. 15/055,026.
U.S. Non-final Office Action dated Apr. 16, 2019, issued in U.S. Appl. No. 15/042,671.
U.S. Office Action dated Dec. 3, 2018 for corresponding U.S. Appl. No. 15/056,827.
European Search Report dated Oct. 25, 2018, issued in European Patent Application No. 16755947.5.
U.S. Non-final Office Action dated Apr. 26, 2019, issued in U.S. Appl. No. 15/054,949.
U.S. Non-final Office Action dated May 14, 2019, 2018, issued in U.S. Appl. No. 15/054,642.
U.S. Final Office Action dated Jun. 7, 2019, issued in U.S. Appl. No. 15/056,827.
U.S. Final Office Action dated Oct. 17, 2019, issued in U.S. Appl. No. 15/054,642.
Chinese Office Action dated Sep. 11, 2019, issued in Chinese Patent Application No. 201610084771.2.
European Summons to attend oral proceedings dated Apr. 22, 2020, issued in European Patent Application No. 16 157 728.3.
U.S. Non-final Office Action dated Feb. 21, 2020, issued in U.S. Appl. No. 15/056,113.
Chinese Office Action dated May 11, 2020, issued in Chinese Patent Application No. 201610113423.3.
U.S. Non-final Office Action dated May 12, 2020, issued in U.S. Appl. No. 15/054,642.
U.S. Final Office Action dated Aug. 14, 2020, issued in U.S. Appl. No. 15/042,671.
U.S. Non-final Office Action dated Nov. 5, 2020, issued in U.S. Appl. No. 15/054,642.
Guowei et al., Analysis of the Trusted Environment of Mobile Intelligent Terminals, Dec. 2012, China Academic Journal Electronic Publishing House.
Chinese Office Action dated Feb. 10, 2021, issued in Chinese Patent Application No. 201680012550.2.
Chinese Office Action dated Mar. 1, 2021, issued in Chinese Patent Application No. 201680012319.3.
U.S. Non-final Office Action dated Mar. 31, 2021, issued in U.S. Appl. No. 15/056,113.
Chinese Office Action dated Nov. 25, 2020, issued in Chinese Patent Application No. 201680012353.0.
Chinese Office Action dated Dec. 1, 2020, issued in Chinese Patent Application No. 201680012545.1.
Indian Office Action dated Dec. 8, 2020, issued in Indian Patent Application No. 201717032092.
U.S. Final Office Action dated Jun. 23, 2021, issued in U.S. Appl. No. 15/056,113.

* cited by examiner

PAYMENT MEANS OPERATION SUPPORTING METHOD AND ELECTRONIC DEVICE FOR SUPPORTING THE SAME

CROSS-REFERENCE TO RELATED APPLICATION(S)

This application claims the benefit under 35 U.S.C. § 119(e) of a U.S. Provisional application filed on Feb. 27, 2015 in the U.S. Patent and Trademark Office and assigned Ser. No. 62/126,121, and under 35 U.S.C. § 119(a) of a Korean patent application filed on Jan. 29, 2016 in the Korean Intellectual Property Office and assigned Serial number 10-2016-0011052, the entire disclosure of each of which is hereby incorporated by reference.

TECHNICAL FIELD

The present disclosure relates to a payment means operation support.

BACKGROUND

In general, an electronic device supports various functions. For example, an electronic device supports a corresponding function by displaying content or executing an application with a specific function. At least one such function is a payment function.

The above information is presented as background information only, to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages, and to provide at least the advantages described below. Accordingly, an aspect of the present disclosure is to provide a payment means information operation supporting method for performing an operation process of payment means information easily and intuitively by using an electronic device and an electronic device supporting the same.

In accordance with an aspect of the present disclosure, an electronic device is provided. The electronic device includes a display and a processor. The processor transmits registration information relating to a user's payment means to an external electronic device, receives state information on the payment means, which is generated by the external electronic device using the registration information, from the external electronic device, and displays an indication corresponding to the state information in relation to an object for representing the payment means, through the display.

In accordance with another aspect of the present disclosure, a payment means operation supporting method is provided. The method includes transmitting registration information relating to a user's payment means to an external electronic device, receiving state information of a token for the payment means, which is generated by the external electronic device using the registration information, from the external electronic device, and displaying an indication corresponding to the state information in relation to an object for representing the payment means, through the display.

In accordance with another aspect of the present disclosure, a computer readable recording medium for storing data relating to computing operations is provided. The computer readable recording medium includes a memory to store at least one instruction that when executed by a processor, directs the processor to transmit registration information relating to a payment means to an external electronic device, receive state information of a token for the payment means from the external electronic device, which is generated through the external electronic device by using the registration information, and display an indication corresponding to the state information of the token through a display in relation to an object for representing the payment means.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
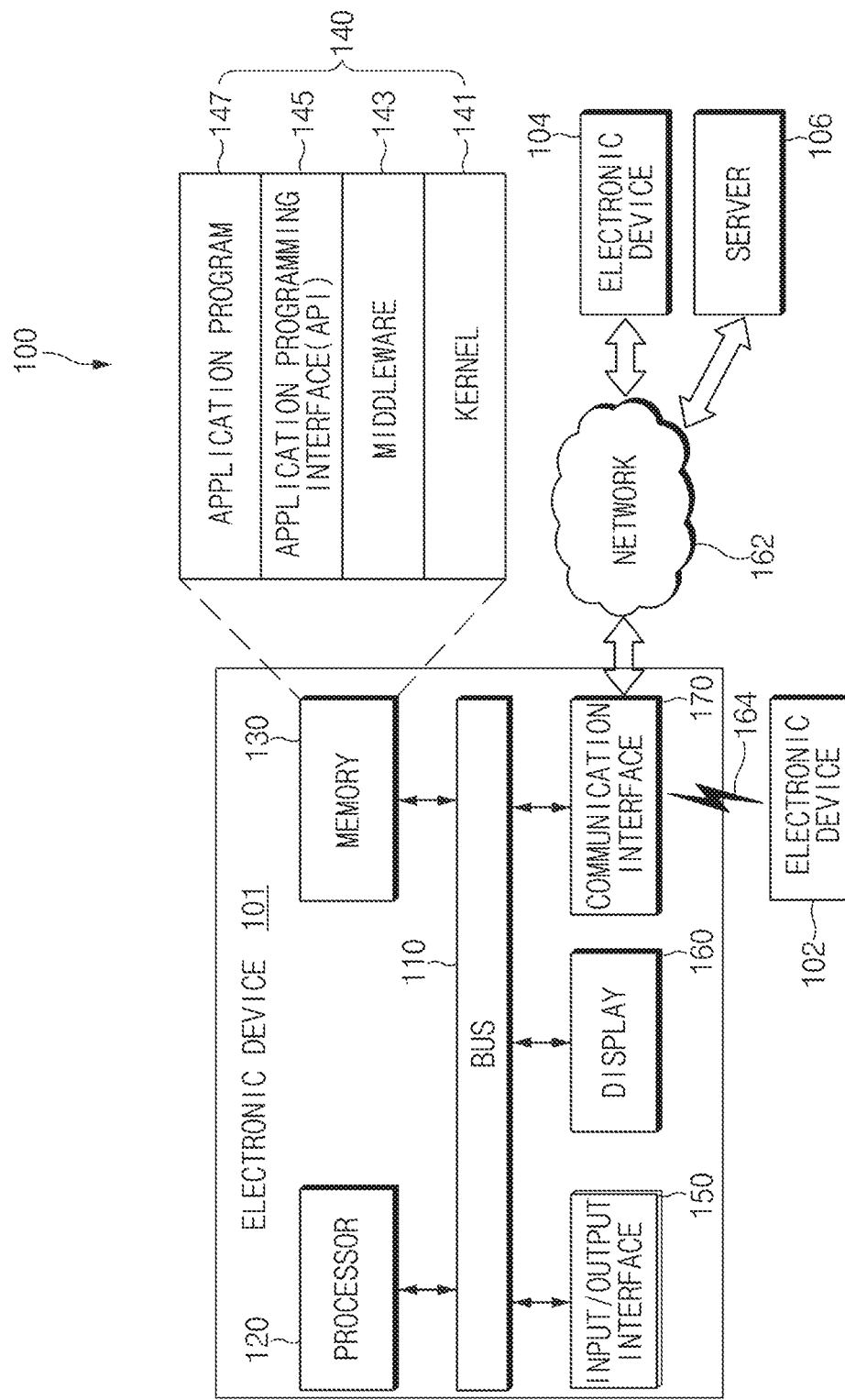
FIG. 1 is a block diagram illustrating a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements, but does not exclude other functions, operations or elements.

For instance, the expression "A or B", or "at least one of A or/and B" may indicate include A, B, or both A and B. The expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. The expressions may be used to distinguish one element from another element. For instance, "a first user device" and "a second user device" may indicate different users regardless of the order or the importance. A first component may be referred to as a second component and vice versa without departing from the scope of the present disclosure.

In various embodiments of the present disclosure, it will be understood that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor (for example, a central processing unit (CPU) or application processor) for performing corresponding operations by executing at least one software program stored in a memory device.

Terms used in various embodiments of the present disclosure are used to describe specific embodiments of the present disclosure, and are not intended to limit the scope of other embodiments. The terms of a singular form may include plural forms unless they have a clearly different meaning in the context. Unless otherwise indicated herein, all the terms used herein, which include technical or scientific terms, may have the same meaning that is generally understood by a person skilled in the art. Terms defined in a dictionary should be considered to have the same meaning as the contextual meaning of the related art, and, unless clearly defined herein, should not be understood abnormally or as having an excessively formal meaning. In any cases, even the terms defined in this specification should not be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop personal computers (PCs), laptop personal computers (PCs), netbook computers, workstation server, personal digital assistants (PDAs), portable multimedia player (PMPs), moving picture experts group phase 1 or phase 2 (MPEG-1 or MPEG-2) audio layer 3 (MP3) players, mobile medical devices, cameras, and wearable devices (for example, smart glasses, head-mounted-devices (HMOs), electronic apparel, electronic bracelets, electronic necklaces, electronic appcessories, electronic tattoos, smart mirrors, and smart watches).

According to some embodiments of the present disclosure, an electronic device may be smart home appliances. Smart home appliances may include at least one of, for example, televisions (TV), digital versatile disk (DVD) players, audio players, refrigerators, air conditioners, cleaners, ovens, microwave ovens, washing machines, air cleaners, set-top boxes, home automation control panels, security control panels, TV boxes (e.g., Samsung HomeSync™, Apple TV™ or Google TV™), game consoles (for example, Xbox™ and PlayStation™), electronic dictionaries, electronic keys, camcorders, and electronic picture frames.

According to some embodiments of the present disclosure, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller's machines (ATMs), or stores' point of sales (POS) or internet of things (for example, bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. An electronic device according to an embodiment of the present disclosure is not limited to the above-mentioned devices, and may include a new kind of an electronic device according to the development of technology in the related field.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1 is a block diagram illustrating a network environment according to various embodiments of the present disclosure.

Referring to FIG. 1, a network environment 100 can include an electronic device 101, 102, and 104, and a server 106 connected to each other through a network 162 or a short-range communication 164. The electronic device 101 may include a bus 110, a processor 120, a memory 130, an input/output interface 150, a display 160, and a communication interface 170. According to an embodiment of the present disclosure, the electronic device 101 may omit at least one of the components or may additionally include a different component.

The bus 110, for example, may include a circuit for connecting the components 110 to 170 to each other and delivering a communication (for example, control message and/or data) between the components 110 to 170.

The processor 120 may include at least one of a CPU, an application processor (AP), and a communication processor (CP). The processor 120, for example, may execute calculation or data processing for control and/or communication of at least one component of the electronic device 101.

The memory 130 may include volatile and/or nonvolatile memory. The memory 130, for example, may store instructions or data relating to at least one component of the electronic device 101. According to an embodiment of the present disclosure, the memory 130 may store software and/or programs 140. The program 140 may include a kernel 141, a middleware 143, an application programming interface (API) 145, and/or an application program (or an app or application) 147. At least part of the kernel 141, middleware 143, and API 145 may be an operating system (OS).

The kernel 141, for example, may control or manage system resources (for example, the bus 110, processor 120, memory 130, and so forth) used for performing operations or functions implemented in other programs (for example, the middleware 143, API 145, or application program 147). Additionally, the kernel 141 may provide an interface for controlling or managing system resources by accessing an individual component of the electronic device 101 from the middleware 143, API 145, or application program 147.

The middleware 143, for example, may serve an intermediary role for exchanging data as the API 145 or the application program 147 communicates with the kernel 141.

Additionally, the middleware 143 may process at least one job request received from the application program 147 according to a priority. For example, the middleware 143 may assign to at least one application program 147 a priority for using a system resource (for example, the bus 110, processor 120, or memory 130) of the electronic device 101. The middleware 143 may perform scheduling or load balancing on the at least one job request by processing the at least one job request according to the priority assigned to the at least one job request.

The API 145, as an interface for allowing the application 147 to control a function provided from the kernel 141 or the middleware 143, may include at least one interface or function (for example, an instruction) for file control, window control, image processing, or character control.

The input/output interface 150, for example, may serve as an interface for delivering instructions or data inputted from a user or another external device to another component(s) of the electronic device 101. Additionally, the input/output interface 150 may output instructions or data received from another component(s) of the electronic device 101 to a user or another external device.

The display 160, for example, may include a liquid crystal display (LCD), a light emitting diode (LED) display, an organic light emitting diode (OLED) display, a microelectromechanical systems (MEMS) display, or an electronic paper display. The display 160, for example, may display a variety of content (for example, text, image, video, icon, symbol, and so forth) to a user. The display 160 may include a touch screen, and for example, may receive a touch, gesture, proximity, or hovering input by using an electronic pen or a user's body part.

The communication interface 170, for example, may provide a communication between the electronic device 101 and an external device (for example, the first external electronic device 102, the second external electronic device 104, or the server 106). For example, the communication interface 170 may communicate with an external device (for example, the second external electronic device 104 or the server 106) in connection to the network 162 through wireless communication or wired communication.

The wireless communication, as a cellular communication protocol, may use at least one of long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), and so forth. Additionally, the wireless communication, for example, may include the short range communication 164. The short range communication 164, for example, may include at least one of wireless fidelity (Wi-Fi), Bluetooth (BT), near field communication (NFC), global positioning system (GPS), magnetic source transmission (MST), and so forth.

(MST may generate pulses by using magnetic signals according to transmission data and the pulses may generate magnetic signals. The electronic device 102 may transmit the magnetic signals to a POS and the POS may detect the magnetic signals by using an MST reader and restore the data by converting the detected magnetic signals into electrical signals.

The GNSS may include at least one of GPS, Glonass, and Beidou navigation satellite system (hereinafter referred to as Beidou) and Galileo, that is, the European global satellite-based navigation system. Hereinafter, GPS and GNSS may be interchangeably used. The wired communication, for example, may include at least one of universal serial bus (USB), high definition multimedia interface (HDMI), recommended standard 232 (RS-232), plain old telephone service (POTS), and so forth. The network 162 may include a telecommunications network, for example, at least one of computer network (for example, local area network (LAN) or wide-area network (WAN)), internet, and telephone network.

Each of the first and second external electronic devices 102 and 104 may be the same or different type as the electronic device 101. According to an embodiment of the present disclosure, the server 106 may include a group of one or more servers. According to various embodiments of the present disclosure, all or part of operations executed on the electronic device 101 may be executed on another one or more electronic devices (for example, the electronic device 102 or 104 or the server 106). According to an embodiment of the present disclosure, when the electronic device 101 performs a certain function or service automatically or by a request, it may request at least part of a function relating thereto from another device (for example, the electronic device 102 or 104 or the server 106) instead of or in addition to executing the function or service by itself. The other electronic device (for example, the external electronic device 102 or 104 or the server 106) may execute a requested function or an additional function and may deliver an execution result to the electronic device 101. The electronic device 101 may provide the requested function or service as it is or by further processing the received result. For this, for example, cloud computing, distributed computing, or client-server computing technology may be used.

Figure 2:
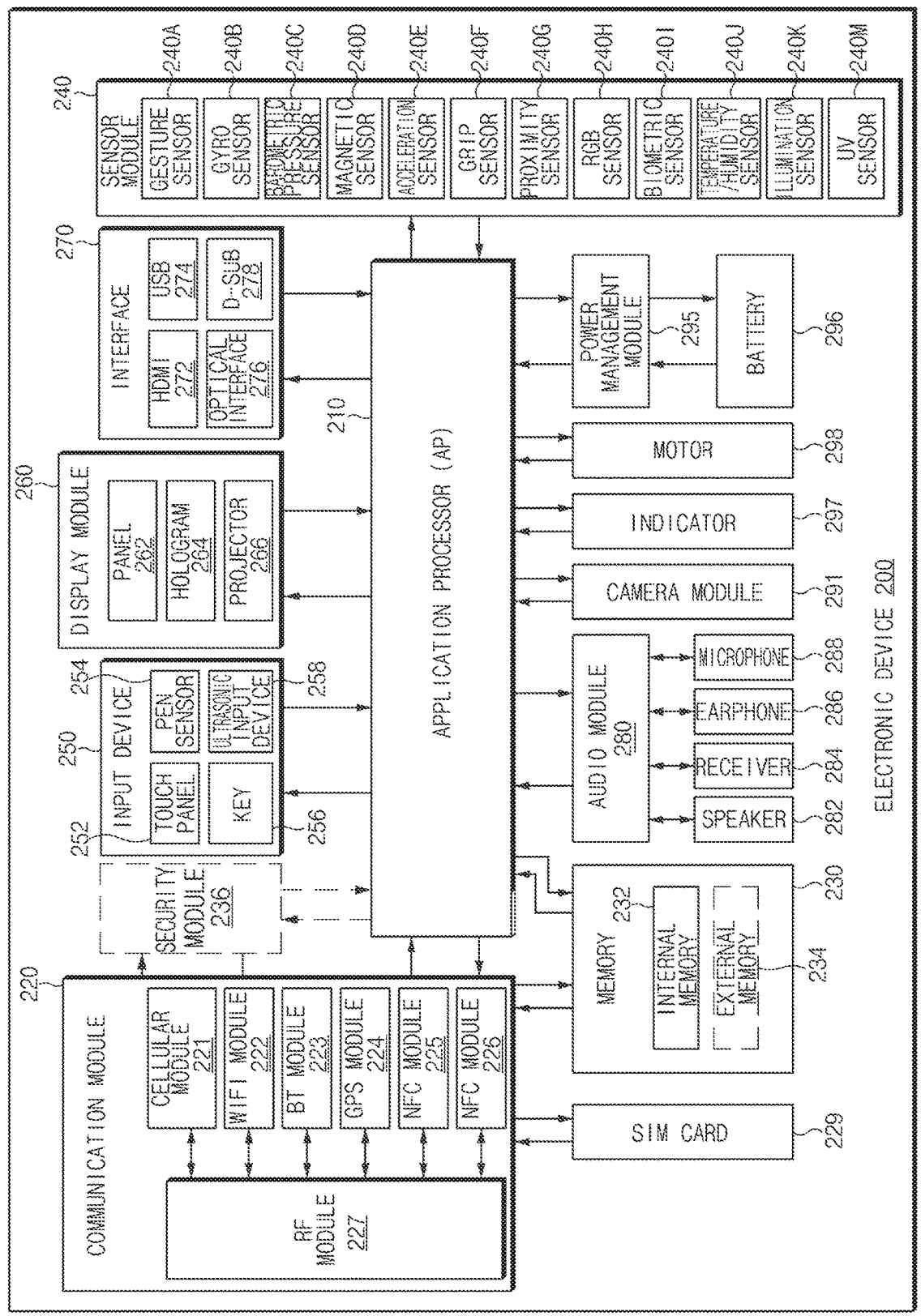
FIG. 2 is a block diagram of an electronic device according to various embodiments of the present disclosure.

FIG. 2 is a block diagram of an electronic device according to various embodiments of the present disclosure.

Referring to FIG. 2, an electronic device 200, for example, may include all or part of the electronic device 101 shown in FIG. 1. The electronic device 200 may include at least one processor (for example, an AP) 210, a communication module 220, a subscriber identification module (SIM) 229, a memory 230, a sensor module 240, an input device 250, a display module 260, an interface 270, an audio module 280, a camera module 291, a power management module 295, a battery 296, an indicator 297, and a motor 298.

The processor 210 may control a plurality of hardware or software components connected thereto and may also perform various data processing and operations by executing an operating system or an application program. The processor 210 may be implemented with a system on chip (SoC), for example. According to an embodiment of the present disclosure, the processor 210 may further include a graphic processing unit (GPU) (not shown) and/or an image signal processor. The processor 210 may include at least part (for example, a cellular module 221) of components shown in FIG. 2. The processor 210 may load commands or data received from at least one of the components (for example, a nonvolatile memory) and process the commands or data and store various commands, data or results in the nonvolatile memory.

The communication module 220 may have the same or similar configuration as the communication interface 170 of FIG. 1. The communication module 220 may include the cellular module 221, a Wi-Fi module 222, a BT module 223, a GNSS module 224 (for example, a GPS module, Glonass module, Beidou module, or Galileo module), an NFC module 225, an MST module 226, and a radio frequency (RF) module 227.

The cellular module 221, for example, may provide voice call, video call, text service, or internet service through a communication network. According to an embodiment of the present disclosure, the cellular module 221 may perform a distinction and authentication operation on the electronic device 200 in a communication network by using a SIM (for example, the SIM card 229). According to an embodiment of the present disclosure, the cellular module 221 may perform at least part of a function that the processor 210 provides. According to an embodiment of the present disclosure, the cellular module 221 may further include a CP.

Each of the Wi-Fi module 222, BT module 223, GNSS module 224, NFC module 225, and MST module 226 may include a processor for processing data transmitted/received through a corresponding module. According to an embodiment of the present disclosure, at least part (for example, two or more) of the cellular module 221, Wi-Fi module 222, BT module 223, GNSS module 224, NFC module 225, and MST module 226 may be included in one integrated chip (IC) or IC package.

The RF module 227, for example, may transmit/receive communication signals (for example, RF signals). The RF module 227 may include a transceiver, a power amp module (PAM), a frequency filter, a low noise amplifier (LNA), or an antenna. According to another embodiment of the present disclosure, at least one of the cellular module 221, Wi-Fi module 222, BT module 223, GNSS module 224, NFC module 225, and MST module 226 may transmit/receive RF signals through a separate RF module.

The SIM 229, for example, may include a card including a SIM and/or an embedded SIM and may also include unique identification information (for example, an integrated circuit card identifier (ICCID)) or subscriber information (for example, an international mobile subscriber identity (IMSI)).

The memory 230 (for example, the memory 130) may include an internal memory 232 or an external memory 234. The internal memory 232 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash or NOR flash), hard drive, and solid state drive (SSD)).

The external memory 234 may further include flash drive, for example, compact flash (CF), secure digital (SD), micro Micro-SD, Mini-SD, extreme digital (xD), multimedia card (MMC) or a memorystick. The external memory 234 may be functionally and/or physically connected to the electronic device 200 through various interfaces.

The security module 236 is a module including a storage space having a relatively higher security level than the memory 230, and may be a circuit for securing safe data storage and protected execution environment. The security module 236 may be implemented as a separate circuit and may include an additional processor. The security module 236, for example, may be in a detachable smart chip or an SD card or may include an embedded secure element (eSE) embedded in a fixed chip of the electronic device 200. Additionally, the security module 236 may run on a different OS from the electronic device 200. For example, it may run based on java card open platform (JCOP) OS.

The sensor module 240 measures physical quantities or detects an operating state of the electronic device 200, thereby converting the measured or detected information into electrical signals. The sensor module 240 may include at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and an ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor therein. According to an embodiment of the present disclosure, the electronic device 200 may further include a processor configured to control the sensor module 240 as part of or separately from the processor 210 and thus, may control the sensor module 240 to remain active while the processor 210 is in a sleep or reduced operation state.

The input device 250 may include a touch panel 252, a (digital) pen sensor 254, a key 256, or an ultrasonic input device 258. The touch panel 252 may use at least one of capacitive, resistive, infrared, or ultrasonic touch detection methods, for example. Additionally, the touch panel 252 may further include a control circuit. The touch panel 252 may further include a tactile layer to provide tactile response to a user.

The (digital) pen sensor 254, for example, may include a sheet for recognition of a pen as part of a touch panel or a separate sheet for recognition of a pen. The key 256 may include a physical button, an optical key, or a keypad, for example. The ultrasonic input device 258 may detect ultrasonic waves generated from an input tool through a microphone (for example, a microphone 288) in order to check data corresponding to the detected ultrasonic waves.

The display 260 (for example, the display 160) may include a panel 262, a hologram device 264, or a projector 266. The panel 262 may have the same or similar configuration as the display 160 of FIG. 1. The panel 262 may be implemented to be flexible, transparent, impact-resistant or wearable, for example. The panel 262 and the touch panel 252 may be configured as one module. The hologram 264 may show three-dimensional images in the air by using the interference of light. The projector 266 may display an image by projecting light on a screen. The screen, for example, may be placed inside or outside of the electronic device 200. According to an embodiment of the present disclosure, the display 260 may further include a control circuit for controlling the panel 262, hologram device 264, or projector 266.

The interface 270 may include an HDMI 272, a USB 274, an optical interface 276, or a D-subminiature (sub) 278, for example. The interface 270, for example, may be included in the communication interface 170 shown in FIG. 1. Additionally or alternatively, the interface 270 may include a mobile high-definition link (MHL) interface, an SD card/MMC interface, or an infrared data association (IrDA) standard interface.

The audio module 280 may convert sound into electrical signals and convert electrical signals into sounds. At least some components of the audio module 280, for example, may be included in the input/output interface 145 shown in FIG. 1. The audio module 280 may process sound information inputted/outputted through a speaker 282, a receiver 284, an earphone 286, or the microphone 288.

The camera module 291 is a device for capturing a still image and a video, and may include at least one image sensor (for example, a front sensor or a rear sensor), a lens, an image signal processor (ISP), or a flash (for example, an LED or a xenon lamp).

The power management module 295 may manage the power of the electronic device 200. According to an embodiment of the present disclosure, the power management module 295 may include a power management IC (PMIC), a charger IC, or a battery or fuel gauge, for example. The PMIC may have a wired and/or wireless charging method. As the wireless charging method, for example, a magnetic resonance method, a magnetic induction method, an acoustic method or an electromagnetic method may be used. An additional circuit for wireless charging, for example, a circuit such as a coil loop, a resonant circuit, or a rectifier circuit, may be added. The battery gauge may measure the remaining amount of the battery 296, or a voltage, current, or temperature thereof during charging. The battery 296, for example, may include a rechargeable battery and/or a solar battery.

The indicator 297 may display a specific state of the electronic device 200 or part thereof (for example, the processor 210), for example, a booting state, a message state, or a charging state. The motor 298 may convert electrical signals into mechanical vibration and may generate vibration or haptic effects. Although not shown in the drawings, the electronic device 200 may include a processing device (for example, a GPU) for mobile TV support. A processing device for mobile TV support may process media data according to standards such as digital multimedia broadcasting (DMB), digital video broadcasting (DVB), or mediaFLO™.

Each of the above-mentioned components of the electronic device according to various embodiments of the present disclosure may be configured with at least one component, and the name of a corresponding component may vary according to the kind of electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

Figure 3:
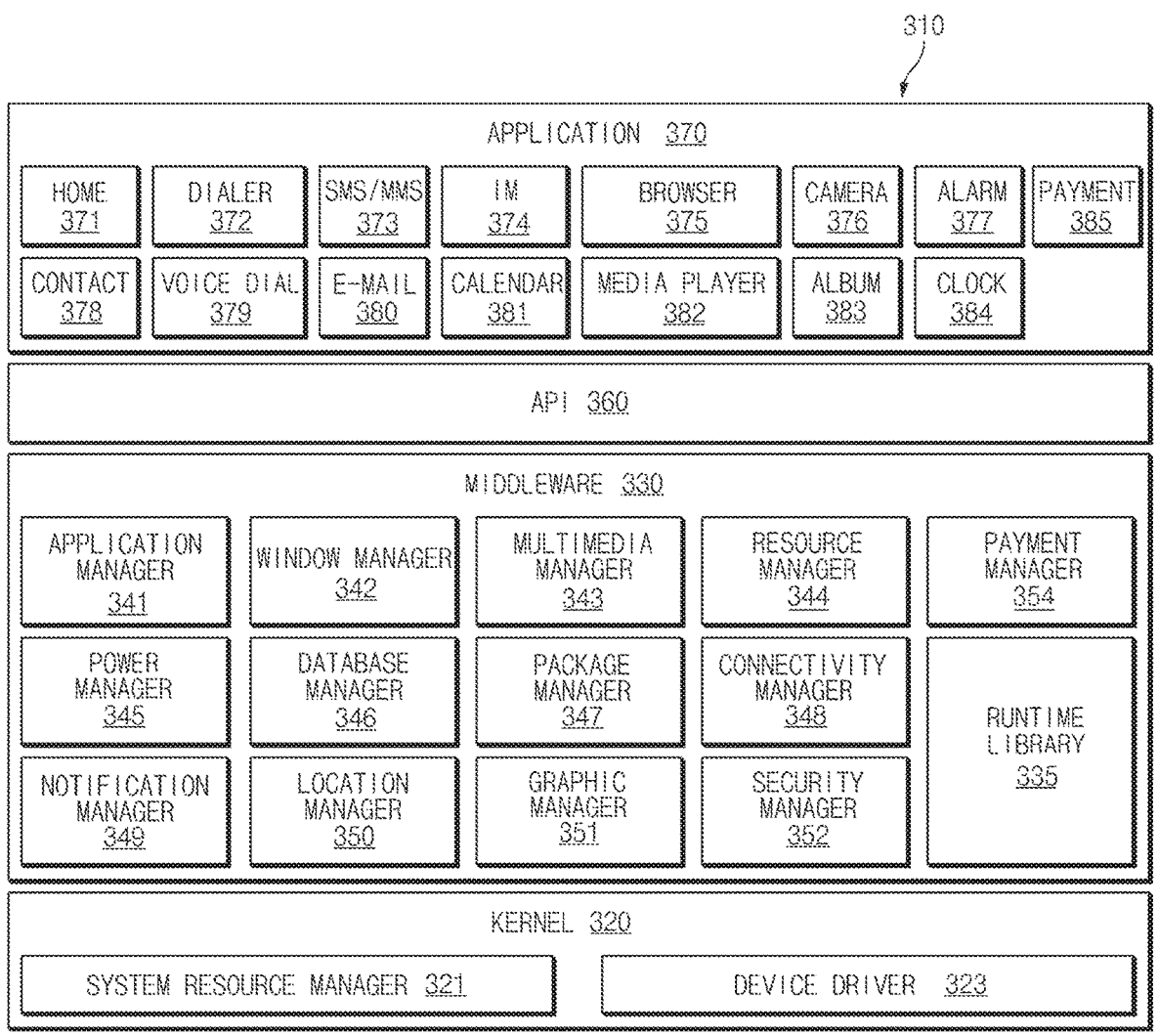
FIG. 3 is a block diagram of a program module according to various embodiments of the present disclosure.

FIG. 3 is a block diagram of a program module according to various embodiments of the present disclosure.

Referring to FIG. 3, a program module 310 (for example, the program 140) may include an OS for controlling a resource relating to an electronic device (for example, the electronic device 101) and/or various applications (for example, the application program 147) running on the OS. The OS, for example, may include Android, iOS, Windows, Symbian, Tizen, Bada, or the like.

The programs may include a kernel 320, a middleware 330, an API 360, and/or an application program (or an app or application) 370. At least part of the program module 310 may be preloaded on an electronic device or may be downloaded from a server (for example, the electronic devices 102 and 104 and the server 106).

The kernel 320 (for example, the kernel 141), for example, may include a system resource manager 321, or a device driver 323. The system resource manager 321 may perform control, allocation, or retrieval of a system resource. According to an embodiment of the disclosure, the system resource manager 321 may include a process management unit, a memory management unit, or a file system management unit. The device driver 323 may include, for example, a display driver, camera driver, Bluetooth driver, sharing memory driver, USB driver, keypad driver, Wi-Fi driver, audio driver, or an inter-process communication (IPC) driver.

The middleware 330, for example, may provide a function that the application 370 requires commonly, or may provide various functions to the application 370 through the API 360 in order to allow the application 370 to efficiently use a limited system resource inside the electronic device. According to an embodiment of the present disclosure, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and a payment manager 354.

The runtime library 335, for example, may include a library module that a compiler uses to add a new function through a programming language while the application 370 is running. The runtime library 335 may perform a function on input/output management, memory management, or an arithmetic function.

The application manager 341, for example, may manage the life cycle of at least one application among the applications 370. The window manager 342 may manage a GUI resource used in a screen. The multimedia manager 343 may recognize a format for playing various media files and may encode or decode a media file by using the codec corresponding to a corresponding format. The resource manager 344 may manage a resource such as a source code, a memory, or a storage space of at least any one of the applications 370.

The power manager 345, for example, may operate together with a basic input/output system (BIOS) to manage the battery or power, and may provide power information necessary for operation of the electronic device. The database manager 346 may create, search, or modify a database used in at least one application among the applications 370.

The package manager 347 may manage the installation or update of an application distributed in a package file format.

The connectivity manager 348 may manage a wireless connection such as Wi-Fi or Bluetooth. The notification manager 349 may display or notify an event such as arrival messages, appointments, and proximity alerts to a user in a manner not interrupting the user. The location manager 350 may manage location information on an electronic device. The graphic manager 351 may manage a graphic effect to be provided to a user or a user interface relating thereto. The security manager 352 may provide various security functions necessary for system security or user authentication.

According to an embodiment of the present disclosure, when an electronic device (for example, the electronic device 101) includes a phone function, the middleware 330 may further include a telephony manager for managing a voice or video call function of the electronic device. The payment manager 354 may relay information for payment from the application 370 to elsewhere in the application 370 or the kernel 320. Additionally, information relating to payment received from an external device may be stored in the electronic device or information stored therein may be delivered to an external device.

The middleware 330 may include a middleware module for forming a combination of various functions of the above-mentioned components. The middleware 330 may provide a module specialized for each type of OS to provide differentiated functions. Additionally, the middleware 330 may delete part of existing components or add new components dynamically.

The API 360 (for example, the API 145), for example, is a set of API programming functions, and may be provided as another configuration according to OS. For example, in the case of Android or iOS, one API set may be provided for each platform and in the case Tizen, at least two API sets may be provided for each platform.

The application 370 (for example, the application program 147) may include at least one application for providing functions such as a home function 371, a dialer function 372, a short message service (SMS)/multimedia messaging service (MMS) function 373, an instant message function 374, a browser function 375, a camera function 376, an alarm function 377, a contact function 378, a voice dial function 379, an e-mail function 380, a calendar function 381, a media player function 382, an album function 383, a clock function 384, a payment function 385, a health care function (for example, measurement of an exercise amount or blood sugar), or an environmental information provision function (for example, providing air pressure, humidity, or temperature information).

According to an embodiment of the present disclosure, the application 370 may include an application (hereinafter referred to as "information exchange application") for supporting information exchange between the electronic device (for example, the electronic device 101) and an external electronic device (for example, the electronic device 102 or 104). The information exchange application, for example, may include a notification relay application for relaying specific information to the external device or a device management application for managing the external electronic device.

For example, the notification relay application may have a function for relaying to an external electronic device (for example, electronic devices 102 and 104) notification information occurring from another application (for example, an SMS/MMS application, e-mail application, health care application, or environmental information application) of the electronic device. Additionally, the notification relay application may receive notification information from an external electronic device and may then provide the received notification information to a user.

The device management application, for example, may manage (for example, install, delete, or update) at least one function (for example, turn-on/turn off of the external electronic device itself or some components, or control the brightness or resolution adjustment of a display) of an external electronic device (for example, the electronic devices 102 and 104) communicating with the electronic device, an application operating in the external electronic device, or a service (for example, call service or message service) provided from the external device.

According to an embodiment of the present disclosure, the application 370 may include a specified application (for example, a health care application of a mobile medical device) according to the property of an external electronic device (for example, the electronic devices 102 and 104). According to an embodiment of the present disclosure, the application 370 may include an application received from an external electronic device (for example, the server 106 or the electronic device 102 or 104). According to an embodiment of the present disclosure, the application 370 may include a preloaded application or a third party application downloadable from a server. The names of components in the program module 310 according to the shown embodiment may vary depending on the type of OS.

According to various embodiments of the present disclosure, at least part of the program module 310 may be implemented with software, firmware, hardware, or a combination thereof. At least part of the programming module 310, for example, may be implemented (for example, executed) by a processor (for example, the processor 120). At least part of the programming module 310 may include a module, program, routine, sets of instructions, or process to perform at least one function, for example.

The term "module" used in various embodiments of the present disclosure, for example, may mean a unit including a combination of at least one of hardware, software, and firmware. The term "module" and the term "unit", "logic", "logical block", "component", or "circuit", may be interchangeably used. A "module" may be a minimum unit or part of an integrally configured component. A "module" may also be a minimum unit performing at least one function or part thereof. A "module" may be implemented mechanically or electronically. For example, a "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in non-transitory computer-readable storage media. When at least one processor (for example, the processor 120) executes an instruction, it may perform a function corresponding to the instruction. The non-transitory computer-readable storage media may include the memory 130, for example.

The non-transitory computer-readable storage media may also include hard disks, floppy disks, magnetic media (for example, magnetic tape), optical media (for example, compact disc read only memory (CD-ROM), and digital versatile disc (DVD)), magneto-optical media (for example, floptical disk), and hardware devices (for example, read only memory (ROM), random access memory (RAM), or flash memory). Additionally, a program instruction may include high-level language code executable by a computer using an interpreter in addition to machine code created by a compiler. The hardware device may be configured to operate as at least one software module to perform an operation of various embodiments and vice versa.

A module or programming module according to various embodiments of the present disclosure may include at least one of the above-mentioned components, may not include some of the above-mentioned components, or may further include another component. Operations performed by a module, programming module, or other components according to various embodiments of the present disclosure may be executed through a sequential, parallel, repetitive or heuristic method. Additionally, some operations may be executed in a different order or may be omitted, and other operations may be added. Moreover, the embodiments disclosed in this specification are suggested for the description and understanding of technical content, but do not limit the range of the present disclosure. Accordingly, the range of the present disclosure should be interpreted as including all modifications or various other embodiments based on the technical idea of the present disclosure.

Figure 4:
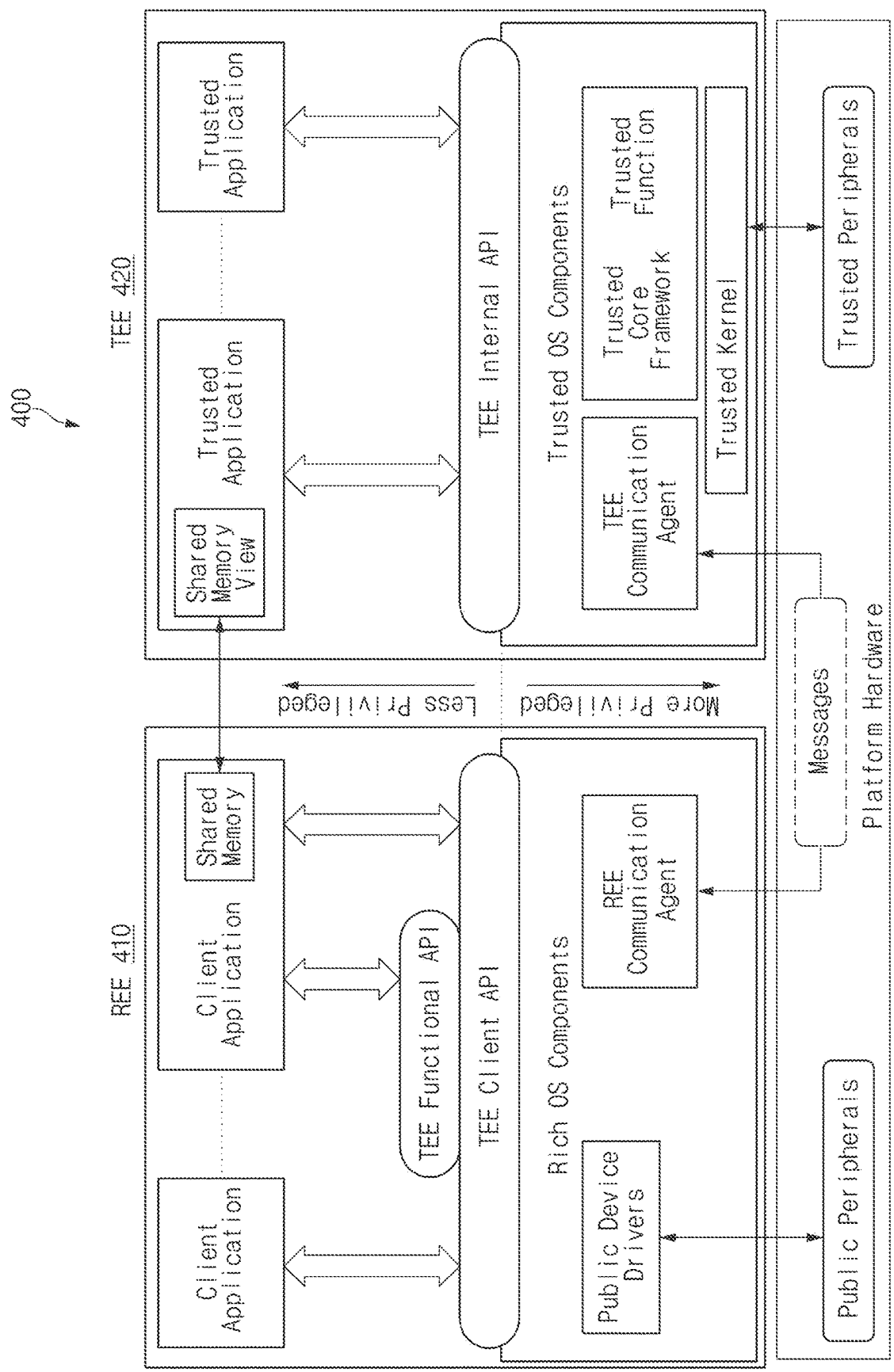
FIG. 4 is a block diagram illustrating a rich execution environment (REE) and a trusted execution environment (TEE) operating in an electronic device according to various embodiments of the present disclosure.

FIG. 4 is a block diagram illustrating an REE and a TEE operating in an electronic device according to various embodiments of the present disclosure.

Referring to FIG. 4, an electronic device may operate an execution environment 400 having a plurality of security levels for security enhancement. A plurality of execution environments, for example, may include a rich execution environment (REE) 410 and a trusted execution environment (TEE) 420. The REE 410, for example, may be a first execution environment having a first security level. The TEE 420, for example, may be a second execution environment having a second security level different from (for example, higher than) the first security level. According to an embodiment of the present disclosure, the electronic device may include an additional execution environment (for example, a third execution environment) having a third security level, but the present disclosure is not limited thereto.

The TEE 420 may store data, which requires a relatively high security level, in a safe environment and perform a related operation. The TEE 420 may operate on an application processor of an electronic device and may operate based on a reliable hardware structure determined during a manufacturing process. The TEE 420 may divide an application processor or a memory into a general area and a security area and operate in the security area. The TEE 420 may set software or hardware, which requires security, to operate only in a security area. The electronic device may operate the TEE 420 through a physical change of hardware or a logical change of software.

The TEE 420 may be separated from the REE 410 through hardware restriction or may be separated from the REE 410 in the same hardware in terms of software and operation. At least one application (for example, payment, contact, e-mail or browser) operating in the REE 410 may use an API (for example, TEE functional API or TEE client API) allowed to access the TEE 420. The at least one application may deliver a message to a communication agent (for example, a TEE communication agent) of the TEE 420 from a communication agent (for example, an REE communication agent) of the TEE 420 by using the API. The message may be implemented to be delivered to only the TEE 420. The communication agent of the TEE 420 may receive the message and deliver it to a trusted application (TA) (for example, digital rights management (DRM), a security payment module, or a security bio information module) relating to the message. The TA may perform an operation relating to the message and deliver a result on the operation to the communication agent of the REE 410 through the communication agent of the TEE 420. The communication agent of the REE 410 may deliver the result to at least one application operating in the REE 410.

Figures 5A, 5B:
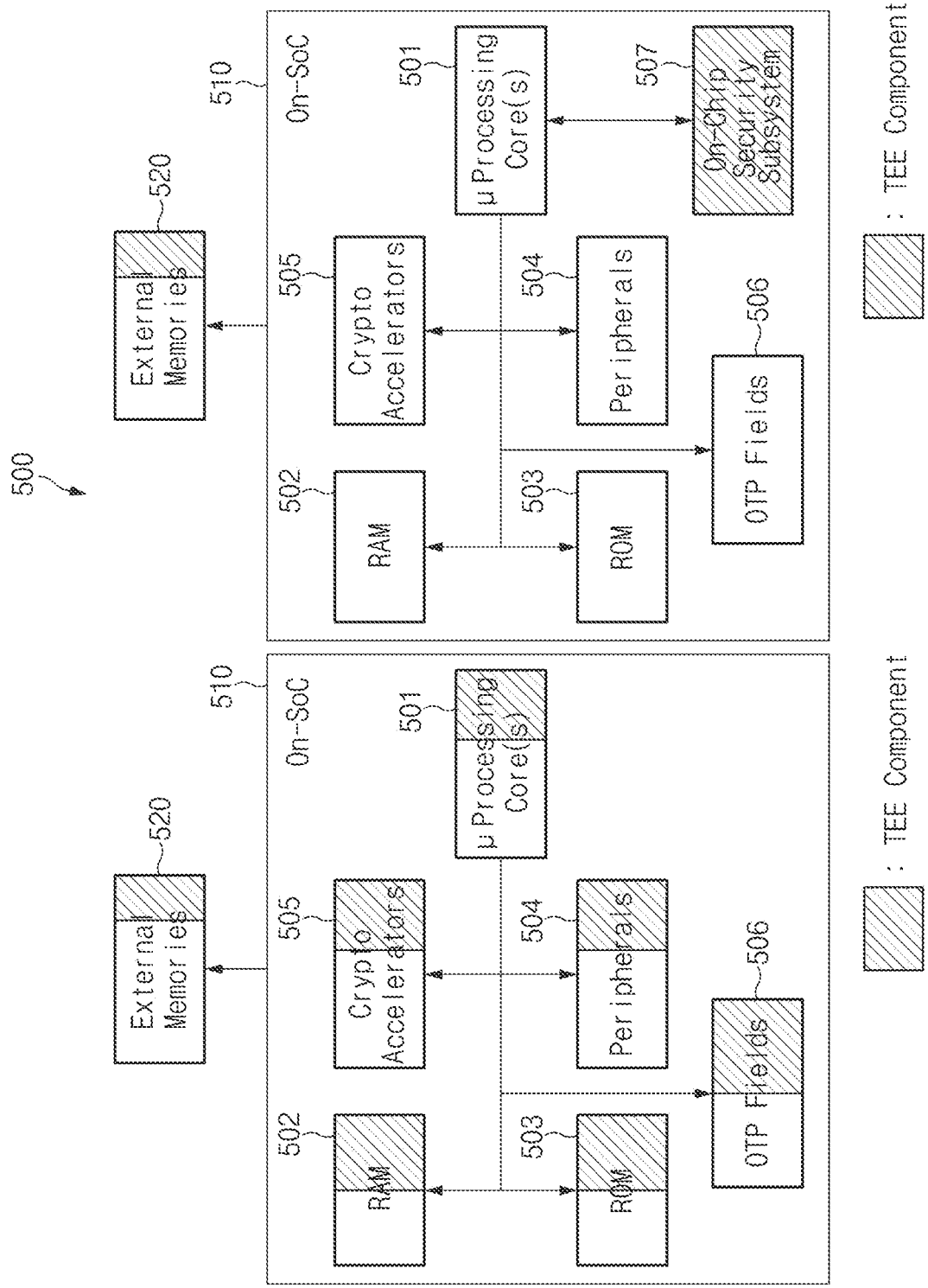
FIGS. 5A to 5C are block diagrams illustrating a hardware structure of a TEE according to various embodiments of the present disclosure.
Figure 5C:
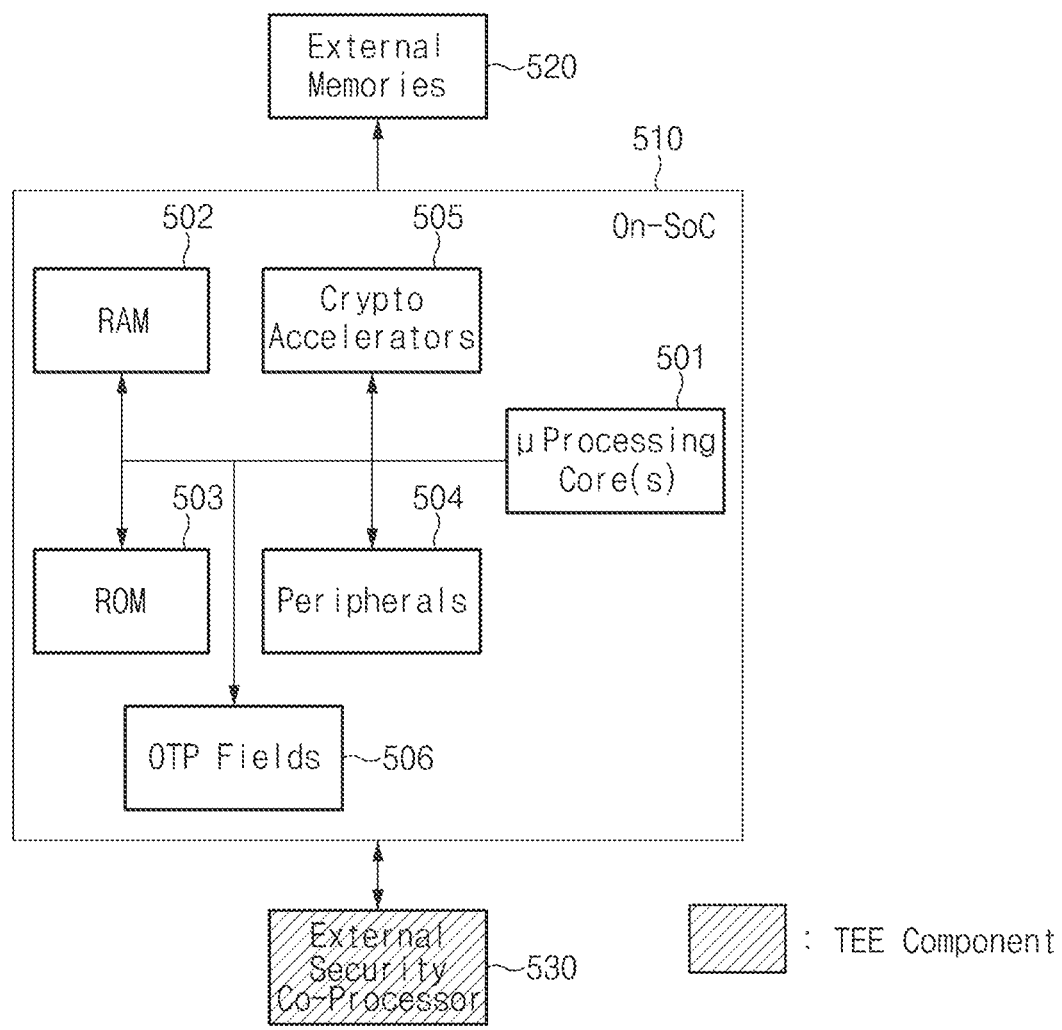

FIGS. 5A to 5C are block diagrams illustrating a hardware structure of a TEE according to various embodiments of the present disclosure.

Referring to FIG. 5A, a case is illustrated (for example, a Trustzone (TZ) of an advanced risc machine (ARM)) where one processor and one memory are divided into an REE and a TEE in terms of hardware and used. According to an embodiment of the present disclosure, a hardware structure of the TEE may include an On-SoC 510 and external memories 520. The On-SoC 510 may include a micro processing core 501, a RAM 502, a ROM 503, a peripheral 504, a crypto accelerator 505, or OTP fields 506. The TZ may distinguish the REE from the TEE and use them by dividing a processor temporally in order to operate two or more execution environments. Additionally, the TZ may divide one memory into an area accessible from the REE and an area accessible from the TEE and use them.

Referring to FIG. 5B, a case is illustrated where a processor for TEE is implemented in an on-chip form like a processor for operating an REE, but implemented with an additional processing core set. According to an embodiment of the present disclosure, an On-SoC 510 may additionally include an On-chip security subsystem 507 including at least one processor in addition to the micro processing core 501. In such a case, the On-SoC 510 may be set to operate an REE and the On-chip security subsystem 507 may be set to operate a TEE. In the case of FIG. 5B, like FIG. 5A, one memory may be divided into an area accessible from the REE and an area accessible from the TEE and use them.

Referring to FIG. 5C, a case is illustrated where a processor for TEE is implemented with an additional chip in terms of hardware, so that it is separated from a chip in which a processor for operating an REE is implemented. Referring to FIG. 5C, an On-Soc 510 may be set to operate the REE and at least one external security co-processor 530 equipped outside the On-Soc 510 may be set to operate the TEE.

Figure 6:
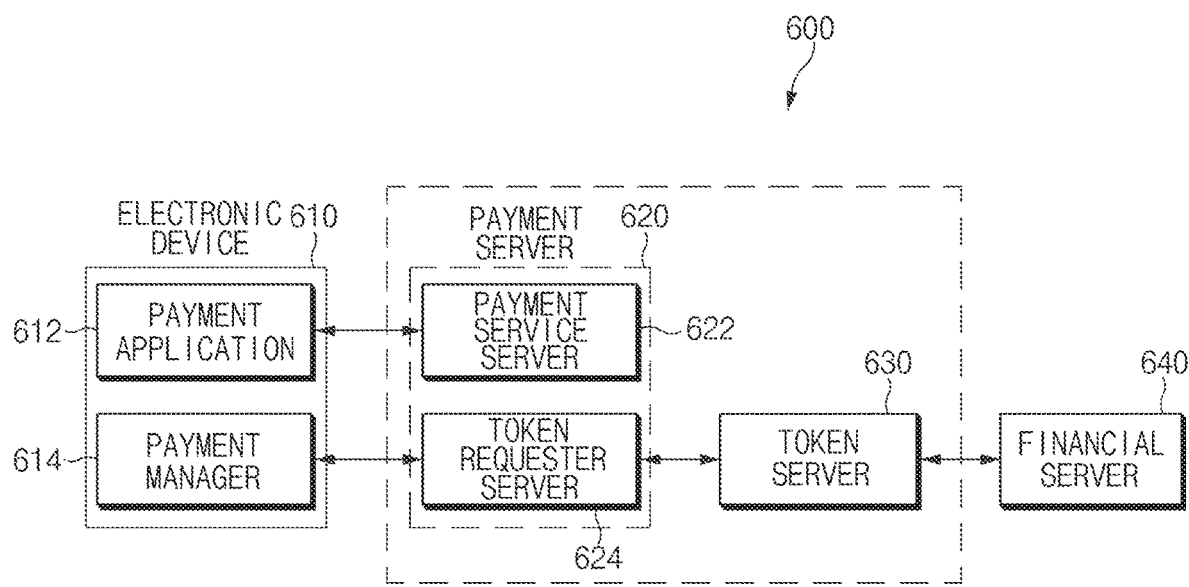
FIG. 6 is a block diagram illustrating a payment system according to various embodiments of the present disclosure.

FIG. 6 is a block diagram illustrating a payment system according to various embodiments of the present disclosure.

Referring to FIG. 6, a payment system 600 may include an electronic device 610 and/or a server. Additionally, for example, the server may include a payment server 620, a token server (for example, a token service provider) 630, or a financial server (for example, an issuer) 640. The electronic device 610, for example, may include a payment application (for example, a wallet application) 612 and/or a payment manager 614. The payment server 620, for example, may include a payment service server 622 and/or a token requester or a token requester server 624.

According to various embodiments of the present disclosure, the payment application 612, for example, may include a Samsung Pay™ Application. The payment application 612, for example, may provide a payment related user interface (for example, user interface (UI) or user experience (UX)). The payment related UI may include a wallet UI/UX. For example, the payment application 612 may provide a UI relating to card registration, payment, or transaction. For example, the payment application 612, for example, may provide an interface relating to a character reader (for example, an optical character reader/recognition (OCR)) or an external input (for example, a user input). Additionally, the payment application 612, for example, may provide a user authentication related interface through ID&V.

According to various embodiments of the present disclosure, the payment application 612 may perform payment transactions. For example, the payment application 612 may provide a payment function to a user through Simple Pay, Quick Pay, or specified application execution. A user may perform a payment function by using the payment application 612 and receive information relating to the payment function.

According to various embodiments of the present disclosure, the payment manager 614 may include card company related information. For example, the payment manager 614 may include a card company software development kit (SDK).

According to various embodiments of the present disclosure, the payment server 620 may include a management server for electronic payment or mobile payment. The payment server 620, for example, may receive payment related information from the electronic device 610 and transmit it to the outside or process it in the payment server 620.

According to various embodiments of the present disclosure, the payment server 620 may transmit/receive information between the electronic device 610 and the token server 630 by using the payment service server 622 and/or the token requester server 624. The payment service server 622, for example, may include the payment server 620 (for example, a Samsung payment server). The payment service server 622, for example, may manage card information in linkage with a service account or user account. Additionally, the payment service server 622 may include an application program interface (API) server relating to the payment application 612. Additionally, the payment service server 622, for example, may provide the payment management module (for example, account integration or Samsung account integration).

According to various embodiments of the present disclosure, the token requester server 624 may provide an interface for processing payment related information. For example, the token requester server 624 may perform the issue, deletion, or activation of payment related information (for example, a token). Alternatively, it may be functionally connected to the payment manager 614 and control information necessary for the payment.

According to various embodiments of the present disclosure, the payment application 612 in the electronic device 610 may be functionally connected to the payment service server 622 in the payment server 620. For example, the payment application 612 may transmit/receive payment related information to/from the payment server 620. According to an embodiment of the present disclosure, the payment manager 614 in the electronic device 610 may be functionally connected to the token requester server 624 in the payment server 620. For example, the payment manager 614 may transmit/receive payment related information to/from the token requester server 624.

According to various embodiments of the present disclosure, the token server 630 may issue payment related information (for example, a token) or manage payment related information. For example, the token server 630 may control the life cycle of a token. The life cycle may include a generation, modification, or deletion cycle. Additionally, the token server 630, for example, may include a token management server and may perform token provisioning, ID&V, replenishment, or life cycle management. Additionally, the token server 630 may perform the integration of information relating to a financial server.

According to various embodiments of the present disclosure, the payment server 620 and/or the token server 630 may be located in the same or similar area or located in separated areas. For example, the payment manager 620 may be included in a first server and the token server 630 may be included in a second server. Additionally, for example, the payment manager 620 and/or the token server 630 may be separately implemented in one server (for example, a first server or a second server).

According to various embodiments of the present disclosure, the financial server 640 may also perform card issues. For example, the financial server 640 may include a card issue bank. Additionally, the financial server 640 may generate information necessary for payment provided to a user. The user may store the information necessary for payment, which is generated from the financial server 640, in the electronic device 610 by using the payment application 612. Additionally, the financial server 640 may be functionally connected to the token server 630 and transmit/receive the information necessary for payment to/from the token server 630.

Figure 7:
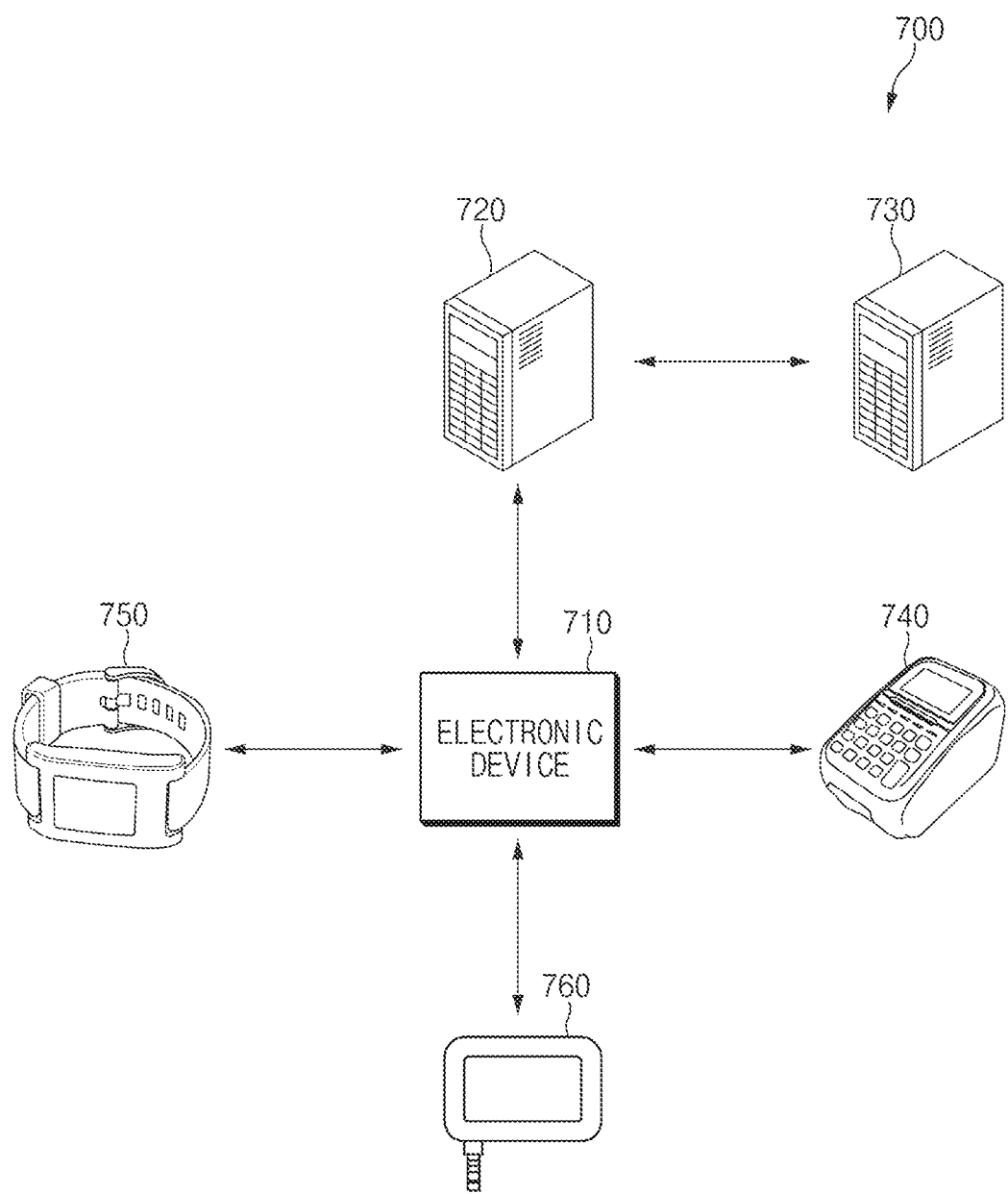
FIG. 7 is a diagram illustrating a payment system for performing payment according to various embodiments of the present disclosure.

FIG. 7 is a diagram illustrating a payment system for performing payment according to various embodiments of the present disclosure.

Referring to FIG. 7, a payment system 700 may include an electronic device 710 (for example, the electronic device 101), a payment server 720 (for example, the server 106), a token service provider (TSP) 730 (for example, the server 106 or another server (not shown)), and a point of sales (POS) 740 (for example, the electronic device 102). According to an embodiment of the present disclosure, a payment system may include at least one additional electronic device 750 or 760. The at least one additional electronic device may include a wearable device 750 (for example, a smart watch) or an accessory 760 (for example, a fob form device from LoopPay™, a USB form accessary device, a cover form accessary device, or a card form accessary), which is functionally (for example, communication) connectable to the electronic device 710. According to an embodiment of the present disclosure, the fob form device from LoopPay™ may include an external payment module connected to the electronic device 710 through a microphone.

According to an embodiment of the present disclosure, the electronic device 710 may operate a payment function. The electronic device 710 may register a card (for example, credit cards such as MasterCard™ or Visa') in the electronic device 710 or the payment server 720. The payment server 720 may manage information on a card registered through another electronic device (for example, the electronic device 750) of a user corresponding to the electronic device 710 or a plurality of registered cards including other cards registered through another user's electronic device in addition to a card registered through the electronic device 710.

According to an embodiment of the present disclosure, the payment server 720 may obtain token information corresponding to registered card information from the token service provider 730 and deliver it to the electronic device 710. The payment server 720, for example, may include a payment service server or a token requester server. The payment service server may manage users' card information. The payment service server may provide payment related service based on account. The token requester server may obtain token information by requesting token information necessary for payment operation from the token service provider 730.

The token service provider 730 may issue a token used during a payment process. According to an embodiment of the present disclosure, the token may be a value for replacing a primary account number (PAN) of the card information. According to an embodiment of the present disclosure, the token may be generated by using a bank identification number (BIN). Additionally, the generated token may be encrypted by the token service provider 730 or, after the generated token is transmitted in an unencrypted state to the payment server 720, it may be encrypted by the payment server 720. After the encrypted token information is delivered to the electronic device 710 through the payment server 720, it may be decoded in the electronic device 710. According to an embodiment of the present disclosure, the token may be generated by the token service provider 730 and encoded, and delivered to the electronic device 710 without going through the payment server 720. According to another embodiment of the present disclosure, the payment server 720 may include a token generation function and in this case, an additional token service provider 730 may not be used in a payment system.

The electronic device 710, for example, may perform payment by using at least one of at least one other electronic devices 750 or 760 that are functionally connected based on short-range communication (for example, Bluetooth or WiFi). According to an embodiment of the present disclosure, the other electronic device 750 may be a wearable device (for example, a smart watch) and in this case, the electronic device 710 may deliver a token delivered from the token service provider 730 to the wearable device. According to an embodiment of the present disclosure, the other electronic device 760 may be an accessory (for example, a fob form device from LoopPay™) and in this case, the electronic device 710 may be functionally connected to the accessory (for example, a fob form device from LoopPay™) through the input/output interface 150 (for example, the earphone 286).

Figure 8:
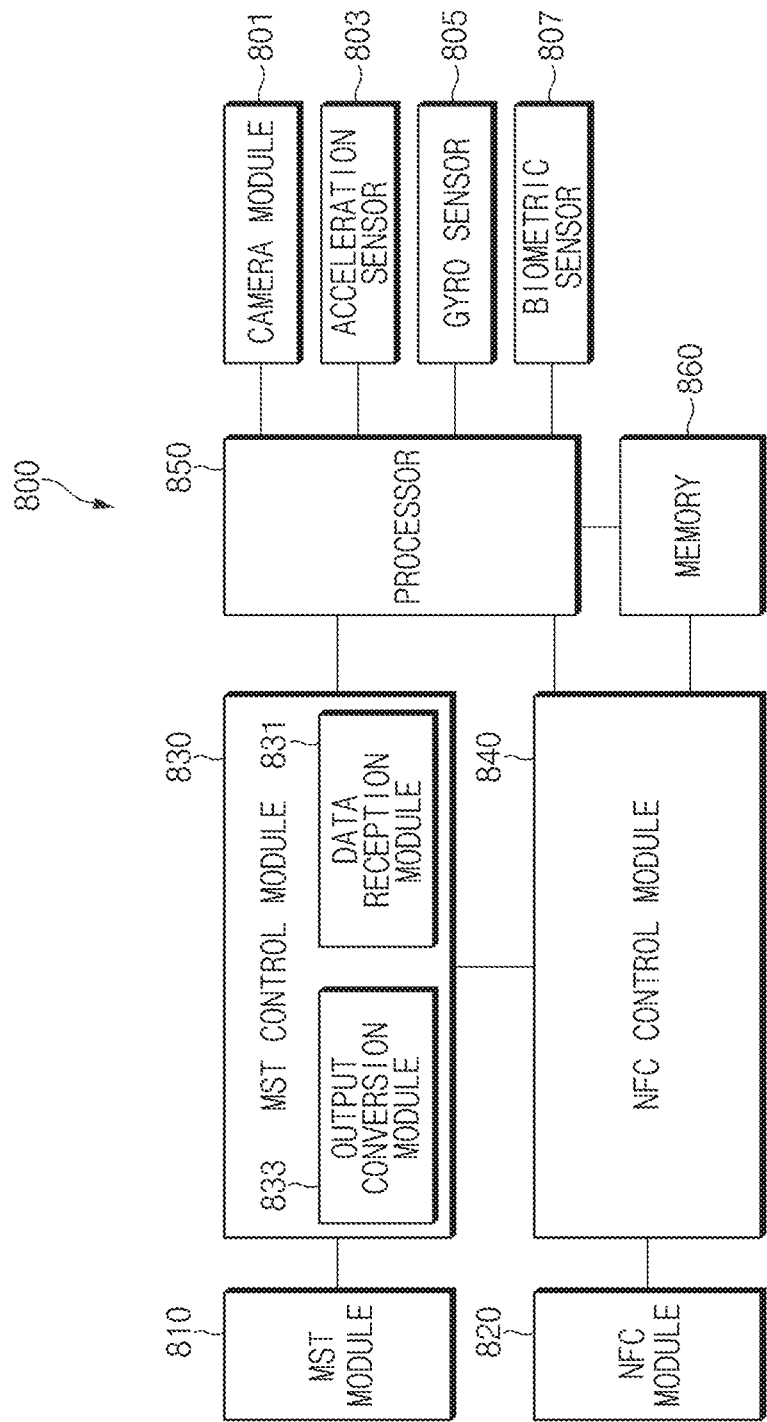
FIG. 8 is a block diagram illustrating a hardware structure of an electronic device for performing a payment function according to various embodiments of the present disclosure.

FIG. 8 is a block diagram illustrating a hardware structure of an electronic device for performing a payment function according to various embodiments of the present disclosure.

Referring to FIG. 8, an electronic device 800, for example, may include a camera module 801, an acceleration sensor 803, a gyro sensor 805, a biometric sensor 807, an MST module 810, an NFC module 820, an MST control module 830, an NFC control module 840, a processor 850, and a memory 860. The camera module 801 may obtain card information by capturing an image of a card necessary for payment. The camera module 801 may recognize card information (for example, a card company, card number, card expiration date, or card holder) indicated on a card through an OCR function. Alternatively, a user may input necessary card information into an electronic device by using an input device (for example, a touch panel, pen sensor, key, ultrasonic input device, or microphone input device) in the electronic device 800.

According to an embodiment of the present disclosure, the acceleration sensor 803 or the gyro sensor 805 may obtain the position state of the electronic device 800 during payment. The obtained position information of the electronic device 800 (for example, the electronic device 101) may be delivered to the processor 850 and the processor 850 may adjust the intensity of a magnetic field or a current scale associated with transmission from the MST module 810 to a POS based on the obtained position state of the electronic device 800. The electronic device 800 may include a plurality of coil antennas (not shown), and the processor 850 may select a coil antenna to be used. According to an embodiment of the present disclosure, the MST control module 830 may include a data reception module 831 and an output conversion module 833. The data reception module 831 may receive a pulse signal in a logical low/high form including payment information transmitted by the processor 850 or a security module (for example, eSE).

The output conversion module 833 may include a circuit converted into a necessary form in order to deliver data recognized by the data reception module 831 to the MST module 810. The circuit may include an H-Bridge for controlling a direction of a voltage supplied to both ends of the MST module 810. The H-Bridge may have a circuit structure connected in an H form by using four switch structures. As an H-Bridge construction is known to those skilled in the art, further details are omitted, According to an embodiment of the present disclosure, based on card information inputted through the camera module 801 or an input device (for example, a touch panel, pen sensor, and so forth), the electronic device 800 may receive payment information (for example, track 1/2/3 or token information) included in a magnetic stripe of a magnetic card from a card company/bank server through a communication module (not shown). The electronic device 800 may store the received payment information in the memory 860 or an additional security module (for example, eSE) in a necessary form.

Figure 9:
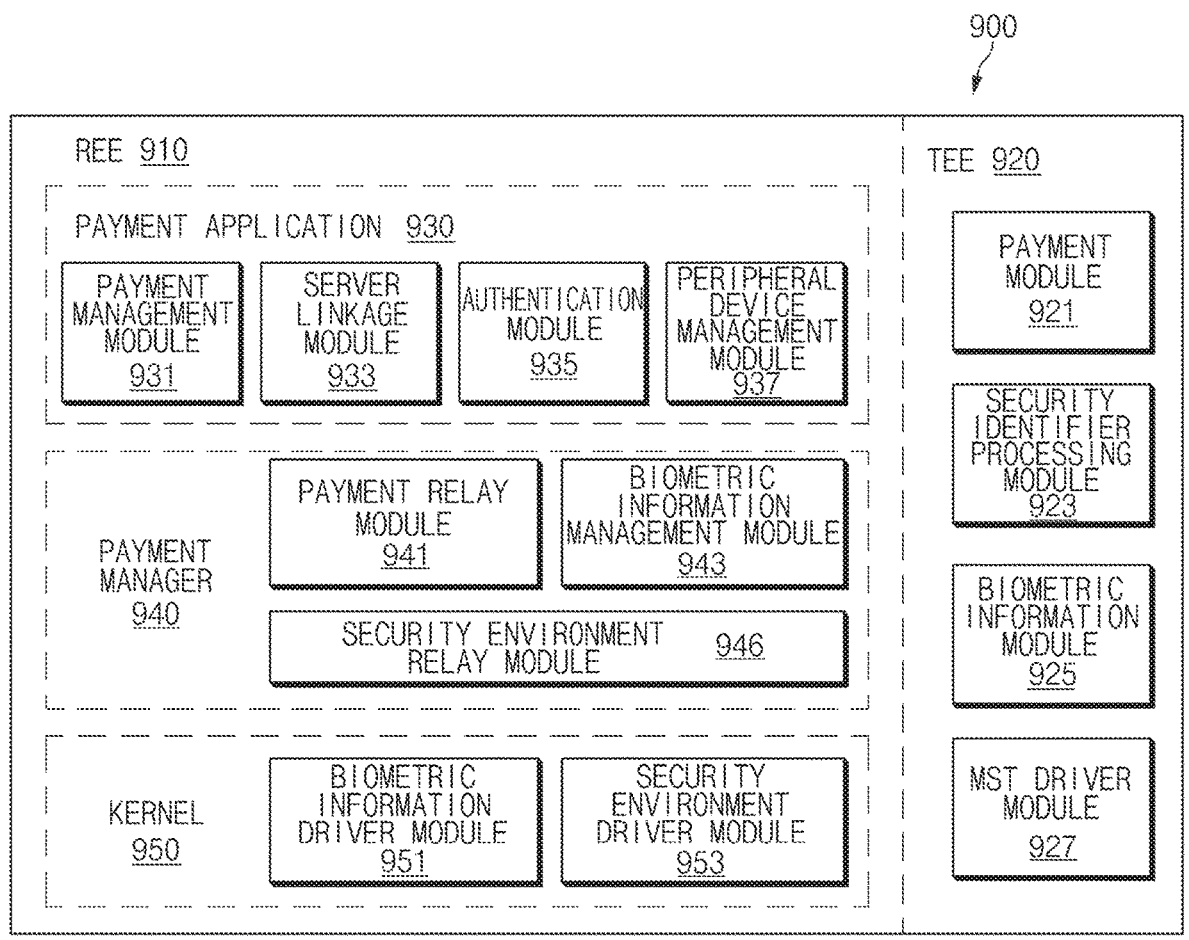
FIG. 9 is a block diagram illustrating program modules executed in an execution environment of an electronic device for performing a payment function according to various embodiments of the present disclosure.

FIG. 9 is a block diagram illustrating program modules executed in an execution environment of an electronic device for performing a payment function according to various embodiments of the present disclosure.

Referring to FIG. 9, an execution environment of an electronic device 900, for example, may include an REE 910 and a TEE 920.

According to an embodiment of the present disclosure, in order for payment, for example, the REE 910 may include a payment application 930 (for example, the payment application 385), a payment manager 940 (for example, the payment manager 354), and a kernel 950 (for example, the kernel 320). According to an embodiment of the present disclosure, the payment application 930 may include a payment management module 931, a server linkage module 933, an authentication module 935, and a peripheral device management module 937.

According to an embodiment of the present disclosure, the payment management module 931 may perform an operation for card registration, card authentication, card deletion, and payment. The payment management module 931 may also register a user's card. The electronic device 900 (for example, the electronic device 101) may receive a card registration request from a user. The electronic device 900 may obtain a card image by using a camera module. The payment management module 931 may obtain a card image through an OCR module. The payment management module 931 may also receive card information related information (for example, password, home address, e-mail address, phone number, or account ID) from a user or obtain the card information related information from the payment server 720.

According to an embodiment of the present disclosure, the payment management module 931 may display a registered card to a user through a display (for example, the display 160). A user may modify at least some of the information (for example, card name, home address, phone number, the number of payment attempts, or whether payment notification information is received) of the registered card. The payment management module 931 may also display a transaction history according to each card. The payment management module 931 may also display card information registered in a wearable device (for example, a smart watch) functionally connected to an electronic device.

According to an embodiment of the present disclosure, the payment management module 931 may perform a payment operation by using a registered card. A user may select one of a plurality of cards registered for payment. A user may take the electronic device 900 to a POS 740. The payment management module 931 may display product information (for example, price) delivered from the POS 740 through the display 160. The payment management module 931 may perform user authentication (for example, fingerprint authentication) through the authentication module 935 for payment. When authentication is completed, the payment management module 931 may display notification information that payment is completed, through the display 160.

According to an embodiment of the present disclosure, the electronic device 900 may transmit payment information to the POS 740 by using at least one of an MST module and an NFC module. In order to increase a recognition rate, payment information may be transmitted to the POS 740 by using both the MST module and the NFC module. Alternatively, when payment information is transmitted by using the MST module and payment fails, the electronic device 900 may transmit payment information by using the NFC module. A method of recognizing that payment has failed may include a case where notification is received from the POS 740 or a third party (for example, financial institution) or a case where a specified time elapses. Embodiments are not limited to the order noted above, and a reverse or otherwise altered order is possible.

According to an embodiment of the present disclosure, the electronic device 900 may receive a request where a user deletes at least one card among pre-registered cards. The payment management module 931 may delete information corresponding to a corresponding card from the memory 130. The payment management module 931 may also request the payment server 720 to delete information corresponding to the at least one card.

According to an embodiment of the present disclosure, the payment management module 931 may check whether a card's holder is identical to a user who registers a card. The payment management module 931, for example, may include an ID&V module. The payment management module 931 may perform user authentication through an SMS, e-mail, automatic response system (ARS), or phone call. Additionally, authentication may be performed through an application issued by a card company or a bank. A card registered through the payment management module 931 may be used after authentication.

According to an embodiment of the present disclosure, the payment management module 931 may include an OCR module. The OCR module may obtain an image of characters written by a person or printed by a machine and convert the image of characters into machine readable characters. The electronic device 900 may obtain an image of a card owned by a user through a camera module. The OCR module may convert images, characters, or numbers written on the card in the card image into machine readable characters. The OCR module may obtain user's card information (for example, card number, user name, or expiration period) through the converted characters. The electronic device 900 may perform a card registration process by obtaining a user's card information through an OCR module.

According to an embodiment of the present disclosure, the payment management module 931 may display a barcode generated for payment through the display 160. For example, the payment management module 931 may receive a command for generating a barcode, through which payment is performed by using a barcode reader, from the POS 740. The payment management module 931 may generate a barcode based on the command.

According to an embodiment of the present disclosure, the server linkage module 933 may receive a payment related message, a device related message, or a service related message from the payment server 720 or the token service provider 630 or 730. The server linkage module 933 may deliver the message to the payment management module 931.

According to an embodiment of the present disclosure, the server linkage module 933, for example, may include a push management module and an account management module. For example, when a message received from the payment server 720 is in a token related push notification form, the push management module processes the received message, and when the received message is account related information (for example, Samsung account), the account management module may process the received message.

According to an embodiment of the present disclosure, the push management module may calculate and handle push notification or push message (for example, push notification or push message) information received from the payment server 720. The push message may be delivered to the server linkage module 933 in the payment application 930 through a payment relay module 941 in the payment manager 940 or 354, or may be directly delivered to the payment application 930. The payment manager 940 may include the payment relay module 941, a biometric information management module 943 and a security environment relay module 946. At least part of the delivered push message may be delivered to the payment management module 931 to update card related information and to be synchronized with the payment server 720.

According to an embodiment of the present disclosure, the payment server 720 may include an account server for managing account related information or a token requester server for providing payment related information. The account server and the token requester server may be implemented with an additional device (for example, the server 106) and be included in one device.

According to an embodiment of the present disclosure, message information received by a push management module, as shown in Table 1, may include token and payment related information such as authority setting (for example, token provisioning), suspension (for example, token suspension), discard (for example, token disposal), state switch (for example, token status change), additional issue (for example, token replenishment), and payment check (for example, transaction notification).

A message transmitted/received from/by an account management module may include at least part of electronic device related information such as lost electronic device check function (for example, lost device, find my mobile), remote shutdown (for example, remote lock/unlock), membership management (for example, loyalty/membership cards), and web linkage function (for example, website portal-online).

TABLE 1

| Push management | Use case | Details |
|---|---|---|
| token | token provisioning with ID&V | Download card information for identification, verification in order for token installation and authentication, from an external server to a push management module in an electronic device |
| | token suspension | Deliver it for stopping token use, from an external server to a push management module in an electronic device |
| | token resume | Deliver it for resuming token use, from an external server to a push management module in an electronic device |
| | token disposal | Deliver it for token disposal, from an external server to a push management module in an electronic device |
| | token status change | Deliver it for changing card state, from an external server to a push management module in an electronic device |
| | token replenishment | Deliver it for issuing an additional token, from an external server to a push management module in an electronic device |
| | transaction notification | Deliver a token payment history, from an external server (for example, a payment server) to a push management module in an electronic device |
| device | lost device (find my mobile) | Deliver lost history information between an external server (for example, a service server) and an account management module in an electronic device |
| | remote lock/unlock | Deliver a remote device blocking instruction between an external server (for example, a service server) and an account management module in an electronic device |
| | loyalty/membership cards | Deliver membership information between an external server (for example, a service server) and an account management module in an electronic device |
| | website (online) | Support a web linkage function between an external server (for example, a service server) and an account management module in an electronic |

According to an embodiment of present disclosure, when token provisioning ID&V information obtained by the payment management module is successfully delivered to an outside server through the payment server 720 and delivered token related information is valid, the message "push token {id} status changed" may be received by the server linkage module 933 and delivered to the payment management module 931.

According to an embodiment of the present disclosure, card information temporary suspension (for example, token suspension) information obtained from the payment management module 931 of the electronic device 900 may deliver a use suspension instruction of the payment server 720 to the payment application 930 so that it may change a card setting state for mobile payment from an active state to an inactive state.

According to an embodiment of the present disclosure, when the electronic device 900 is lost, the payment server 720 may delete or temporarily suspend all token information relating to the electronic device 900 stored in the payment server 720. The payment server 720 may transmit a push message in order to synchronize the deleted or paused information with the payment application 930. For example, the payment server 720 may deliver information necessary for the synchronization to the payment application 930 through the payment relay module 931 or the server linkage module 933 (for example, a push management module and an account management module).

Referring to Table 2, the content of a push API supported by an electronic device and the payment relay module 931 may be divided according to the payment relay module 931 and implemented separately.

TABLE 2

| API | Description | type | validation |
|---|---|---|---|
| device.push | contains push platform | Json | required |
| device.push.spp.id | Samsung push Id. | String | required |
| device.push.gcm.id | Google push Id. | String | optional |

According to an embodiment of the present disclosure, an account management module may deliver information such as user's unique identifier (for example, Samsung account id or device id), a card, or a membership, exchanged with the payment server 720, to the payment application 930, and the payment application 930 may manage the received information. The user's unique identifier may include a user subscribed account, an electronic device related portal account, or an electronic device's unique identifier (for example, MAC address, IMEI, serial number, universally unique identifier (UUID), or ID), and is provided in order to manage several company's cards (for example, Visa or MasterCard). Furthermore, the unique identifier may be a value generated from the payment server 720 through the account and received from the payment server 720.

The account management module may manage the registration, addition, deletion, duplicate registration, use suspension, or use resumption of a card by using the user's account or the electronic device identifier. Even when card information is imported/exported between an electronic device and a wearable device, the registration, addition, deletion, duplicate registration check, use suspension, or use resumption of a card may be managed based on the generated account or the electronic device identifier.

At this point, in relation to an account based management method, as a plurality of electronic devices or a plurality of users which or who share one account are managed, an electronic device specific unique account (for example, Samsung account) may be used or a plurality of electronic devices may be integrally managed by using one account.

According to an embodiment of the present disclosure, information on a first card (for example, Visa™) and a second card (for example, MasterCard™) which is generated through an optical character recognition module (for example, an OCR module) of the payment management module 931, may be registered based on an account (for example, registration02@samsung.com) generated when a user signs up for such an account. At this point, the registered information may be synchronized with the payment server 720 based on the generated account.

According to an embodiment of the present disclosure, membership information generated through a barcode interface may register a first card (for example, Samsung points card) and a second card (for example, CJ membership points card) based on the account (for example, registration02@samsung.com) generated when a user signs up for such an account. The registered information may be synchronized with the payment server 720 based on the generated account.

Additionally, a user may determine an active/inactive state of an account based card after logging into a payment application and deliver it to the payment server 720 by using the account management module 931, or may manage and switch an account based card state on a server management web page (for example, a server portal).

Additionally, the account management module may manage card information (for example, Visa™ card ID&V) and membership information (for example, CJ membership points and registraion001@Cj.com), which relate to a service account (for example, registration01@samsung.com), in linkage with a server. The membership information may automatically save or deduct during card payment, in linkage with payment processing information (for example, payment amount) and membership cumulative information (for example, points, mileages, and so forth).

Once a payment application including an account management module is installed, the account management method supports the use of the payment application with only a user's account log-in or sign-in process once at any device in continuous linkage with a setting state of the entire or part of an existing registered card. Additionally, the account management method may reduce an additional authentication process as membership information having a relatively low authentication security level is registered and linked based on the account.

Returning to FIG. 9, the authentication module 935 may display a UI for performing the authentication of a card or a user for payment through the display 160. The authentication module, for example, may include a biometric information module.

According to an embodiment of the present disclosure, the biometric information module may obtain a user's biometric information. The user's biometric information, for example, may include fingerprint, iris, face image, voice, heart rate, or blood pressure information. An electronic device may obtain a user's biometric information through a sensor module. For example, an electronic device may obtain a user's fingerprint information through a fingerprint sensor. Alternatively, an electronic device may obtain a user's iris information through a camera module. The biometric information module may display a UI for obtaining user's biometric information through the display 160.

According to an embodiment of the present disclosure, when a user attempts to process payment by using card information registered in an electronic device, the biometric information module may perform authentication in order to obtain security data (for example, a token) from a security memory (for example, eSE or memory accessible from security environment) functionally connected to the electronic device. The electronic device may obtain a user's biometric information (for example, fingerprint or iris) through the biometric information module in order for user authentication. The obtained biometric information may be delivered to the biometric information management module 943 of the payment manager 940. According to an embodiment of the present disclosure, the security memory may be a memory storing data with an encrypted key.

According to an embodiment of the present disclosure, the biometric information module 943 may process a payment by using card information and biometric information, which are registered in an electronic device, when a user processes an electronic payment on an internet webpage. A user may perform authentication in order to obtain security data (for example, a token) from a memory or security module (for example, eSE or memory accessible from security environment), which are functionally connected to an electronic device. When the user authentication progresses successfully, the electronic device may link the progressed authentication information with an external server to provide a fast auto authentication (for example, fast identity online (FIDO)) without an electronic payment process on an additional internet webpage. That is, the electronic device may process fast authentication by linking an authentication process necessary for online payment with the biometric information module 943.

According to an embodiment of the present disclosure, an electronic device may specify a user's fingerprint and a card for payment. For example, when performing authentication in payment application by using a fingerprint, a user may specify the right thumb for Visa™ and the right index finger for MasterCard™ and the electronic device 900 may classify information types according to user authentication and based on this, support payment with a related card.

According to an embodiment of the present disclosure, the peripheral device management module 937 may manage an external device functionally connected to an electronic device. The peripheral device management module 937 may include an MST peripheral device module and a wearable device module.

According to an embodiment of the present disclosure, the MST peripheral device module may check whether there is a wired/wireless connection between an MST accessory (for example, a fob form device from LoopPay™) and an electronic device and based on this, provide a UI appropriate for a user. When the MST accessory is connected, the UI may output information relating to a progress of a card registration, deletion, or payment process. When being connected to the MST accessory, the MST peripheral device module may store a variety of card information necessary for payment in an additional memory in an electronic device or the MST accessory. This allows the electronic device or the MST accessory to process payment independently when it is not connected to the MST accessory.

The wearable device module may check whether there is a wired/wireless connection between a wearable device (for example, a watch, headset, glasses, or ring) and an electronic device and based on this, provide a UI appropriate for a user. The wired/wireless connection may include various interface connections such as BT, BLE, WiFi, Zigbee, or Z-wave and may be implemented by applying a specific accessory protocol (for example, Samsung accessory protocol (SAP)). When a wearable device is connected, the UI may output information relating to a card registration, deletion, or payment execution process. During the card registration, deletion, or payment execution process, the wearable device module may output whether a short-range based session with a wearable device is established, transmit/receive a user input value on the electronic device or the wearable device, and display a transmission/reception result. The user input may include a variety of card information necessary for payment and additional authentication information other than that (for example, personal identification number (PIN), user unique pattern related data, fingerprint recognition related data, and a touch input value of a wearable device's bezel unit or the display 160).

According to an embodiment of the present disclosure, the electronic device may share one payment information with a wearable device or an accessory. For example, information on one Visa™ card may be stored in both the wearable device and the electronic device. According to an embodiment of the present disclosure, the electronic device may store different card information, which are generated from one card information, in each of the wearable device and the accessory. For example, one of different tokens issued from one Visa™ card information may be stored in the electronic device and the other one may be stored in the wearable device.

According to an embodiment of the present disclosure, when one of different tokens issued from one card information is stored in the electronic device and the other one is stored in the accessory or the wearable device, as a payment module of one device is activated, a payment module of another device may be deactivated. For example, when one of different tokens issued from one Visa™ card information is stored in the electronic device and the other one is stored in the accessory or the wearable device, as payment is processed by the wearable device, the payment of the electronic device may be deactivated. Furthermore, when payment is processed by the electronic device, the payment of the wearable device may be deactivated.

Returning to FIG. 9, the payment relay module 941 may relay a card or information (for example, a token) corresponding to the card to a payment application, a kernel, or the payment server 720. The payment relay module 941 may process an offline payment through a communication module (for example, an NFC module and an MST module). A payment method using NFC may be executable through a POS and a payment method using MST may be executed by a user input. Additionally, the payment relay module 941 may process on-line payment through a communication module (for example, a cellular module, RF module, WiFi module, and so forth).

According to an embodiment of the present disclosure, the payment relay module 941 may manage (for example, manage a card/token lifecycle) a state of a card or information (for example, a token) corresponding to the card. The payment relay module 941 may provide at least one API relating to payment to the payment application 930.

According to an embodiment of the present disclosure, the payment relay module 941 may further include system service interfaces for providing an interface provided by system services relating to at least one payment, payment service for accessing a payment module, Trustzone-based integrity measurement architecture (TIMA) for kernel integrity authentication, fingerprint recognition result views (for example, supporting both security and non-security mode), and a security UI for PIN or PAN. The payment relay module 941 may include an encryption library in order to deliver a message or an instruction to the TEE 920. The payment relay module 941 may also exchange a message or an instruction with the TEE 920 through the encryption library.

According to an embodiment of the present disclosure, the payment relay module 941 may process a card management function for providing functions of card addition, deletion, and update as a general card management function. The payment relay module 941 may include a first payment SDK or a second payment SDK. The first payment SDK (for example, Samsung SDK) may be embedded in an electronic device. The second payment SDK may be provided from a card company or a bank, and may be installed on the electronic device. The payment relay module 941 may select a corresponding payment SDK according to card information by using the first payment SDK or the second payment SDK. Additionally, it may set a default card or another card other than the default card.

According to an embodiment of the present disclosure, the payment relay module 941 may transmit, to the payment server 720, as a general token and key management function, a message of an initial authority setting (for example, token provisioning), an additional issue (for example, token replenishment), suspension (for example, token suspension), resume (for example, token resumption), and disposal (for example, token disposal).

Returning to FIG. 9, the TEE 920 may include a payment module 921, a security identifier processing module 923, a biometric information module 925 and an MST driver module 927. According to an embodiment of the present disclosure, the payment module 921 may obtain a token and a token cryptogram from an electronic device or an external other electronic device. A key (for example, a limited use key (LUK) or single use key) for generating the token and the token cryptogram may be stored in the REE 910 or the TEE 920. Furthermore, when the token and the key are stored in the REE 910, the payment module of the TEE may encrypt or store them by using a key (for example, a device root key (DRK)) of the TEE 920. When the electronic device processes payment, the payment relay module 941 may obtain the encrypted token in a decrypted state through a payment module. When a key or a token for generating the token cryptogram is stored in the TEE, the electronic device may store it in an encrypted form by using the key of the TEE.

According to an embodiment of the present disclosure, the payment relay module 941 may receive a push message from the token service provider (TSP) 630 or 730 and deliver it to the payment application 930.

According to an embodiment of the present disclosure, when the first payment SDK provided from a card company or a bank provides a self-token management function, upon the receipt of a token management function request, the payment relay module 941 may further include a function for relaying it to the second payment SDK. For example, a payment relay module, which obtains a token or a key by using the SDK of a Visa' card, may deliver it to the payment module in the TEE 920. According to an embodiment of the present disclosure, the payment relay module 941 may further include, on a payment framework, a host card emulation function for allowing a virtual card to be used in an electronic device without an additional hardware device (for example, a secure module or a secure element (SE)) during payment. The HCE function may deliver a token and a token cryptogram through a communication module (for example, NFC) by using a POS related message standard (for example, application protocol data unit (APDU)).

According to an embodiment of the present disclosure, the payment relay module 941 may include a function for processing a message received from a POS. The POS related message processing function may include a function for managing payment data to respond to the POS. The POS related message interpretation function may further include a function for relaying the POS related message to the first payment SDK when the first payment SDK provides a self POS related message processing function. According to an embodiment of the present disclosure, the payment relay module 941 may include at least one database for storing the card data, token data, or transaction data.

According to an embodiment of the present disclosure, the payment relay module 941 may select one of a payment method using NFC and a payment method using MST. For example, the payment relay module 941 may select one of a method of performing payment by using NFC first and then using MST, a method of performing payment by using MST first and then using NFC, and a method of performing payment by using both NFC and MST. According to an embodiment of the present disclosure, after performing payment through one communication module and then through another communication module, if there is no response to a result from the one communication module that performs the payment first or a specified time elapses, the payment relay module 941 may perform the payment through the other communication module.

According to an embodiment of the present disclosure, when having both a token and PAN information for one card, the payment relay module 941 may perform payment by using at least one of the information. The payment relay module 941 may check whether payment is completed at a POS with the PAN or the token. For example, the electronic device may receive payment available information through BLE, and the payment relay module 941 may check the information. When payment is possible with a token based on the confirmed information, the payment relay module 941 may perform the payment with the token and when the payment is possible with a PAN, perform the payment with the PAN.

According to an embodiment of the present disclosure, the payment relay module 941 may further include a SDK provided from the payment network. The SDK may include token management, POS related message processing, or a token/card database.

According to an embodiment of the present disclosure, the security environment relay module 946 may further include a function for performing a relay to allow payment information to access a biometric information driver module 951 or a security environment driver module 953 in order to use functions provided from the payment module 921 or the biometric information module 925. The kernel 950 may include the biometric information driver module 951 and the security environment driver module 953. The payment relay module 941 may include an encryption library in order to deliver a message or an instruction to the security environment relay module 946. The payment relay module 941 may exchange a message or an instruction with the security environment relay module 946 through the encryption library.

According to various embodiments of the present disclosure, the payment manager 940 may further include the security environment relay module 946 connected to allow a function of a security identifier processing module in TEE to be used in a payment application.

According to an embodiment of the present disclosure, the payment relay module 941 may include a function for relaying an authentication request through a PIN input of the payment application 930 to the security identifier processing module 923 in the TEE 920.

General applications may obtain a result regarding whether fingerprint recognition is successful or unsuccessful at the fingerprint recognition request. Security payment application (for example, payment trusted app) may obtain a secure biometric result (for example, a secure fingerprint result). The secure biometric result may be in an encrypted form by combining with a one-time random number and whether it is successful/unsuccessful. The one-time random number may be encrypted through a hardware key (for example, a DRK).

According to an embodiment of the present disclosure, the payment relay module 914 may deliver a message for payment processing to the payment module 921 through the security environment driver module 953 in order to perform payment. The payment module 921 may notify the payment relay module 941 that an authentication operation is necessary, through the security environment driver module 953. The payment relay module 914 may issue an instruction to the biometric sensor 240I to obtain biometric information through the biometric information management module 943 and the biometric information driver module 941, in order for an authentication operation. Furthermore, the payment relay module 914 may deliver an authentication check message to the biometric information module 925 in the TEE 920 through the biometric information management module 943 and the security environment driver module 953.

The biometric sensor 240I may be obtained from the biometric information module 925 in the TEE 920. The biometric information module 925 may check whether the user is the same as a permitted user by comparing the user's biometric information and information obtained from a biometric sensor. Based on the confirmed information, the biometric information module 925 may deliver whether the user is authenticated to the biometric information management module 943 through the security environment driver module 953, and the biometric information management module 943 may deliver it to the payment relay module 941. The payment relay module 941 and the biometric information management module 943 may be configured as one or may be configured as separate modules.

According to an embodiment of the present disclosure, the payment relay module 941 may perform authentication through an external device. For example, the electronic device 900 may request an authentication on biometric information (for example, fingerprint or iris) from the payment server 720 (for example, a Samsung account server or a token requester server). The payment server 720 may perform an authentication on a user's biometric information and deliver a corresponding result to the electronic device 900. When the authentication is completed, the payment relay module 941 may deliver data including information on the completed authentication to the token service provider and perform a token provisioning process. Furthermore, when the authentication is completed according to the authentication result, the electronic device may perform payment and if the authentication is not completed or is not successful, may not perform payment.

Returning to FIG. 9, the biometric information driver module 951 may deliver a message, which is delivered from the biometric information management module 943 of the payment manager 940, to the biometric sensor 240I. Biometric information obtained from a biometric sensor may not be delivered to a module in the REE 910 but may be delivered to the biometric information module 925 in the TEE 920.

According to an embodiment of the present disclosure, the security environment driver module 953 may serve as an interface for delivering information from a module in the REE 910 to a module in the TEE 920. For example, in the case of Trustzone of ARM that is one embodiment of the TEE, when performing an operation of the REE and TEE by time division, an application processor may implement an additional data path for delivering a message from the REE to the TEE in terms of hardware. In this case, a driver module for accessing this hardware may be the security environment driver module 953. The security environment driver module 953 may deliver a message on an operation of a module in the TEE to a module in the REE.

The electronic device may store data requiring a relatively high security in a safe environment through the TEE 920 and perform a related operation. In relation to the TEE 920, a reliable TEE, which operates on an application processor of an electronic device and is determined during a manufacturing process of an electronic device, may refer to a security area in such an electronic device. The electronic device may operate data requiring a relatively high security through TEE based on a safe hardware structure. The TEE may divide an application processor and a memory area into a general area and a security area and operate them both. Furthermore, it may allow software or hardware requiring security to operate only in a security area. When an electronic device is required to perform an operation relating to sensitive information, it may access the TEE 920 only through APIs and drivers accessible to the TEE 920. The TEE 920 may hand over limited data on related information to the REE. The TEE may encrypt internally stored data through a hardware key (for example, a DRK). Data in the TEE may not be interpreted in the REE if there is no additional decryption process.

In relation to the TEE 920, an application (for example, security application (for example, trusted application) or a payment module) in the TEE may deliver a message to another electronic device (for example, the token service provider 630 or 730) outside an electronic device.

According to an embodiment of the present disclosure, the TEE may include trusted OS and security applications (for example, trusted applications). Furthermore, it may include a security related encryption module and a driver for collecting data from security required hardware. Security application (for example, trusted application) may include a payment module. Furthermore, payment information may be delivered to the outside through a communication module. For example, payment information may be transmitted to an MST controller through an MST driver or to an NFC controller through an NFC driver in order to transmit to a POS.

According to an embodiment of the present disclosure, it is checked whether integrity on the REE is provided. An electronic device may store whether integrity on an image in the REE is provided in the TEE 920. In the case of REE booting supporting TEE, when a boot loader is executed, the order of booting may be to boot the TEE first and then the REE. If the TEE is booted, integrity information of the REE in the TEE is checked and provided to a user after REE booting. According to an embodiment of the present disclosure, if an image of the REE is damaged by hacking or routing, it is determined that there is an issue in the integrity. If there is an issue in the integrity, the TEE may not be accessed. For example, when the payment relay module 941 is to deliver a message or an instruction to the TEE through the security environment driver module 953, the kernel in the TEE may ignore the message or the instruction or refuse the message reception.

According to an embodiment of the present disclosure, the payment module 921 may be an application installed from a bank or a card company (for example, Visa™ or MasterCard™). There may be one or more payment modules 921. When a user of an electronic device accesses the payment server 720 (for example, a mobile application platform, payment gateway, token requestor, token service provider, trusted service manager, or bank server) or the token service provider 630 or 730 via internet by using the payment management module 931, and it is approved that the payment module 921 is installed, the token service provider may perform an installation related operation. For example, the payment management module 931 may perform a card registration operation for installing the payment module 921 on the server by obtaining the card number and expiration period information of a plastic card through OCR. By receiving an installation file in connection to the token service provider 630 or 730 in a network through the payment relay module 941 having connection information of each token service provider 630 or 730 according to a card/bank company, the payment relay module 941 may install the payment module 921 by delivering the information to the TEE. Such a process may be called a provisioning process or a card registration process. The payment module 921 in the TEE may be several modules. Each payment module may not exchange data in the TEE, and may be configured in a separated form.

According to an embodiment of the present disclosure, the payment module 921 may be an application used for data communication with the payment server 720. The payment module may include information on credit cards, debit cards, and membership cards. The payment module may exchange communication with another internal or external electronic device through encryption. The encryption process may vary according to a card manufacturer that delivers the payment module. The server may control a state of the payment module. For example, the server may activate, temporarily suspend, resume, or delete the payment module.

According to an embodiment of the present disclosure, the payment module 921 may store information relating to card information. For example, it may be at least one of a token corresponding to the card information (for example, a PAN), token reference ID, part of a PAN, PAN product ID, token requestor ID, token assurance level, token assurance data, expiration period of a token, encryption key, and value (for example, one time password (OPT)) provided from the token service provider 630 or 730. The token may be controlled by a state of the token service provider 630 or 730. For example, the token may be activated, temporarily suspended, resumed, or deleted. The token may be static information basically corresponding to card information (for example, a PAN).

According to an embodiment of the present disclosure, when performing payment, the payment module 921 may determine a card for payment. For example, a payment module corresponding to a card selected by a user may be determined in at least one payment management module 931 according to a user's selection. The payment management module may deliver the determined card to the payment relay module 941. The payment relay module may deliver the determined card information to the payment module 921 through the security environment driver module 953. The payment module may manage a list of cards for actual payments in holding card information. Based on the determined card information, the list of cards for actual payment may be changed. The change may be increasing the priority in the card list with respect to the determined card information or deleting other card information other than the determined card information.

According to an embodiment of the present disclosure, when performing payment, based on card information related information, a payment module may create information used for payment. Information used for payment, as shown in Table 3, may be a token, token reference ID, part of a PAN, a product ID, token requestor ID, token assurance level, token assurance data, expiration period of a token, token cryptogram, POS entry mode, and token requestor indicator.

TABLE 3

| Field Name | Comment |
| --- | --- |
| payment token | The payment token number refers to a surrogate value for a PAN that is a 13 to 19-digit numeric value that passes basic validation rules of an account number, including the Luhn determination digit. Payment tokens are generated within a BIN range or card range that has been designated as a token BIN range and flagged accordingly in all appropriate BIN tables. Payment tokens are generated such that they will not have the same value as or conflict with a real PAN.<br>Transaction messages<br>The payment token number will be passed through the authorization, capture, clearing, and exception messages in lieu of the PAN.<br>The payment token number may optionally be passed from the token service provider to the card issuer as part of the authorization request. |
| token expiry date | The expiration date of the payment token that is generated by and maintained in the token vault. The token expiry date field carries a 4-digit numeric value that is consistent with the ISO 8583 format.<br>Transaction messages<br>The token expiry date is passed in lieu of PAN expiry date.<br>The value is replaced by the token service provider with the PAN expiry date which is passed to the card issuer as part of the authorization request. |
| last 4 digits of PAN | The last four digits of the PAN to be provided optionally through the acquirer to the merchant for customer service usage, such as being printed on the consumer receipt. |
| PAN product ID | The last four digits of the PAN to be provided optionally through the acquirer to the merchant for customer service usage, such as being printed on the consumer receipt. |
| PAN product ID | The PAN product ID is an optional identifier used for determining the type of card product that was tokenized. It may be included in cases where transparency of this information is necessary.<br>Transaction messages<br>The PAN product ID may optionally be passed from the token service provider to the acquirer as part of the authorization response. |
| POS entry mode | This specification uses the POS entry mode field to indicate the mode through which the payment token is presented for payment. Each payment network will define and publish any new POS entry mode values as part of its existing message specifications and customer notification procedures.<br>Transaction messages<br>POS entry mode is an existing field that will be passed through the authorization, capture, clearing, and exception messages. |
| token requestor ID | This value uniquely identifies the pairing of token requestor with the token domain. Thus, if a given token requestor needs tokens for multiple domains, it will have multiple token requestor IDs, one for each domain. It is an 11-digit numeric value assigned by the token service provider and is unique within the token vault:<br>Positions 1-3: token service provider code, unique to each token service provider<br>Positions 4-11: assigned by the token service provider for each requesting entity and token domain<br>Transaction messages<br>Token requestor ID can be optionally passed through the authorization, capture, clearing, and exception messages. |
| token assurance level | Token assurance level is a value that allows the token service provider to indicate the confidence level of the payment token to PAN/cardholder binding. It is determined as a result of the type of ID&V performed and the entity that performed it.<br>The token assurance level is set when issuing a payment token and may be updated if additional ID&V is performed. It is a two-digit value ranging from 00 which indicates the payment token has no ID&V that has been performed, to a value of 99 indicating the highest possible assurance. The specific method to produce the value is defined by the token service provider. |

TABLE 3-continued

| Field Name | Comment |
| --- | --- |
| | Transaction messages
Token assurance level will be provided by the token service provider.
The value may be optionally passed to the card issuer as part of the authorization request.
The value may optionally be passed to the acquirer/merchant in the authorization response, capture, clearing, and exception processing messages. |
| token assurance data | This data provided by the token service provider contains supporting information for the token assurance level.
Transaction messages
This data may be optionally passed to the card issuer as part of the authorization request. |
| token cryptogram | This cryptogram is uniquely generated by the token requestor to validate authorized use of the token. The cryptogram will be carried in different fields in the transaction message based on the type of transaction and associated use case:
NFC contactless transactions will carry the token cryptogram in existing chip data fields.
Other transactions, such as those originating from a digital wallet, may carry the token cryptogram in an existing field.
Transaction messages
The token cryptogram will be passed in the authorization request and validated by the token service provider and/or the card issuer. |
| token request indicator | An indicator used to indicate that the message is intended to authenticate the cardholder during a payment token request. |

According to an embodiment of the present disclosure, the payment module 921 may receive a key (for example, a LUK or a single use key) for generating token cryptogram through the token service provider 630 or the payment server 720 (for example, a payment service server or a token requester server). The key may be received through a data network or SMS.

The key may be exchanged between an electronic device and the token service provider through a secure channel. The secure channel may be a logical channel that encrypts data that is exchanged by an additional key (for example, a method of using public key and private key) other than the key. Furthermore, it may include a module that generates a key for generating a token cryptogram in the payment module. The electronic device may receive a module for generating the key through the token service provider or the payment server. Alternatively, it may be included during a manufacturing process of the electronic device.

According to an embodiment of the present disclosure, a payment module may generate a token cryptogram by using a key (for example, a limited use key or single use key) for generating the token cryptogram. A payment module may use a different key according to a predetermined rule such as each transaction, transactions of a specific number of times, or transactions within a certain time. The token service provider may own a key paired with the above key. The token service provider may decode the encrypted token cryptogram through the above pair of keys.

According to an embodiment of the present disclosure, the payment module 921 may generate token cryptogram by using a key for generating the token cryptogram. Specific details are described later with reference to FIG. 11.

According to an embodiment of the present disclosure, when performing payment, the electronic device 900 may deliver a message that the payment is processed in the payment application to the payment relay module 941. The payment relay module 941 may determine whether to process the payment by using MST or NFC. When the payment is processed by MST, information necessary for a payment process (for example, a token, token cryptogram, part of PAN information, token expiration period, and so forth) may be obtained from a payment module in the TEE and delivered to the MST driver module 927 in the TEE. The MST driver module 927 may deliver the information to an MST controller. The MST controller may transmit the information in order for a payment process.

According to an embodiment of the present disclosure, when payment is processed by NFC, the electronic device 900 may transmit the information necessary for a payment process to an NFC driver module in the TEE. The NFC driver module may deliver the information necessary for a payment process to an NFC controller. The NFC controller may perform payment based on the information.

According to an embodiment of the present disclosure, in a case where payment is processed by NFC, when a specified message is delivered from a POS, the electronic device 900 may perform the payment. For example, when a specified message is delivered from a POS and detected by an NFC module, an NFC controller may deliver this to an NFC driver module. The NFC driver module may notify the payment relay module 941 in the REE that the message is delivered from the POS. The payment relay module 941 may generate a token cryptogram for performing payment. The token cryptogram may be generated from the payment module 921 in the TEE by using a key (for example, a limited use key or single use key) for generating a token cryptogram. The generated token cryptogram may be delivered to the REE. The payment relay module 941 may deliver payment related information including the token and token cryptogram through a network module (for example, an NFC related host card emulation). The network module may deliver the payment related information to a POS through an NFC module.

According to an embodiment of the present disclosure, the payment module 921 may deliver, to an external electronic device, information including the token, token expiration period, token requester ID, and token cryptogram. For example, the payment module 921 may deliver the payment information to a POS through an MST communication module. Furthermore, the payment module 921 may deliver payment information to the POS through an NFC communication module.

According to an embodiment of the present disclosure, the payment module 921 may transmit/receive specified information to/from a POS during a payment operation. In the case of NFC, it may perform a payment operation by receiving information from a POS first. In the case of MST, based on a user's explicit input or an algorithm in an electronic device, payment related information including token and token cryptogram may be transmitted to a POS.

According to an embodiment of the present disclosure, the biometric information module 925 may store biometric information of a user using an electronic device and by comparing it with information received from a biometric sensor, may authenticate the user. The biometric information module 925 may include a fingerprint information module and an iris information module. The biometric information module may collect information from the biometric sensor 240I. When payment application displays content to authenticate a user's biometric information on the display 160, a user may deliver biometric information through a biometric sensor. An authentication module of the payment application may deliver a message for collecting biometric information to the biometric information driver module 951 through a biometric information management module. The biometric information driver module 951 may deliver the message to a biometric sensor. The biometric sensor may collect biometric information and deliver it to the TEE. A biometric information module in the TEE may report whether the user is authenticated after comparing the delivered biometric information with the stored user's biometric information, to an authentication module of a payment application through a security environment driver module and a biometric information management module in the REE. The payment application may display whether the user is authenticated on a display. The user's biometric information may be stored in the TEE, or stored in an encrypted state in the REE, or stored in the security module 236 (for example, eSE).

According to an embodiment of the present disclosure, the security identifier processing module 923 may obtain an input value, which is necessary from an electronic device or relates to a payment related authentication, through a user input. For example, the input value may be a PIN during a payment process. Furthermore, the input value may be card related information. For example, it may be a primary account number, expiration date, or card verification value (CVV). Furthermore, it may be a Chip PIN or an automated teller machine (ATM) PIN.

The security identifier processing module 923 may be provided in an application form. A graphic library necessary for drawing an application of the security identifier processing module 923 on a screen may be stored in the TEE 920. A graphic library stored in the TEE may be different from that in the REE 910. The security identifier processing module 923 may perform user authentication by an input value such as PIN, and deliver its result to the payment management module 931 through the payment relay module 941. According to an embodiment of the present disclosure, the security identifier processing module 923 may receive a one-time random number (for example, nonce) delivered from the security environment relay module 946 through the security environment driver module 953. The security identifier processing module 923 may encrypt the input value obtained from the user input and the one-time random number by using an encryption key (for example, a device root key) in the TEE and deliver the encrypted information to the security environment relay module 946. The security environment relay module 946 may deliver the encrypted input value and one-time random number to the payment module 921 through the security environment driver module 953. The payment module 921 may decode the input value and one-time random number by using a hardware key in the TEE. The payment module 921 may check that the input value delivered through the REE has integrity by using the fact that the generated value and the received value of the one-time random number are the same. Based on that, the input value is determined to have integrity and the payment module 921 may perform user authentication through an input value. The payment module 921 may then perform payment through the user authentication.

According to an embodiment of the present disclosure, a factory reset is an operation for restoring a software image of an electronic device to a state in which it is shipped from an existing factory. The operation may be performed through an application by a user's explicit operation. Furthermore, under a specified condition (for example, if it is determined that the system is hacked), a monitoring module may perform a factory reset by determining the hacking occurrence. In a case that the operation is performed, since data stored in an electronic device is reset, user's payment related information may be reset also. The payment related information may be stored in the payment server 720. When a user accesses the payment server 720 based on an account, the electronic device 900 may perform card registration and an operation for installing a payment module based on the payment related information. When reset, a payment related module stored in an electronic device may notify it to the token service provider through the payment server 720 in order for deactivation. When the network of the electronic device is deactivated, the notification operation may not be performed. In this case, after performing factory reset, an electronic device may access the payment server 720 based on an account. The electronic device 900 may check a pre-registered card list through the payment server 720 and deactivate a card module or a token of an electronic device pre-registered in the token service provider. Furthermore, based on a card list of the payment server 720, an electronic device may receive a payment module or a token by performing card registration again.

Figure 10:
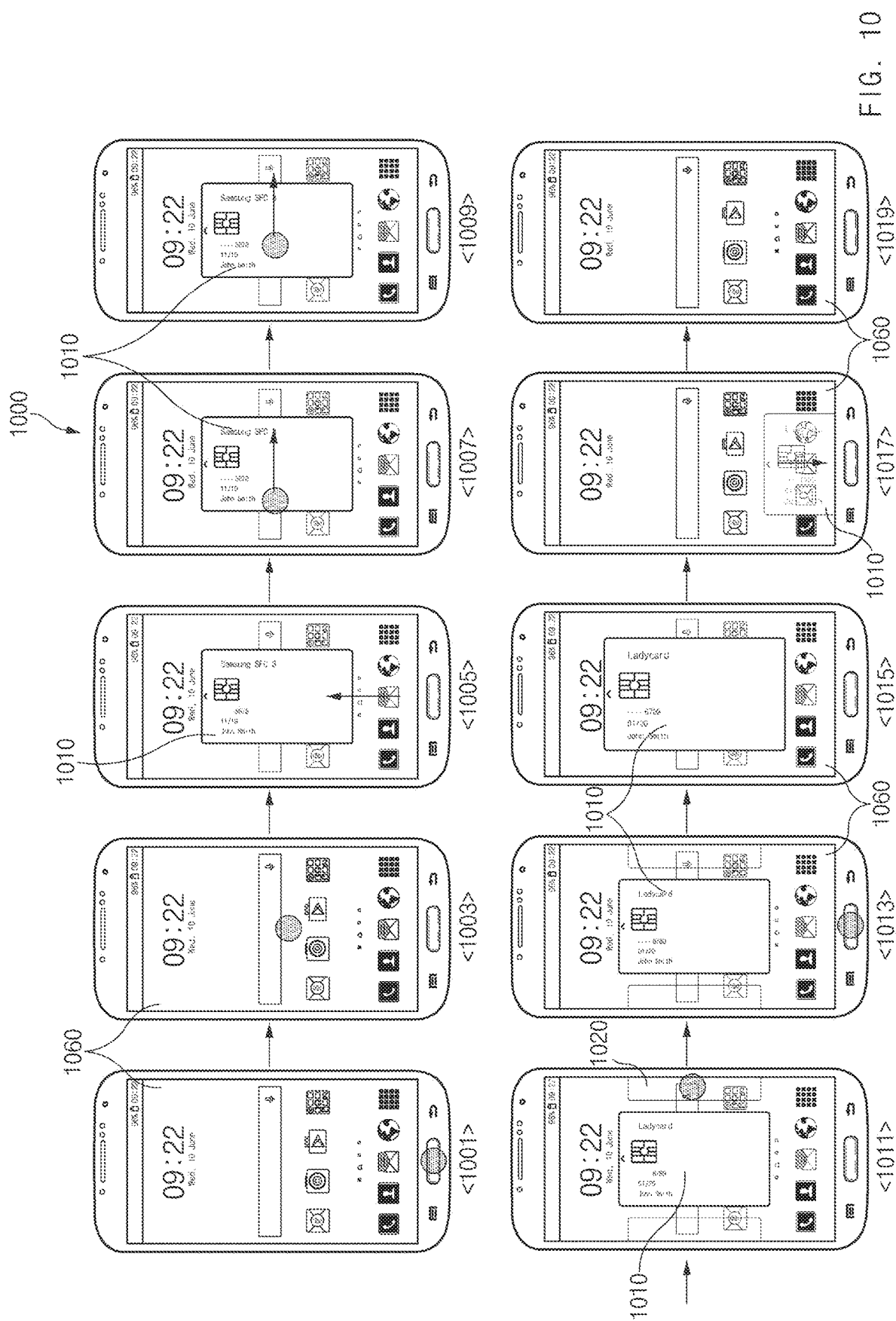
FIG. 10 is a display of multiple views illustrating a payment user interface of an electronic device according to various embodiments of the present disclosure.

FIG. 10 is a display of multiple views illustrating a payment user interface of an electronic device according to various embodiments of the present disclosure.

Referring to FIG. 10, an electronic device 1000 may execute a payment application by receiving a user input. For example, as shown in a state 1001 and a state 1003, when a user input swiping from a lower end bezel area of the electronic device 1000 toward a display direction occurs, the electronic device 1000 may execute a payment application (for example, Samsung pay). In response to the user input, the electronic device 1000, as shown in a state 1005, may display at least one card 1010 among cards pre-registered in the electronic device 1000, through a display 1060.

According to an embodiment of the present disclosure, the electronic device 1000 may select a card to be used for payment among a plurality of pre-registered cards by receiving a user input. For example, the electronic device 1000, as shown in a state 1007 or a state 1009, may allow a user to select a card to be used for payment among a plurality of cards through a user input scrolling to the left/right. Alternatively, the electronic device 1000, as shown in a state 1011, may output a partial image 1020 relating to another card in an area adjacent to the card 1010 and when the partial image 1020 is selected, allow a user to operate a card corresponding to the selected image.

The electronic device 1000, as shown in a state 1013, may request authentication from a user in order for payment using the selected card. An authentication method, for example, may use a user's biometric information. For example, an electronic device may perform a payment operation by scanning a user's fingerprint through a fingerprint detection module. When the payment is in progress or in standby, the electronic device 1000, as shown in a state 1015, may display the card 1010 on the display 1060. When a payment cancel event (for example, a swipe event or a back key event for removing the card 1010) occurs, as shown in a state 1017, the electronic device 1000 may remove the card 1010 from the display 1060. As the card 1010 is removed, the electronic device 1000, as shown in a state 1019, may output a screen where the card 1010 is removed.

Figure 11:
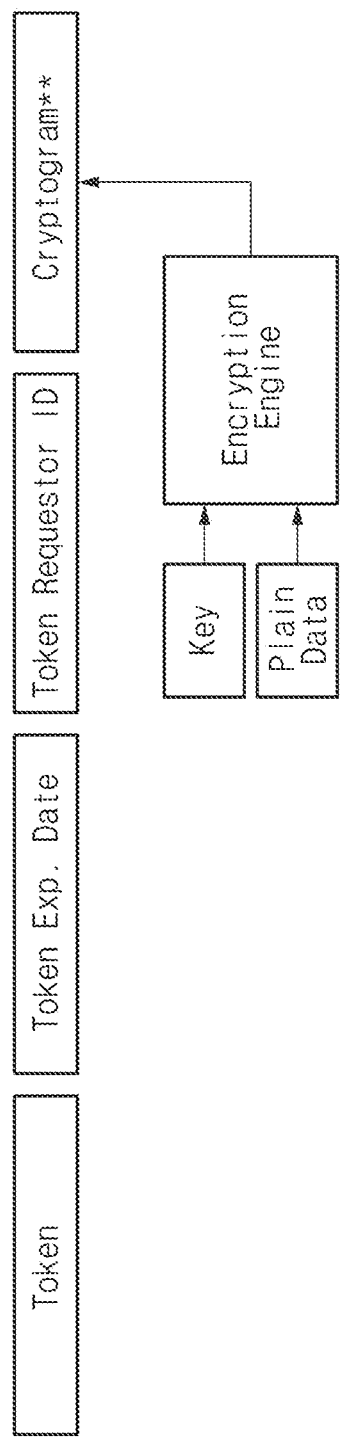
FIG. 11 is a block diagram illustrating a token cryptogram generating method according to various embodiments of the present disclosure.

FIG. 11 is a block diagram illustrating a token cryptogram generating method according to various embodiments of the present disclosure.

Referring to FIG. 11, a payment module (for example, the payment module 921) may generate a token cryptogram by using a key for generating the token cryptogram. A payment module may use a different key according to a predetermined rule such as each transaction, transactions of a specific number of times, or transactions within a certain time. The token service provider 630 or 730 may own a key paired with the above key. The token service provider may decode the encrypted token cryptogram through the above pair of keys.

When the payment module generates a token cryptogram by using the key, data encrypted by a key and an encryption engine may vary according to an encryption method (for example, AES, TKIP, and so forth).

Figure 12:
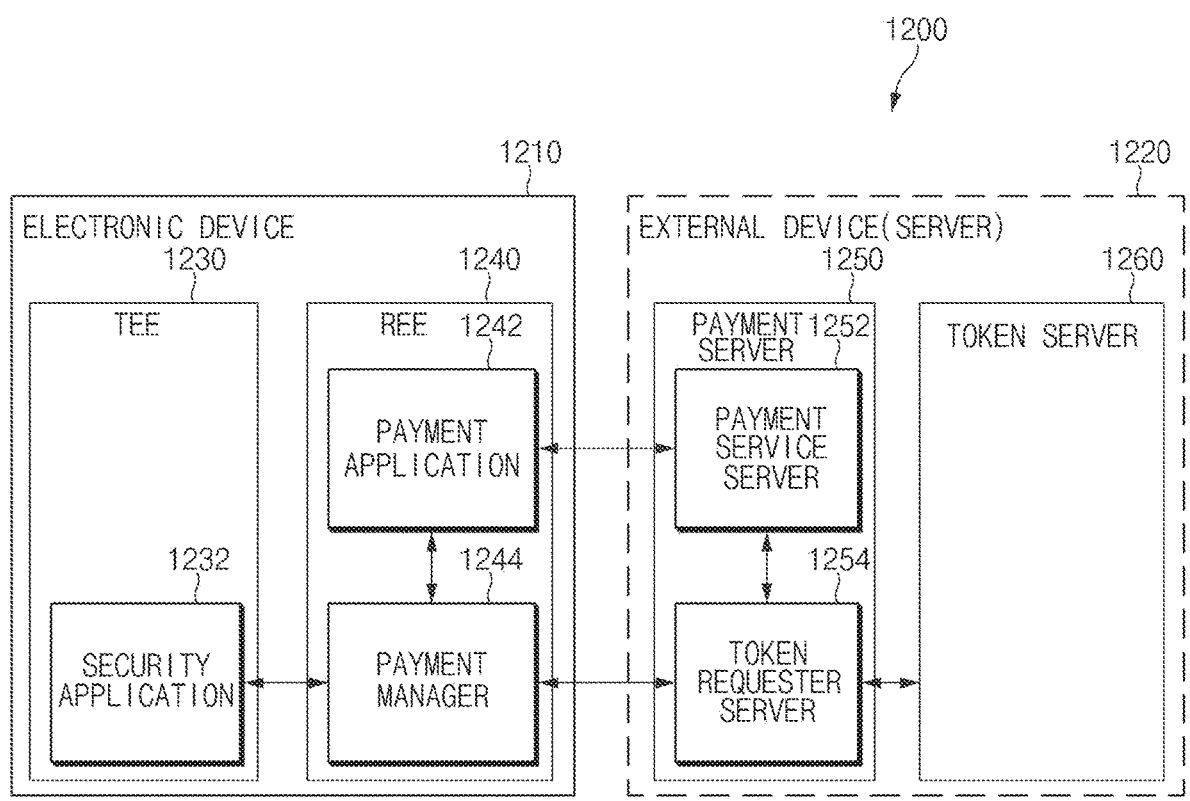
FIG. 12 is a block diagram illustrating a payment system according to various embodiments of the present disclosure.

FIG. 12 is a block diagram illustrating a payment system according to various embodiments of the present disclosure.

Referring to FIG. 12, a payment system 1200, for example, may include an electronic device 1210 and/or an external device 1220 (for example, a server). The electronic device 1210, for example, may include a trusted execution environment (TEE) 1230 and/or a rich execution environment (REE) 1240. The external device 1220, for example, may include a server, and the server, for example, may include a payment server 1250 and/or a token server 1260. The payment server 1250, for example, may include a payment service server 1252 or a token requester server 1254.

According to various embodiments of the present disclosure, the TEE 1230 may include a security system relating to the electronic device 1210. For example, the electronic device 1210 may protect information included or stored in the TEE 1230 from a control relating to an external request, modification, or input by using the TEE 1230.

According to an embodiment of the present disclosure, the TEE 1230, for example, may include a security enhanced program mode. For example, a normal world may be distinguished from a secure world by using the TEE 1230. The normal world may be referred to as the REE 1240. Additionally, the TEE 1230, for example, may execute reliable applications or manage encrypted information. For example, the encrypted information may include token or key information.

According to an embodiment of the present disclosure, the TEE 1230 may protect the encrypted information from the outside. The token or key information may be used for encrypting card information. For example, in providing card information to a device for payment, in relation to the token or key information, at least part of the card information may be changed and provided instead of directly providing the card information to the device for payment. In changing the card information, the token or key information may be used. The key, for example, may be obtained from a service provider that provides payment service. Additionally, the key may be managed by the electronic device 1210 or the server. According to an embodiment of the present disclosure, the TEE 1230 may include a security application 1232 (for example, a trusted application). The TEE 1230, for example, may provide an environment in which the security application 1232 is executable.

According to various embodiments of the present disclosure, the security application 1232, for example, may include information relating to a card company included in the TEE 1230. The information relating to the card company, for example, may include an application relating to the card company and the application may be provided in a packaged form. The packaged form may be provided as a SDK.

According to various embodiments of the present disclosure, the security application 1232, for example, may include an application or an applet, which is required to be executed in a security enhanced mode such as the TEE 1230. Additionally, the security application 1232, for example, may include an encryption related function. For example, the security application 1232 may perform a cryptogram generation, modification, or deletion function relating to the payment.

According to various embodiments of the present disclosure, the REE 1240 may include an application layer. For example, the REE 1240 may include an application and/or a framework. The REE 1240 may allow access and/or control from the outside unlike the TEE 1230. The REE 1240, for example, may include a payment application (for example, a wallet application) 1242 and/or a payment manager 1244. The payment application 1242, for example, may perform a function of an interface, OCR, or identification function for payment using the payment application 1242. Additionally, the payment application 1242, for example, may perform a function relating to card registration or payment.

According to various embodiments of the present disclosure, the payment manager 1244, for example, may include information relating to a card company included in the REE 1240. The information relating to the card company, for example, may include an application relating to the card company and the application may be provided in a packaged form. The packaged form may be provided as an SDK. The payment manager 1244, for example, may include an encryption related function. For example, the payment manager 1244 may perform a token ID management or card company channel establishment function. Additionally, the payment manager 1244, for example, may perform an interface with an external device 1220 (for example, a server). For example, the payment manager 1244 may provide an interface with a server (for example, the payment server 1250) for tokenization service.

According to various embodiments of the present disclosure, the payment manager 1244, for example, may be functionally connected to the security application 1232 so that it may share information. For example, the payment manager 1244 may perform an interface with the security application 1232 for using or storing the token or the key. Additionally, the security application 1232 may include information relating to a network service provider.

According to various embodiments of the present disclosure, the payment application 1242 and the payment manager 1244 may be functionally connected to each other, and the security application 1232 and the payment manager 1244 may be functionally connected to each other. For example, the payment manager 1244 may deliver information received from the outside to the payment application 1242 or the security application 1232, or deliver information received from the payment application 1242 or the security application 1232 to the outside. According to an embodiment of the present disclosure, the payment manager 1244 may share payment related information with the security application 1232 or the payment application 1242.

According to various embodiments of the present disclosure, the electronic device 1210 may include additional configurations or modules in addition to the TEE 1230, the security application 1232, the REE 1240, the payment application 1242, or the payment manager 1244.

According to various embodiments of the present disclosure, the payment server 1250 may transmit payment related information (for example, a token or a key) from the electronic device 1210 to a management server for electronic payment or mobile payment. Additionally, the payment service server 1252 and the token requester server 1254, which are included in the payment server 1250, are functionally connected to each other so that they may share the payment related information.

According to various embodiments of the present disclosure, the token server 1260 is functionally connected to the token requester server 1254, so that they may transmit/receive payment related information. For example, the token requester server 1254 and the token server 1260 may provide an interface for delivering the token or the key.

Figure 13:
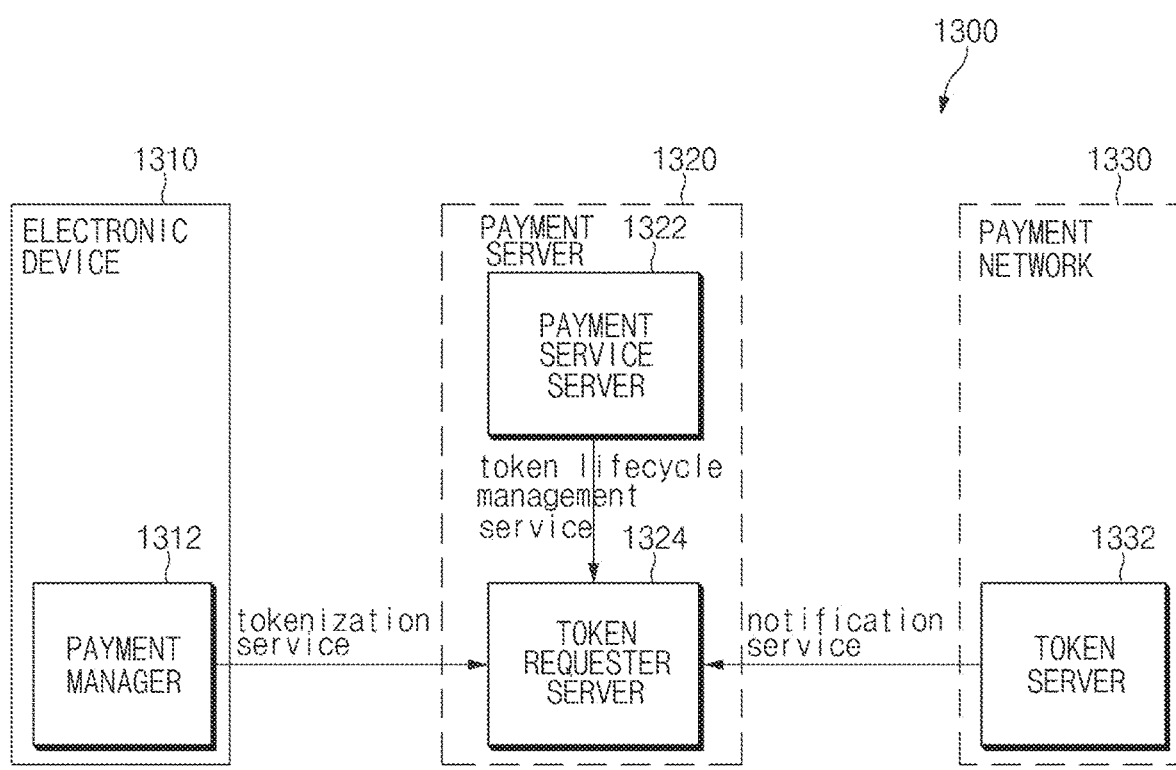
FIG. 13 is a block diagram illustrating operations of payment system components according to various embodiments of the present disclosure.

FIG. 13 is a block diagram illustrating operations of payment system components according to various embodiments of the present disclosure.

Referring to FIG. 13, a payment system 1300 may include an electronic device 1310, a payment server 1320, and/or a payment network 1330. The electronic device 1310, for example, may include a payment manager 1312. The payment server 1320, for example, may include a payment service server 1322 and/or a token requester server 1324. The payment network 1330, for example, may include a token server 1332. In relation to the payment system, the token may be used for a function performed by each of the electronic device 1310, payment server 1320, and/or payment network 1330.

According to various embodiments of the present disclosure, the electronic device 1310 may provide a tokenization service relating to the token by using the payment manager 1312 in the electronic device 1310 and the token requester server 1324 in the payment server 1320.

According to various embodiments of the present disclosure, the payment service server 1322 may provide an operating period relating to the token (for example, token life management) by using the token requester server 1324 included in the payment server 1320.

According to various embodiments of the present disclosure, the token server 1332 may provide a notification service relating to the token by using the token requester server 1324.

According to various embodiments of the present disclosure, the token requester server 1324 may provide a payment method to the electronic device 1310 by using a payment network solution. For example, the token requester server 1324 may determine a payment method fit for a user by using the tokenization service, the token related operating period, and/or the token related notification service.

Figure 14:
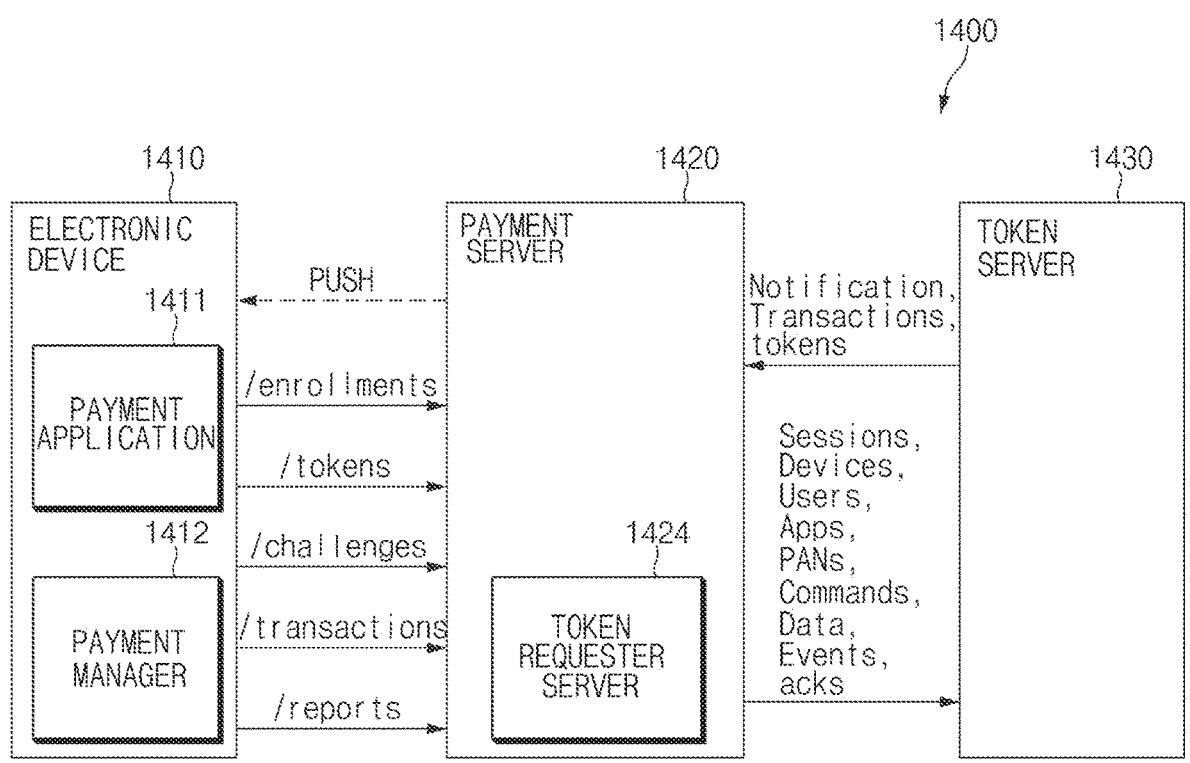
FIG. 14 is a block diagram illustrating a tokenization function according to various embodiments of the present disclosure.

FIG. 14 is a block diagram illustrating a tokenization function according to various embodiments of the present disclosure.

Referring to FIG. 14, a payment system 1400 may include an electronic device 1410 (for example, 101, 201, 1210, and 1310), a payment server 1420 (for example, the payment server 620, 720, 1250, and 1320), and/or a token server 1430 (for example, 630, 730, 1260, and 1332). The electronic device 1410, for example, may include a payment application 1411 and/or a payment manager 1412. The payment network 1420, for example, may include a token requester server 1424. The tokenization function, for example, may include a function for issuing card information (for example, PAN) as a token.

According to various embodiments of the present disclosure, the payment system 1400 may provide various APIs relating to the tokenization function. The API, for example, may include at least one of PUSH, /enrollments, /tokens, /challenges, /transactions, /reports, notification, transactions, tokens, sessions, devices, users, apps, PANs, commands, data, events, or acks.

According to various embodiments of the present disclosure, the PUSH may be information (for example, an instruction) for delivering a message from the payment server 1420 to the electronic device 1410.

According to various embodiments of the present disclosure, /enrollments, /tokens, /challenges, /transactions, or /reports may be information (for example, an instruction) delivered from the electronic device 1410 to the payment server 1420. The /enrollments may provide a registration related function. For example, the/enrollments may be used when transmitting information for registering a card or requesting a card registration. The/tokens may provide a token related function. For example, the/tokens may provide a function for managing an operating period (for example, a life cycle) of a token or requesting a token. The/challenges may provide an ID check related function. For example, the/challenges may provide a function for requesting the ID check. The /transactions may provide a payment history related function. The/reports may provide a function for notifying an application event from the payment manager to the token requester server.

According to various embodiments of the present disclosure, notification, transactions, or tokens may be information (for example, an instruction) delivered from the token server 1430 to the payment server 1420. According to various embodiments of the present disclosure, sessions, devices, users, apps, PANs, commands, data, events, or acks may be information (for example, an instruction) delivered from the payment server 1420 to the token server 1430.

According to an embodiment of the present disclosure, in order to receive a card related token by using the token requester server, the electronic device 1410 may use the payment application included in the electronic device 1410. For example, identification information (for example, PAN, information on the electronic device 1410, or user information) may be registered by using the payment application. The tokenization function, for example, may use the identification information. The identification information, for example, may include at least one of a PAN, information on the electronic device 1410, or user information. The electronic device 1410, for example, may resister the identification information to the payment server 1420.

According to an embodiment of the present disclosure, the token requester server may deliver the identification information to the token server 1430 to check whether it is valid. Additionally, the token requester server, for example, may check whether the identification information is valid, and register the identification information to the token server 1430. According to an embodiment of the present disclosure, when the identification information is registered to the token server 1430, the token server 1430 may deliver terms and conditions (T&C) to the electronic device 1410.

According to an embodiment of the present disclosure, the electronic device 1410 may provide the T&C received from the token server 1430 and/or the payment server 1420 by using the payment application included in the electronic device 1410. Additionally, the electronic device 1410 may receive a user input corresponding to the T&C by using the payment application. According to an embodiment of the present disclosure, when receiving a user input corresponding to the T&C, the electronic device 1410 may determine whether to approve the T&C.

According to an embodiment of the present disclosure, when the T&C is approved, the electronic device 1410 may provide a token. For example, the electronic device 1410 may perform ID check by using the payment application. For example, the electronic device 1410 may provide an interface corresponding to the ID check.

According to an embodiment of the present disclosure, the electronic device 1410 may perform the ID check based on a policy of a financial server. For example, the electronic device 1410 may provide additional information relating to the ID check (for example, SMS, call, or e-mail). According to an embodiment of the present disclosure, when the ID check is performed (for example, approved), the token server 1430 may activate a token.

According to an embodiment of the present disclosure, the token server 1430 may deliver information, which changes into the activation state, to the payment server 1420. According to an embodiment of the present disclosure, the payment server 1420 may deliver information, which changes into the activation state, to the payment server 1420. According to an embodiment of the present disclosure, the electronic device 1410 may receive a token activation notification and activate a token stored in the electronic device 1410.

According to an embodiment of the present disclosure, when a state of a token is changed (for example, activated), the electronic device 1410 may request the current or recent token state from the token requester server and/or the token server 1430 in order to check the state of the token. The electronic device 1410 may deliver the token state check request to the token requester server.

According to an embodiment of the present disclosure, the token requester server may deliver the token state check request to the token server 1430. According to an embodiment of the present disclosure, the token server 1430 may deliver a response corresponding to the token state check request to the token requester server. The response corresponding to the token state check request, for example, may include the current or recent token state. According to an embodiment of the present disclosure, the token requester server may deliver the current or recent token state received from the token server 1430, to the electronic device 1410.

According to an embodiment of the present disclosure, the token requester server may compare the current or recent token state received from the token server 1430 and a state of a token included in the electronic device 1410. For example, when the states are the same or similar based on the comparison, the state of the token included in the electronic device 1410 may be delivered to the token requester server. According to an embodiment of the present disclosure, the token requester server may deliver the state of the token included in the electronic device 1410 to the token server 1430.

According to an embodiment of the present disclosure, the token server 1430 may use payment related information (for example, card number, information on the electronic device 1410, or user information) during registration (for example, card registration or user registration) in order to use a token. For example, when at least one of the payment related information is changed, a new token may be generated or an existing token may be changed (for example, modified).

According to an embodiment of the present disclosure, a process where an electronic device transmits/receives the token related data to/from a server may use different data and network according to the importance. For example, the electronic device 1410 may transmit/receive general data in communication with a server by using Wi-Fi network. Additionally, data that is determined to be as important as a token may be transmitted/received in communication with a server by using a cellular network having less packet loss. In some cases, even when the electronic device 1410 is connected via Wi-Fi network, important data may be communicated with a server via cellular network.

According to an embodiment of the present disclosure, the payment system may omit at least one of the components or may additionally include different or additional components or combinations thereof.

Although it is shown in FIGS. 4 to 14 that each of the components included in the payment system is included in one electronic device (for example, an electronic device or a server), various embodiments of the present disclosure are not limited thereto. For example, according to the role, function, or performance of an electronic device, at least part of the payment system may be distributed between an electronic device and an external device (for example, the first external electrode device 102, the second external electronic device 104, or the server 106, shown in FIG. 1) and implemented at the various distributed devices. For example, the electronic device and/or the payment server may be included in a first electronic device, and the token server and/or the financial server may be included in a second electronic device.

Figure 15:
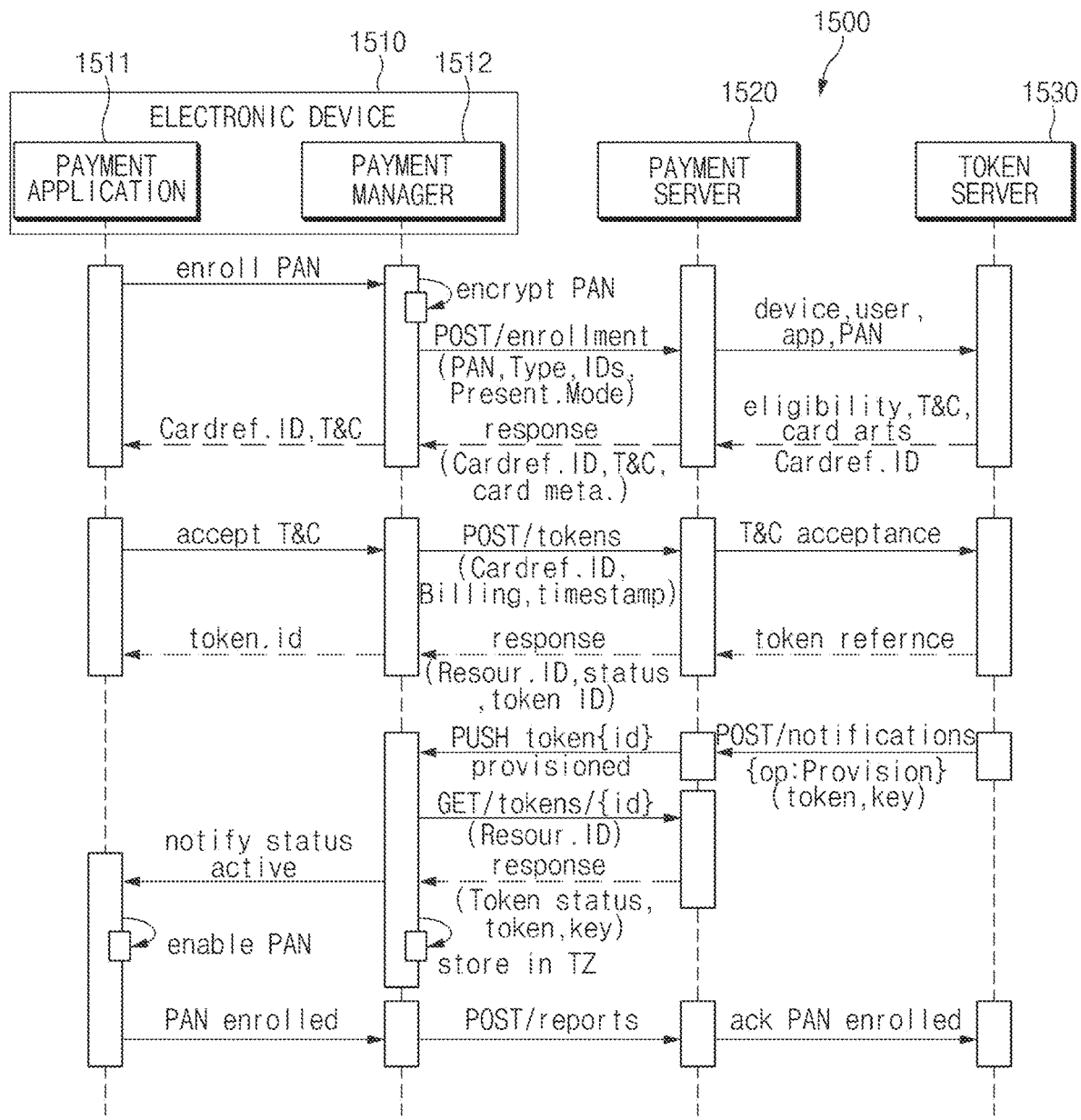
FIG. 15 is a flowchart illustrating a token issue operation without an ID check process of an electronic device according to various embodiments of the present disclosure.

FIG. 15 is a flowchart illustrating a token issue operation without an ID check process of an electronic device according to various embodiments of the present disclosure.

Referring to FIG. 15, a solid line may include a request instruction (for example, request or call) and a dotted line may include a response instruction (for example, response or return). According to an embodiment of the present disclosure, a payment system 1500 may include an electronic device 1510, a payment server 1520, or a token server 1530. The electronic device 1510, for example, may include a payment application 1511 and/or a payment manager 1512.

According to various embodiments of the present disclosure, the electronic device 1510 may store information used for payment by using a sensor (for example, a camera sensor or an OCR) functionally connected to the electronic device 1510 or an external input. For example, the information used for payment may include card information (for example, PAN), an expiration period, CVV, or a user name. According to an embodiment of the present disclosure, the electronic device 1510 may execute an application included therein (for example, the payment application 1511) based on an external input (for example, a user input). The electronic device 1510 may store the information used for payment in the payment application 1511 therein through a sensor functionally connected to the electronic device 1510 or an external input (for example, touch, double touch, long press, left/right movement after touch, gesture, or drag and drop).

The information used for payment, for example, may include a PAN. The PAN may include an account number relating to a BIN generated from a financial server.

According to various embodiments of the present disclosure, the electronic device 1510 may store information used for payment, which relates to the payment application 1511, in the electronic device 1510 or an external device (for example, a server). For example, the electronic device 1510 may store information used for payment corresponding to the payment application 1511 in a memory (for example, the memory 130 of FIG. 1) included in the electronic device 1510 or store it in an external device (for example, a first external electronic device (for example, the first external electronic device 102 of FIG. 1), a second external electronic device (for example, the second external electronic device 104 of FIG. 1), or a server (for example, the server 106 of FIG. 1)).

According to various embodiments of the present disclosure, the electronic device 1510 may provide an interface for the information used for payment. The interface may include the information used for payment, for example, characters, images, icons, notifications, or indicators for the PAN.

According to various embodiments of the present disclosure, the electronic device 1510 may register a PAN by using the payment application 1511. For example, the electronic device 1510 may deliver the PAN to the payment application 1511. According to an embodiment of the present disclosure, the payment manager 1512 may deliver the PAN inputted through a sensor functionally connected to the electronic device 1510 to the payment application 1511 in order to provide information relating to the PAN to a user.

According to various embodiments of the present disclosure, the payment manager 1512 may encrypt the PAN. For example, the payment manager 1512 may encrypt the PAN by using a key included in the security application in order to protect the PAN from the outside. Additionally, for example, encryption is performed by using information received from the electronic device 1510 or the external device (for example, a server or financial server).

According to various embodiments of the present disclosure, the payment manager 1520 may register the encrypted PAN with the payment server 1520. For example, the payment manager 1512 may be functionally connected to the payment server 1520 in order to deliver the encrypted PAN. The encrypted PAN may be delivered through a protection channel for protection from the outside. For example, the payment manager 1512 may use a specified instruction (for example, POST /enrollment) in registering the PAN to the payment server 1520. Additionally, the payment server 1520, for example, may control the encrypted PAN through a token requester server included in the payment server 1520. Hereinafter, the encrypted PAN may be referred to as a PAN.

According to various embodiments of the present disclosure, POST /enrollment, that is, the specified instruction, may be used when the payment manager 1512 requests a signal for card registration from the payment server 1520. A parameter of the POST /enrollment, for example, may include at least one of type, entry, token requester ID (identity), user ID (identity), app ID (identity), device ID (identity), card reference ID (identification), device name, device profile, device certificates for encryption and signing, device pair, payment instrument, or presentation mode. The type, for example, may include a payment card name (for example, a payment account brand) corresponding to a payment means. The payment card name, for example, may include at least one of VISA™, MASTERCARD™, AMERICANEXPRESS™, or DISCOVERY™. The entry, for example, may include a card entry method. The card entry method, for example, may include at least one of MANUAL, OCR, APP, or FILE. The device profile, for example, may include the type of the electronic device 1510 (for example, an electronic device or a wearable device). The payment instrument, for example, may include payment information (for example, a PAN, an expiration period (for example, expire data and expire date), or a CVV). The presentation mode, for example, may include a payment method (for example, MST or NFC) used for payment.

According to various embodiments of the present disclosure, the payment server 1520 may deliver user information to the token server 1530. For example, the user information may include a device profile, user ID, app ID, and card reference ID. The device profile, for example, may include a device ID (for example, international mobile equipment identity (IMEI)), or an arbitrary random value for specifying a device), and/or a payment means (for example, near field communication (NFC)), and/or magnetic secure transmission (MST). The user ID, for example, may include the name of a user who uses the electronic device 1510. The app ID, for example, may include the identifier of the payment application 1511 (for example, Samsung wallet). The card reference ID, for example, may include the identifier of a card to be registered to the electronic device 1510. The card reference ID may be distinguished from a PAN and may be an arbitrary value for managing a card.

According to various embodiments of the present disclosure, the token server 1530 may establish a channel (for example, a session) between the payment server 1520 and the token server 1530 in correspondence to the reception of the user information. The channel, for example, may encrypt information transmitted/received via the channel through an open key (for example, a public key) that the payment server 1520 and the token server 1530 share. According to various embodiments of the present disclosure, the payment server 1520 may deliver a PAN (for example, an encrypted PAN) to the token server 1520 by using a channel established between the payment server 1520 and the token server 1530.

According to various embodiments of the present disclosure, the token server 1530 may register the PAN received from the payment server 1520. During the registration process, a process for checking whether a token issue is available by using at least one ID of the user ID, app ID, device ID, and card reference ID. For example, the token server 1530 may perform a process for checking whether a card is available for token issue by using the card reference ID. According to another embodiment of the present disclosure, a user who is registered using the device ID and the user ID, may perform a process for checking whether a previously registered device is correct. The token server 1530 may register the PAN received from the payment server 1520 and deliver a response for the registration (for example, enrollment) to the payment server 1520. The response for the registration, for example, may include at least one of card reference ID, T&C, card metadata, or issuer metadata.

According to various embodiments of the present disclosure, the payment server 1520 may deliver information received from the token server 1530, for example, a response for registration, and the payment server 1512 may deliver it to the payment application 1511. The response for the registration, for example, may include at least one of card reference ID, T&C, card metadata, or issuer metadata. The card metadata may include the type, for example, a payment card name (for example, a payment account brand).

The payment card name, for example, may include at least one of VISA™, MASTERCARD™, AMERICANEX-PRESS™, or DISCOVERY™. The card metadata, for example, may include card art. The card art, for example, may be an art or a virtual card, which is identical and/or similar to an art of an actual plastic card of the card. The issuer metadata, for example, may include at least one of the name and logo of a financial server.

According to various embodiments of the present disclosure, at least part of a response for the PAN registration (for example, POST /enrollment) may be information stored in the payment server 1520 and/or the payment manager 1512 and may be changed (for example, generated, modified, or deleted) according to a specified condition.

According to various embodiments of the present disclosure, the payment application 1511 may output to the outside, at least part of a response for registration received from the payment manager 1512 by using an output unit of a device. For example, the payment application 1511 may display the T&C included in the response for registration on a display.

According to various embodiments of the present disclosure, the payment application 1511 may receive an instruction relating to the T&C through an input (for example, a user input). For example, the payment application 1511 may receive an instruction (for example, accept) that allows the T&C.

According to various embodiments of the present disclosure, the payment manager 1512 may deliver information corresponding to an instruction that allows the T&C to the payment server 1520. The information, for example, may include a specified instruction (for example, POST /tokens). The information corresponding to an instruction that allows the T&C may be information relating to a time of receiving an input.

According to various embodiments of the present disclosure, the POST /tokens may be used when a token is requested after a user check (for example, accept) for the T&C during an operation where the payment manager 512 performs card registration on the payment server 1520. A parameter of the POST /tokens, for example, may include at least one of card reference ID, T&C acceptance, or timestamp. The timestamp, for example, may include a time of receiving an instruction that allows the T&C from a user.

According to various embodiments of the present disclosure, the payment server 1520 may deliver the instruction that allows T&C to the token server 1530. For example, the payment manager 1520 may deliver payment related information (for example, T&C acceptance and/or timestamp) to the token server 1530. Additionally, the payment server 1520 may deliver the payment related information to the token server 1530 and may request the token server 1530 to set a token.

According to various embodiments of the present disclosure, the token server 1530 may deliver information relating to a token to be generated to the payment server 1520. The token related information may include a random value (hereinafter referred to as a token reference) generated from the token server 1530 in order to distinguish a token. The token related information may include a token ID. The token reference and the token ID may be distinguished from each other.

According to various embodiments of the present disclosure, the payment server 1520 may allocate a logical or physical space for a token reference to the payment server 1520 based on the token reference received from the token server 1530. An ID (hereinafter referred to as a resource ID) for identifying the logical or physical space in the payment server 1520 may be created. The resource ID, for example, may include an identifier for an enrollment resource and may be configured in a uniform resource locator (URL) form. Additionally, the resource ID, for example, may include reference information where token ID related information is stored and the payment server 1520 may include an address where the token ID is stored.

Additionally, the payment server 1520, for example, may deliver at least one of resource ID, status, and token ID to the payment manager 1512 in response to a request (for example, POST /tokens) of the payment manager 1512. The status, for example, may include a state of the token (for example, active, suspension, resume, or disposal).

The payment manager 1512 may deliver at least part of information received from the payment server 1520 to the payment application 1511. The information delivered to the payment application 1511 may include a token ID.

The token server 1530 may deliver a notification message (for example, POST /notification) for processing a token issue to the payment server 1520. The notification message delivered from the payment server 1520 may include at least one of a token reference, token ID, token value, and key for cryptogram generation. Additionally, a notification message delivered from the payment server 1520 may include a cover (for example, op:Provision) that the notification message is a message for token issue.

The payment server 1520 may deliver at least part of the notification message from the token server 1530 to the payment manager 1512. The message delivered to the payment server 1512 may include at least one of a token ID, resource ID, or cover for token issue.

The payment manager 1512 that receives at least part of the message delivered from the payment server 1520 may deliver a message for requesting a token value to the payment server 1520. The message for requesting the token value may include a resource ID.

Additionally, the payment server 1520, for example, may deliver at least one of the token ID, token state, token value, or key in response to a response to the request (for example, GET/token/{id}) of the payment manager 1512. At least one of the token ID, token state, token value, or key, for example, may be encrypted and delivered.

According to various embodiments of the present disclosure, the payment manager 1512 may store information (for example, the token ID, token state, token value, or key) received from the payment server 1520, in a trust zone. The trust zone, for example, may be included in the TEE. The payment manager 1512, for example, may store at least one of the token ID, token state, token value, or key in a security application included in the electronic device 1510.

According to various embodiments of the present disclosure, the payment manager 1512 may deliver information (for example, the token ID, token state, token value, or key) received from the payment server 1520, for example, a result stored in the trust zone, to the payment application 1511. For example, the payment manager 1512 may deliver an instruction (for example, active) relating to an active token to the payment application 1511. For example, the payment manager 1512 may deliver information that a state of a payment function related card is an active state to the payment application 1511.

According to various embodiments of the present disclosure, the payment application 1511 may change a state of the PAN recognized by the electronic device 1510. For example, the payment application 1511 may change (for example, enable) a state of the PAN in order to allow payment by using the PAN.

According to various embodiments of the present disclosure, the payment application 1511 may deliver the changed state of the PAN to the payment manager 1512. For example, the payment application 1511 may deliver information (for example, PAN enrolled) for representing that the PAN is registered to the payment manager 1512.

According to various embodiments of the present disclosure, the payment manager 1512 may deliver the changed state of the PAN to the payment manager 1512. For example, the payment manager 1512 may deliver information that the PAN is changed into a payment available state (for example, enable) to the payment server 1520 by using a specified instruction (for example, POST /reports). The payment manager 1512, for example, may perform state sync with the payment server 1520.

According to various embodiments of the present disclosure, the payment server 1520 may deliver the changed state of the PAN to the token server 1530. Additionally, the payment server 1520 may transmit a response (for example, acknowledgement or ack PAN enrolled) to the token server 1530.

Figure 16A:
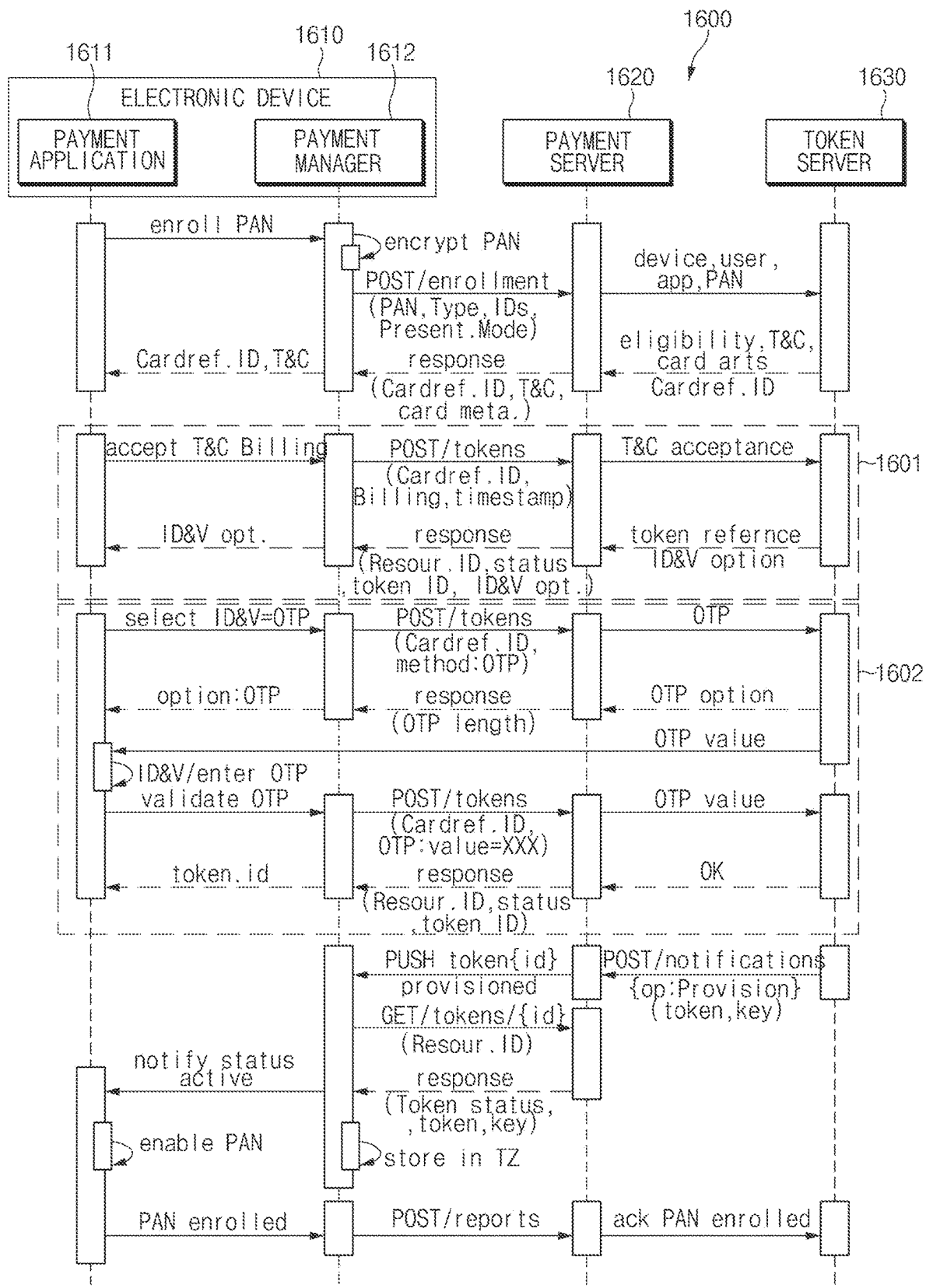
FIG. 16A is a flowchart illustrating a token issue operation using a one time password (OTP) during an ID check process of an electronic device according to various embodiments of the present disclosure.

FIG. 16A is a flowchart illustrating a token issue operation using an OTP during an ID check process of an electronic device according to various embodiments of the present disclosure.

Referring to FIG. 16A, a solid line may indicate a request instruction (for example, request or call) and a dotted line may indicate a response instruction (for example, response or return). According to an embodiment of the present disclosure, a payment system 1600 may include an electronic device 1610 (for example, the electronic device 101, 201, 1210, 1310, 1410, or 1510), a payment server 1620 (for example, the payment server 620, 720, or 1520), or a token server 1630 (for example, the token server 630, 730, or 1530). The electronic device 1610, for example, may include a payment application 1611 and/or a payment manager 1612. The payment system 1600 of FIG. 16A may perform substantially the same operations of the payment system 1500 of FIG. 15 described above, except for a block 1601 and a block 1602. Accordingly, since descriptions for parts of FIG. 16A excluding the block 1601 and the block 1602 are substantially identical to the descriptions for FIG. 15, additional descriptions are omitted. Omitted parts in relation to FIG. 16A may be parts described with reference to FIG. 15.

As shown in the block 1601 of FIG. 16A, according to various embodiments of the present disclosure, the payment application 1611 may receive information relating to a users' billing address (for example, accept T&C Billing reception operation). The billing address, as information relating to the card, may include a card user's address, postal code, country, name, and phone number.

According to various embodiments of the present disclosure, the payment manager 1612 may deliver information corresponding to an instruction that allows the T&C to the payment server 1620. The information, for example, may be included in a specified instruction (for example, POST /tokens). The information corresponding to an instruction that allows the T&C may be information relating to a time of receiving an input.

According to various embodiments of the present disclosure, the payment manager 1612 may deliver the billing address to the payment server 1620 (for example, a POST /tokens (Cardref.ID and Billing, timestamp) transmission operation). The information, for example, may be included in a specified instruction (for example, POST /tokens).

According to various embodiments of the present disclosure, the POST /enrollment may be used when a token is requested after a user checks (for example, accept) for the T&C during an operation where the payment manager 1612 performs card registration on the payment server 1612. A parameter of the POST /tokens, for example, may include at least one of card reference ID, T&C acceptance, timestamp, or billing address. The timestamp, for example, may include a time of receiving an instruction that allows T&C from a user.

According to various embodiments of the present disclosure, the payment server 1620 may deliver the instruction that allows the T&C to the token server 1630 (for example, a T&C acceptance transmission operation). For example, the payment manager 1620 may deliver payment related information (for example, T&C acceptance and/or timestamp) to the token server 1630. Additionally, the payment server 1620 may deliver the payment related information to the token server 1630 and may request the token server 1630 to set a token.

According to various embodiments of the present disclosure, the token server 1630 may deliver information relating to a token to be generated to the payment server 1620 (for example, a token reference, ID&V option transmission operation). The token related information may include a random value (hereinafter referred to as a token reference) generated from the token server 1630 in order to distinguish a token. The token related information may include a token ID. The token reference and the token ID may be distinguished from each other. Additionally, the token related information may include at least one of information relating to an ID check item (for example, option).

According to various embodiments of the present disclosure, the token ID, for example, may include token related index information. The ID check item, for example, may include at least one of call, SMS, OTP, or App to App. The ID check item, for example, may be determined by the token server 1630 and at least one ID check item may be determined. The determining of at least one ID check item, for example, may include determining at least two authentication related methods. Additionally, the determining of at least one ID check item, for example, may be determined by policy.

According to various embodiments of the present disclosure, the ID check items or methods of at least two or more may be used. For example, in addition to an OTP method described as the ID check item or method, an additional ID check item or method may be used. A plurality of ID check items or methods, for example, may be used simultaneously or sequentially in the payment system.

When at least two of the ID check items or methods according to various embodiments of the present disclosure are used, a user may arbitrarily select the ID check item or method. For example, when the token server 1630 does not limit the ID check item, a user may use at least one of ID check items available in the electronic device 1610.

According to various embodiments of the present disclosure, the payment server 1620 may allocate a logical or physical space for a token reference to the payment server 1630 based on the token reference received from the token server 1620. An ID (hereinafter referred to as a resource ID) for identifying the logical or physical space in the payment server 1620 may be created. The resource ID, for example, may include an identifier for an enrollment resource and may be configured in a uniform resource locator (URL)

form. Additionally, the resource ID, for example, may include reference information where token ID related information is stored and the payment server 1620 may include an address where the token ID is stored.

According to various embodiments of the present disclosure, based on information received from the token server 1630, the payment manager 1620 may deliver at least one of the token ID, resource ID, token state, or ID check item to the payment manager 1612 (for example, a response(Resour.ID, status, token ID, ID&V opt.) transmission operation). For example, the payment server 1620 may deliver at least one of the token ID, resource ID, token state, or ID check item in response to a request (for example, POST /tokens) of the payment manager 1612. At least one of the token ID, resource ID, token state, or ID check item, for example, may be encrypted and delivered. Additionally, the payment server 1620, for example, may include a status or an ID check method. The status, for example, may include a state of the token (for example, active, suspension, resume, or disposal). The ID check method, for example, may include an activation method for the token, and a type of an ID check method, for example, may include at least one of a CODE, CALL, APP, or LINK.

According to various embodiments of the present disclosure, the payment manager 1612 may deliver information (for example, the token ID, resource ID, token state, or ID check item) received from the payment server 1620, to the payment application 1611 (for example, an ID&V opt. delivery operation). For example, the payment manager 1612 may deliver an instruction (for example, pending) relating to the token to the payment application 1611. For example, the payment manager 1612 may deliver information that a state of a payment function related card is a pending state to the payment application 1611.

According to various embodiments of the present disclosure, the payment manager 1612 may deliver the ID check item received from the token requester server to the payment application 1611 to provide an interface that allows a user to select the ID check item. Additionally, the payment manager 1612, for example, may provide an interface to allow a token requester server in the payment server 1620 to use at least one item or method as the ID check item. The electronic device 1610, for example, may perform the ID check by using a plurality of ID check items or methods.

According to various embodiments of the present disclosure, as shown in the block 1602, the payment application 1611 may use a one time password (OTP) method as the ID check item or method. For example, the payment application 1611 may receive the OTP method from a user through the ID check item or method (for example, a select ID&V=OPT processing operation).

According to various embodiments of the present disclosure, the payment manager 1612 may deliver the received or obtained ID check item or method to the payment server 1620 (for example, a POST /tokens (Cardref.ID and Billing, timestamp) transmission operation). For example, the payment manager 1612 may deliver the ID check item or method to the payment server 1620 by using a specified instruction (for example, POST /tokens or POST /tokens and OTP). Additionally, the payment manager 1620, for example, may deliver the card reference ID and the ID check method to the payment server 1620. The ID check method may include the OTP method received from a user.

According to various embodiments of the present disclosure, the payment manager 1612 may deliver the received or obtained ID check item or method to the token server 1630 (for example, an OTP transmission operation). For example, the payment manager 1620 may deliver an OTP method, that is, an ID check received or obtained from a user, to the token server 1630.

According to various embodiments of the present disclosure, the token server 1630 may generate an OTP in correspondence to an OTP method received from the payment server 1620. For example, the token server 1630 may generate the OTP based on a predetermined rule or algorithm. The OTP, for example, may include a number, character, or specified information (for example, a pattern or picture).

According to various embodiments of the present disclosure, the token server 1630 may deliver information on the OTP (for example, an OTP option) to the payment server 1620 (for example, an OTP option transmission operation).

According to various embodiments of the present disclosure, the payment server 1620 may deliver information on the OTP (for example, an OTP option) to the payment manager 1612 (for example, a response (OTP option length) transmission operation). The information on the OTP, for example, may include the length of the OTP. The length of the OTP, for example, may include a digit used for the OTP method and the digit, for example, may include four or six, but embodiments are not limited thereto.

According to various embodiments of the present disclosure, the payment manager 1612 may deliver information on the OTP (for example, an OTP option) to the payment server 1611 (for example, an Option:OTP delivery operation). The information on the OTP, for example, may include the format information of the OTP.

According to various embodiments of the present disclosure, the token server 1630 may deliver the OTP figure or value to the payment application 1611 (for example, an OTP value transmission operation). For example, the token server 1630 may deliver the OTP figure or value by using a communication channel. The communication channel, for example, may include SMS or e-mail.

According to various embodiments of the present disclosure, the payment application 1611 may provide an interface for displaying the OTP figure or value related information. For example, the payment application 1611 may provide the OTP figure or value by using a number, character, or specified information (for example, a pattern or picture).

According to various embodiments of the present disclosure, the payment application 1611 may obtain, from a user, data by using an interface for displaying the OTP figure or value related information (for example, an ID&V/enter OTP check operation). For example, the payment application 1611 may obtain the OTP figure or value through a user input (for example, touch) or an external device functionally connected to the payment application 1611. The payment application 1611, for example, may change an interface for displaying the OTP figure or value related information based on the digit number received from the payment server 1620.

According to various embodiments of the present disclosure, the payment application 1611 may deliver, to the payment manager 1612, the OTP figure or value obtained from a user input or an external device (for example, a validate OTP delivery operation). The OTP figure or value obtained from the user input or the external device may be used for a user authentication operation.

According to various embodiments of the present disclosure, the payment manager 1612 may deliver the OTP figure or value obtained from the user input or the external device to the payment server 1620 (for example, a POST /tokens (Cardref.ID, OTP:value=xxx) transmission operation). The payment manager 1612, for example, may deliver the OTP figure or value obtained from the user input or the external device to the payment server 1620 by using a specified instruction (for example, POST/tokens{OTP:value=data}).

According to various embodiments of the present disclosure, the payment server 1620 may deliver, to the token server 1630, the OTP figure or value obtained from the user input or the external device (for example, an OTP value transmission operation).

According to various embodiments of the present disclosure, the token server 1630 may determine the validity of the OTP figure or value received from the payment server 1620. For example, the token server 1630 may determine the validity of the ID check item (method) obtained from a user and the ID check item related information (data). For example, the token server 1630 may determine whether the ID check item and data generated from the token server 1630 and information (for example, an OTP method and the OTP figure or value) received from the payment server 1620 are identical or similar to each other.

According to various embodiments of the present disclosure, when the ID check item and data generated from the token server 1630 and the information received from the payment server 1620 are identical or similar, the token server 1630 may determine that the ID check item and data are valid. Additionally, when the ID check item and data are valid, the token server 1630 may change a pending token for representing a state of the token. For example, a state of the pending token may change into an activation state. In relation to this, the token server 1630 may deliver an OK message to the payment server 1620 and in correspondence thereto, the payment server 1620 may deliver a response (Resour.ID, status, token ID) to the payment manager 1612. The payment manager 1612 may deliver token.id to the payment application 1611 in correspondence to the response reception.

In an operation described below, the payment system 1600 may perform an operation for delivering the token issue progress notification message (for example: POST /notification) of FIG. 15 and operations identical to the operations thereafter.

Figure 16B:
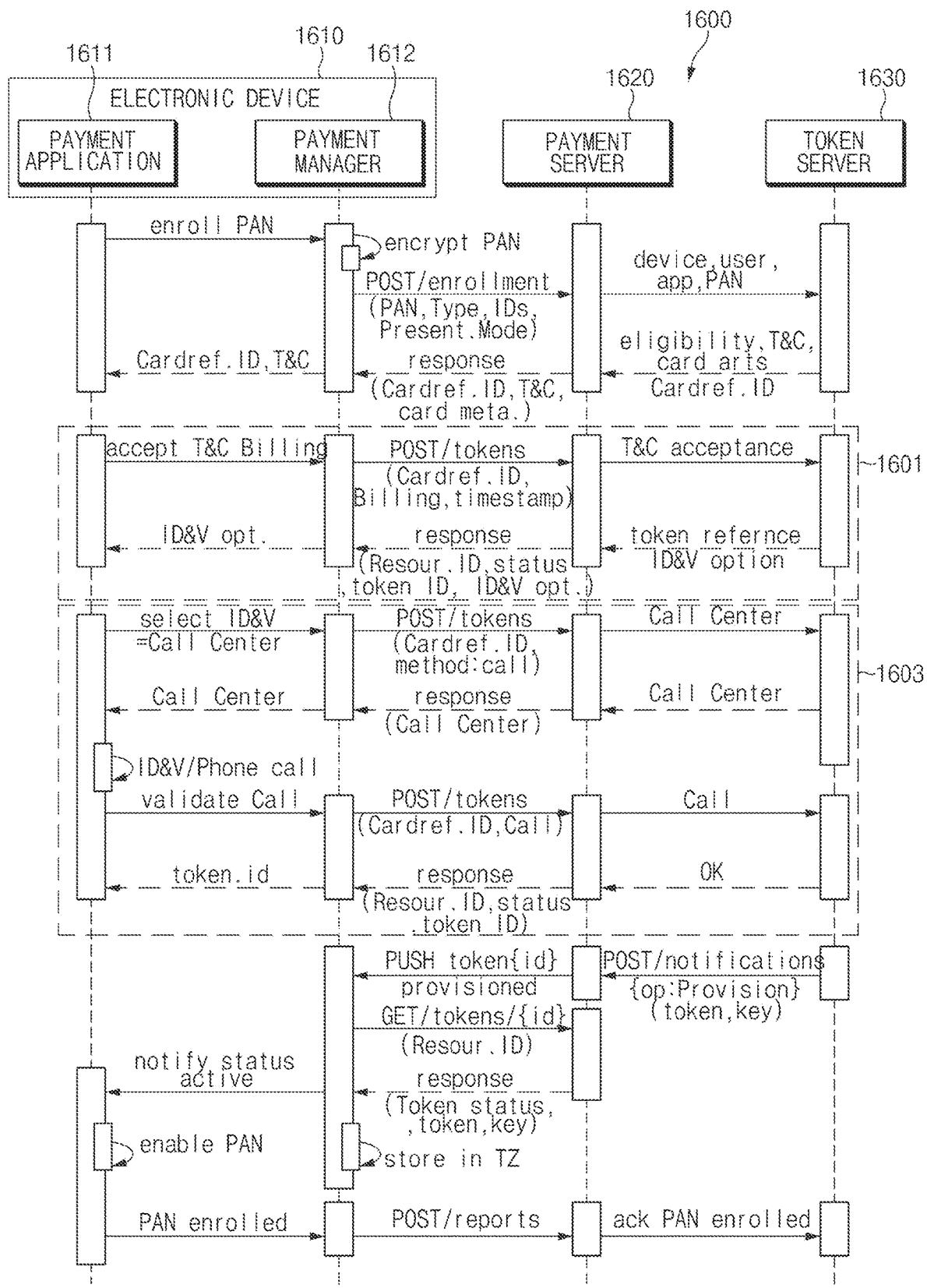
FIG. 16B is a flowchart illustrating a token issue operation using a Call Center during an ID check process of an electronic device according to various embodiments of the present disclosure.

FIG. 16B is a flowchart illustrating a token issue operation using a call center during an ID check process of an electronic device according to various embodiments of the present disclosure.

Referring to FIG. 16B, a solid line may indicate a request instruction (for example, request or call) and a dotted line may indicate a response instruction (for example, response or return). According to an embodiment of the present disclosure, a payment system 1600 may include an electronic device 1610 (for example, the electronic device 101, 201, 1210, 1310, 1410, or 1510), a payment server 1620 (for example, the payment server 620, 720, or 1520), or a token server 1630 (for example, the token server 630, 730, or 1530). The electronic device 1610, for example, may include a payment application 1611 and/or a payment manager 1612.

The payment system 1600 described with reference to FIG. 16B may perform the substantially the same operations of the payment system 1600 of FIG. 16A described above, except for a block 1603. A block 1601 shown in FIG. 16B may have the same operational flow as the block 1601 described with reference to FIG. 16A. Accordingly, detailed descriptions of FIG. 16B for operational flows except for the block 1603 are omitted. Other operational flows except for the block 1603 correspond to the operational flows in FIGS. 15 and 16A.

In relation to the description of the block 1603, according to various embodiments of the present disclosure, the payment application 1611 may use a call center method through the ID check item or method. For example, the payment application 1611 may receive the call center method from a user through the ID check item or method (for example, a select ID&V=Call Center reception operation).

According to various embodiments of the present disclosure, the payment manager 1612 may deliver the received or obtained ID check item or method to the payment server 1620 (for example, a POST /tokens(Cardref.ID and Billing, timestamp) transmission operation). For example, the payment manager 1612 may deliver the ID check item or method to the payment server 1620 by using a specified instruction (for example, POST /tokens or tokens and call). Additionally, the payment manager 1620, for example, may deliver the card reference ID and the ID check method to the payment server 1620. The ID check method may include the call center method (for example, POST /tokens and CALL) received from a user.

According to various embodiments of the present disclosure, the payment manager 1612 may deliver the received or obtained ID check item or method to the token server 1630 (for example, a call center message transmission operation). For example, the payment server 1620 may deliver a call center method, that is, an ID check received or obtained from a user, to the token server 1630.

According to various embodiments of the present disclosure, the token server 1630 may prepare a call connection (for example, a counseling call) in correspondence to a call center method received from the payment server 1620. For example, the token server 1630 may use the electronic device 1610 relating to the call center method received from a user or the number (for example, a phone number) of the electronic device 1610. The token server 1630, for example, may receive the electronic device 1610 or the number of the electronic device 1610 through at least one of the payment application 1611, the payment manager 1612, or the payment server 1620, or may receive it through a payment network.

According to various embodiments of the present disclosure, the token server 1630 may deliver the call center method related notification to the payment server 1620 (for example, a call center message transmission operation). The call center method related notification, for example, may include the electronic device 1610 or the number of the electronic device 1610.

According to various embodiments of the present disclosure, the payment server 1620 may deliver the call center method related notification to the payment manager 1612 (for example, a response (call center) message transmission operation). The call center method related notification, for example, may include the electronic device 1610 or the number of the electronic device 1610.

According to various embodiments of the present disclosure, the payment manager 1612 may deliver the call center method related notification to the payment application 1611 (for example, a call center message delivery operation). The call center method related notification, for example, may include the electronic device 1610 or the number of the electronic device 1610.

According to various embodiments of the present disclosure, at least one of the token server 1630 or the payment server 1620 may perform the call center method related communication connection (for example, a call connection). For example, at least one of the token server 1630 or the payment server 1620 may use a communication network (for example, 2G, 3G, 4G, or LTE) in order to perform the communication connection.

According to various embodiments of the present disclosure, the payment application 1611 may provide an interface for displaying the call center method related information. For example, the payment application 1611 may use the electronic device 1610 or an application (for example, a phone application) included in the electronic device 1610 in order to perform the communication connection.

According to various embodiments of the present disclosure, the payment application 1611 may perform an authentication operation by using an interface for displaying the call center method related information from a user. For example, the payment application 1611 may perform the authentication operation through a user input (for example, touch) or an external device functionally connected to the payment application 1611.

Additionally, the payment application 1611, for example, may perform the authentication operation based on the communication connection (for example, an ID&V phone call processing operation). For example, the user may deliver a message that the authentication operation (for example, an ID&V operation) is successful or authentication is completed through the communication connection. A result for the authentication operation (for example, authentication success or completion), for example, may be synchronized with the token server 1630 and the authentication result may be shared.

According to various embodiments of the present disclosure, the token server 1630 may check an authentication operation for the call center method performed in the payment application 1611. For example, the token server 1630 may check a result of the authentication operation (for example, the ID check operation) through the electronic device 1610 or the communication connection performed by using the electronic device 1610.

According to various embodiments of the present disclosure, when the result for the authentication operation is successful or the authentication is completed, the token server 1630 may change a state of a token. For example, the state of the token may be changed into an activation state.

According to various embodiments of the present disclosure, the payment server 1612 may deliver a value obtained from a user input or an external device during a call, to the payment server 1620. The payment manager 1612, for example, may deliver a value obtained from a user input or an external device during a call to the payment server 1620 by using a specified instruction (for example, POST/ tokens{Call:value=data}).

According to various embodiments of the present disclosure, the payment manager 1612 may deliver a validate call message to the payment manager 1612, and deliver a message for checking an authentication result performed during a call to the payment server 1620 (for example, a POST /tokens(Cardref.ID, Call) message transmission operation). The payment manager 1612, for example, may deliver an instruction for checking an authentication result performed during a call to the payment server 1620 by using a specified instruction (for example, POST /tokens{Call}).

According to various embodiments of the present disclosure, the payment server 1620 may deliver, to the token server 1630, a value obtained from a user input or an external device during a call (for example, a call message transmission operation).

According to various embodiments of the present disclosure, the payment server 1620 may deliver a message for checking an authentication result performed during call to the token server 1630.

According to various embodiments of the present disclosure, the token server 1630 may determine the validity of the value obtained from the user input or the external device, which is received from the payment server 1620. For example, the token server 1630 may determine the validity of the ID check item (method) obtained from a user and the ID check item related information (data). For example, the token server 1630 may determine whether the ID check item and data generated from the token server 1630 and information (for example, a call method and the input value) received from the payment server 1620 are identical or similar to each other.

According to various embodiments of the present disclosure, the token server 1630 may check an authentication result performed in the call center. For example, the token server 1630 may determine the validity of the ID check item (method) received from the payment server 1620 and the ID check item related information (data) based on a user and a result through the performed call center. For example, the token server 1630 may determine whether data is delivered from the token server 1630 to the electronic device 1610 based on information received from the call center.

According to various embodiments of the present disclosure, when the ID check item and data generated from the token server 1630 and the information received from the payment server 1620 are identical or similar, the token server 1630 may determine that the ID check item and data are valid. According to various embodiments of the present disclosure, when receiving a result that the ID check item and data are valid from the call center, the token server 1630 may determine that the ID check item and data are valid. Additionally, when it is determined that the ID check item and data are valid, the token server 1630 may change a pending token for representing a state of the token. For example, a state of the pending token may be changed into an activation state. In relation to this, the token server 1630 may deliver an OK message to the payment server 1620 and the payment server 1620 may deliver a response message for the OK message reception, that is, a response (Cardref.ID, call), to the payment manager 1612. The payment manager 1612 may deliver a token.id to the payment application 1611.

The following operation of the payment system 1600 may be substantially identical to an operation after the delivery of the notification message of FIG. 15 (for example, POST /notification).

Figure 17A:
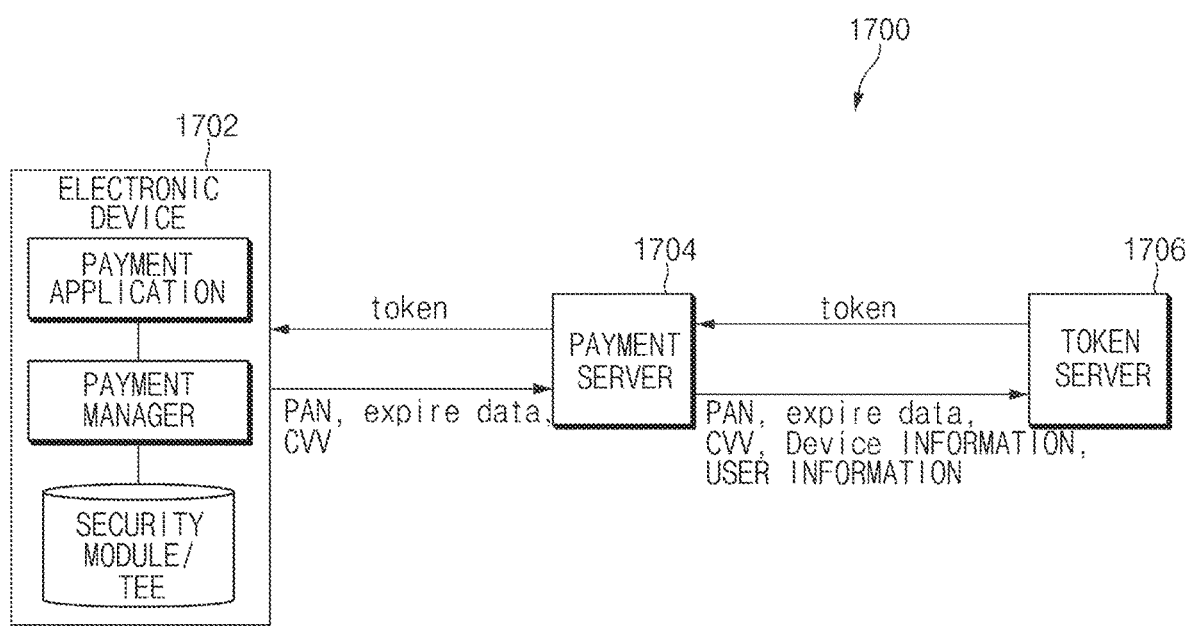
FIG. 17A is a block diagram illustrating a first token issue operation of an electronic device according to various embodiments of the present disclosure.
Figure 17B:
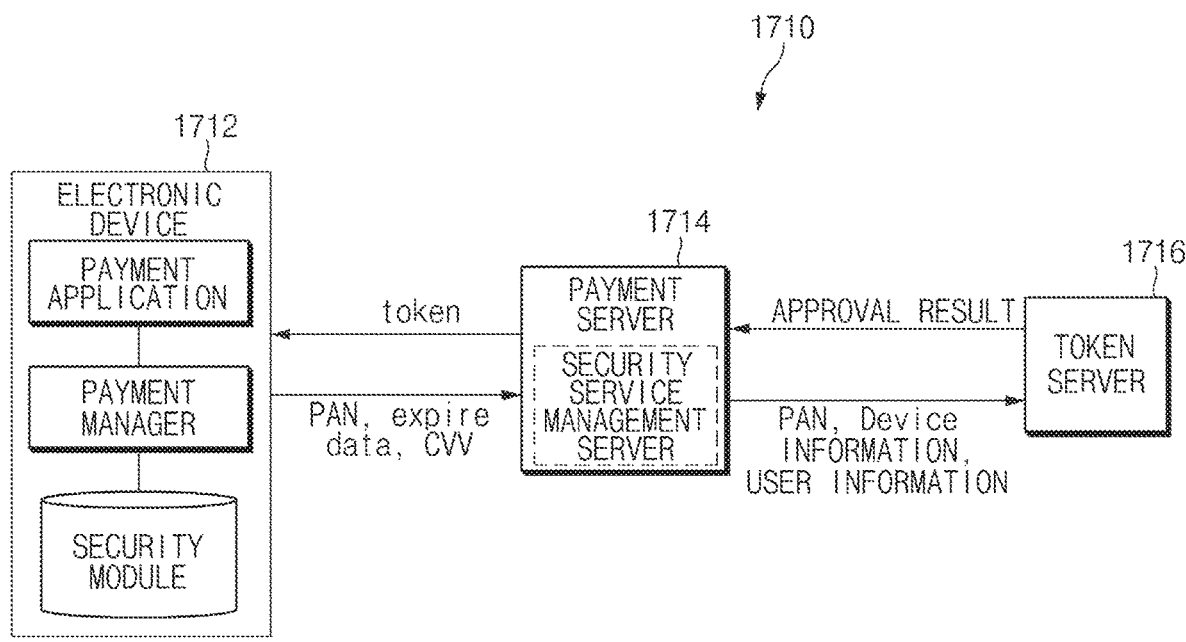
FIG. 17B is a block diagram illustrating a second token issue operation of an electronic device according to various embodiments of the present disclosure.
Figure 17C:
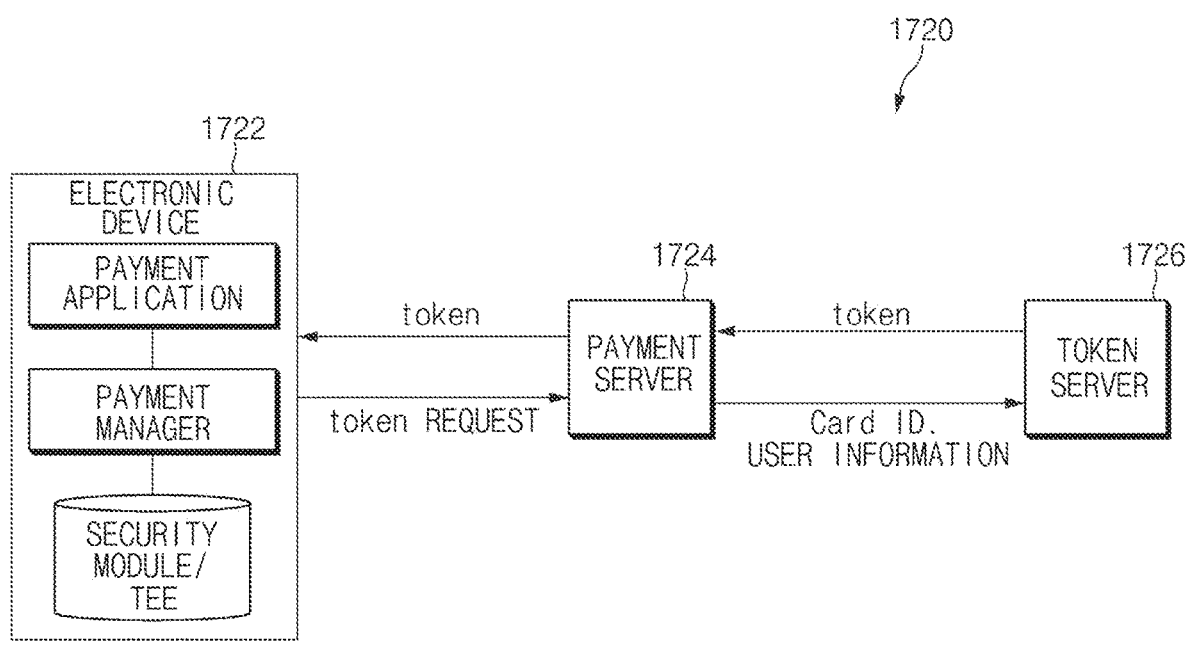
FIG. 17C is a block diagram illustrating a third token issue operation of an electronic device according to various embodiments of the present disclosure.

FIGS. 17A to 17C are block diagrams illustrating a token issue operation of an electronic device according to various embodiments of the present disclosure.

According to various embodiments of the present disclosure, a token issue operation may be changed based on country. For example, the token issue operation may be changed based on a user's detected presence in the United States, Europe, or Korea for example.

Referring to FIG. 17A, a block diagram is shown illustrating a first token issue operation 1700 of an electronic device according to various embodiments of the present disclosure.

The first token issue operation, for example, may include an electronic device 1702, a payment server 1704, or a token server 1706. The electronic device 1702, for example, may include at least one of a payment application, a payment manager, a security module, and a TEE.

According to various embodiments of the present disclosure, the electronic device 1702 may obtain card related information through a sensor functionally connected to the electronic device 1702. The card related information, for example, may be used for a card registration operation. The sensor, for example, may include an OCR. The card related information, for example, may include at least one of a PAN, expiration period, and CVV. The sensor, for example, may be performed by using the payment application included in the electronic device 1702.

According to various embodiments of the present disclosure, the payment application included in the electronic device 1702 may deliver the card related information to the payment server 1704. The payment server 1704, for example, may include a payment service server or a token requester server, and the card related information may be delivered between the payment service server and the token requester server.

According to an embodiment of the present disclosure, the payment server 1704 (for example, the token requester server) may deliver, to the token server 1706, the card related information and/or information relating to the electronic device 1702 (for example, device information or user information). The information relating to the electronic device 1702, for example, may include a device that requests the first token issue operation.

According to an embodiment of the present disclosure, the token server 1706 may issue or generate a token based on information received from the payment server 1704. According to an embodiment of the present disclosure, the token server 1706 may deliver a token based on information received from the payment server 1704. The token server 1706, for example, may deliver the token to the token requester server included in the payment server 1704.

According to an embodiment of the present disclosure, the payment server 1704 may deliver the token to the electronic device 1702. The payment server 1704, for example, may deliver the token from the token requester server included in the payment server 1704 to the electronic device 1702.

According to an embodiment of the present disclosure, the electronic device 1702 may store the token received from the payment server 1704 in the security module or the TEE. For example, the electronic device 1702 may store the token in the security module or the TEE, that is, a security area, so that it may control access from the outside.

According to an embodiment of the present disclosure, the electronic device 1702 may store the token received from the payment server 1704 in a normal memory (for example, a memory in an REE).

According to an embodiment of the present disclosure, in relation to the token, at least one token may be issued or generated based on a payment method (for example, OTP or call center) performed in the electronic device 1702.

According to an embodiment of the present disclosure, in relation to the token, one token may be issued or generated in correspondence to the electronic device 1702. For example, a first token may be included in a first electronic device and a second token may be included in a second electronic device. In this case, the first and second tokens may be different from each other.

According to an embodiment of the present disclosure, the token may be activated based on an authentication operation (for example, ID&V). For example, the token may be stored in the electronic device 1702 and may be activated based on the authentication operation. The authentication operation, for example, may include an identification check. The identification check, for example, may be performed through a financial server.

Referring to FIG. 17B, a block diagram is shown illustrating a second token issue operation 1710 of an electronic device according to various embodiments of the present disclosure.

The second token issue operation, for example, may include an electronic device 1712, a payment server 1714, or a token server 1716. The electronic device 1712, for example, may include at least one of a payment application, a payment manager, and a security module. Additionally, the payment server 1714, for example, may include a security service management server.

According to various embodiments of the present disclosure, the electronic device or another electronic device may obtain card related information through a sensor functionally connected to the electronic device or the other electronic device. The card related information, for example, may be used for a card registration operation. The sensor, for example, may include an OCR. The card related information, for example, may include at least one of a PAN, expiration period, and CVV. The sensor, for example, may be performed by using the payment application included in the electronic device or the other electronic device.

According to various embodiments of the present disclosure, the payment application included in the electronic device 1712 may deliver the card related information to the payment server 1714. The payment server 1714, for example, may include a payment service server or a token requester server, and the card related information may be delivered between the payment service server and the token requester server.

According to an embodiment of the present disclosure, the payment server 1714 may deliver the card related information to the security service management server included in the payment server 1714. The security service management server, for example, may be included in the payment server 1714 and operate internally or may be included outside of the payment server 1714. For example, the security service management server may be included in a device (for example, an external device) that is different from the payment server 1714 and functionally connected to the payment server 1714, and thereby exchange the card related information.

According to an embodiment of the present disclosure, the security service management server may deliver, to the token server 1716, the card related information and/or information relating to the electronic device 1712 (for example, device information or user information). The information relating to the electronic device 1712, for example, may include a device that requests the second token issue operation.

According to an embodiment of the present disclosure, the token server 1716 may perform an authentication operation based on information received from the payment server 1714. The token server 1716, for example, may perform an authentication operation based on the card related information and/or the information relating to the electronic device 1712.

According to an embodiment of the present disclosure, the token server 1716 may deliver a result (for example, successful or unsuccessful) of the authentication operation to the security service management server included in the payment server 1714.

According to an embodiment of the present disclosure, the security service management server may issue or generate a token based on the card related information and/or the information relating to the electronic device 1712.

According to an embodiment of the present disclosure, the security service management server may store the token in a security area (for example, a security module) included in the electronic device 1712. For example, the security service management server may have an access permission (for example, security module access permission) for the security area of the electronic device 1712. Additionally, the security service management server may store the token in the security area of the electronic device 1712 by using the access permission. Additionally, the token may be delivered from the security service management server to the electronic device 1712.

According to an embodiment of the present disclosure, the electronic device 1712 may store the token in the security module, that is, a security area, and may control an access from the outside.

According to an embodiment of the present disclosure, in relation to the token, at least one token may be issued or generated based on a payment method (for example, OTP or call center) performed in the electronic device 1712.

According to an embodiment of the present disclosure, in relation to the token, one token may be issued or generated in correspondence to the electronic device 1712. For example, a first token may be included in a first electronic device and a second token may be included in a second electronic device. In this case, first and second tokens may be different from each other.

According to an embodiment of the present disclosure, the token may be activated based on an authentication operation (for example, ID&V). For example, the token may be stored in the electronic device 1712 and may be activated based on the authentication operation. The authentication operation, for example, may include an identification check. The identification check, for example, may be performed through a financial server.

Referring to FIG. 17C, a block diagram is shown illustrating a third token issue operation 1720 of an electronic device according to various embodiments of the present disclosure.

The third token issue operation, for example, may include an electronic device 1722, a payment server 1724, or a token server 1726. The electronic device 1722, for example, may include at least one of a payment application, a payment manager, a security module, and a TEE.

According to various embodiments of the present disclosure, the electronic device or another electronic device may obtain card related information through a sensor functionally connected to the electronic device or the other electronic device. The card related information, for example, may be used for a card registration operation. The sensor, for example, may include an OCR. The card related information, for example, may include at least one of a PAN, expiration period, and CVV. The sensor, for example, may be performed by using the payment application included in the electronic device or the other electronic device.

According to an embodiment of the present disclosure, the electronic device or the other electronic device may perform an authentication operation (for example, ID&V). The authentication operation, for example, an identification check, may be performed by using the payment application.

According to an embodiment of the present disclosure, the electronic device 1722 may perform the card registration and/or the identification check when performing a payment function. For example, in order to perform a payment function, the electronic device 1722 may perform the card registration and the identification check and also, the card registration and the identification check may refer to a standby or preparation state for a payment function.

According to an embodiment of the present disclosure, the electronic device 1722, the payment server 1724, or the token server 1726 may share information relating to the card registration and the identification check. For example, the electronic device 1722, the payment server 1724, or the token server 1726 may share at least one of a PAN, expiration period, CVV, device information, and user information.

According to an embodiment of the present disclosure, a token relating to the third token issue operation may be issued or generated during payment by using the payment function.

According to various embodiments of the present disclosure, the payment application included in the electronic device 1722 may perform user authentication in order to perform the payment function. For example, the user authentication may include a password, pattern authentication, or biometric information authentication.

According to an embodiment of the present disclosure, when the user authentication is successful (for example, authentication completion), the payment application may perform a third token issue operation by the payment server 1724. The third token issue operation, for example, may include a token request.

According to an embodiment of the present disclosure, the payment server 1724 may deliver card information (for example, a card identifier) and/or user information to the token server 1726 based on the token request. The information relating to the electronic device 1722, for example, may include a device that requests the third token issue operation.

According to an embodiment of the present disclosure, the token server 1726 may issue or generate a token based on information received from the payment server 1724.

According to an embodiment of the present disclosure, the token server 1726 may deliver a token based on information received from the payment server 1724.

According to an embodiment of the present disclosure, the payment server 1724 may deliver the token to the electronic device 1722.

According to an embodiment of the present disclosure, the electronic device 1722 may store the token received from the payment server 1724 in the security module or the TEE. For example, the electronic device 1722 may store the token in the security module or the TEE, that is, a security area, so that it may control access from the outside.

According to an embodiment of the present disclosure, the electronic device 1722 may store the token received from the payment server 1724 in a normal memory (for example, a memory in an REE).

According to an embodiment of the present disclosure, the electronic device 1722 may not store the token received from the payment server 1724 in a storage area (for example, a memory) in the electronic device 1722. For example, the electronic device 1722 may not store the token in the storage area and may use it for a payment function.

According to an embodiment of the present disclosure, in relation to the token, the storage area of the token may be changed based on a payment method (for example, OTP or call center) performed in the electronic device 1722. For example, when the payment method is OTP, the token may be stored in the security module or the TEE, and when the payment method is call center, it may not be stored in the electronic device 1722.

According to various embodiments of the present disclosure, the token may include a use time or an expiration time. For example, the token may be limited for use to a specified elapsed time (for example, 3 hours or one day) after the token is issued or generated.

According to various embodiments of the present disclosure, the token may include card information. For example, the token may include one time card (OTC) information. Hereinafter, the electronic device described with reference to FIGS. 18 to 38 may correspond to at least one of the electronic devices described with reference to FIGS. 1 to 17C.

Figure 18:
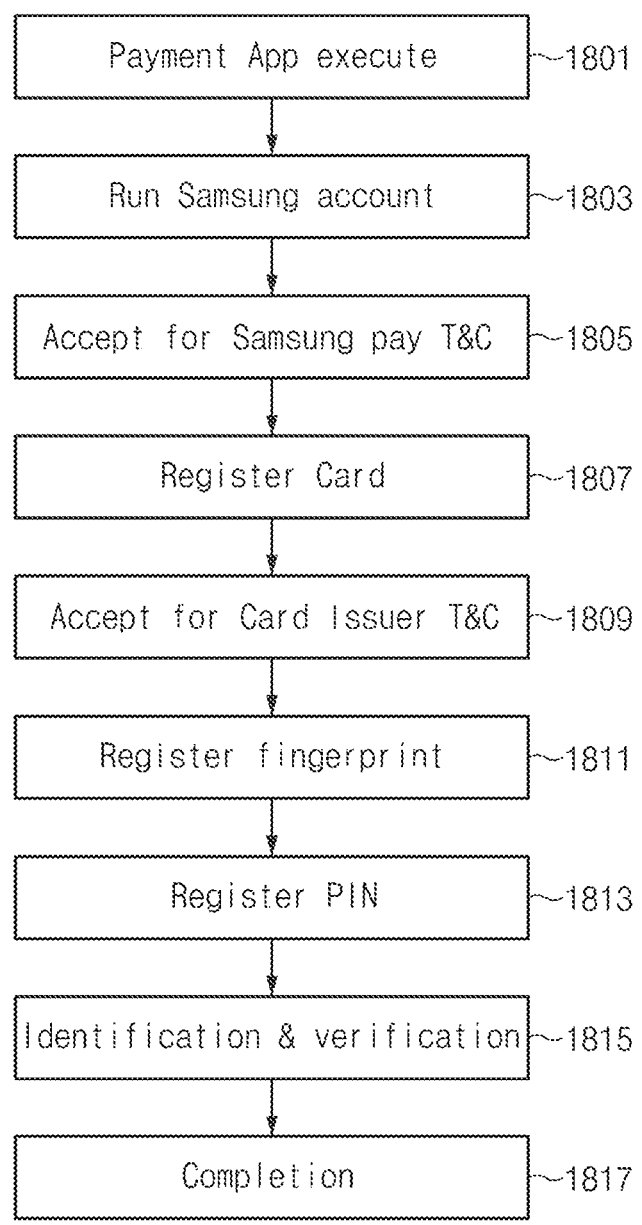
FIG. 18 is a flowchart illustrating a payment means information registering method during payment means operation support according to an embodiment of the present disclosure.

FIG. 18 is a flowchart illustrating a payment means information registering method during payment means operation support according to an embodiment of the present disclosure.

Referring to FIG. 18, in relation to payment means information registration, a user may register card information obtained online or offline, based on an electronic device. The registration process may vary according to each region, each country, and each financial (card) company, and some processes may be omitted and added during a process below. Additionally, when card information and fingerprint information are inputted or stored, a card information input fingerprint information input operation may be omitted during a corresponding process.

In operation 1801, a processor (for example, a payment management module) of an electronic device may execute a payment application. For example, when a specified input event (for example, a swipe event including a home button or an icon selection event relating to payment application execution) occurs, a processor may execute a payment application.

In operation 1803, an electronic device (for example, a payment management module) may execute an account information (for example, Samsung account) related function. The processor may execute an account input function when selecting a card information registration related menu, or execute an account input function automatically when executing a payment application. Alternatively, the processor may execute an account input function when selecting an account input related menu. When account information (for example, ID and password) is inputted, the processor may process corresponding account information authentication. According to various embodiments of the present disclosure, the account information input may be processed automatically based on a previous input history.

In operation 1805, an electronic device (for example, a payment management module) may perform SAMSUNG pay T&C permission processing.

When account information check is processed, the processor may output T&C information relating to payment means registration. When an input event relating to T&C check occurs, the processor may complete the T&C check.

In operation 1807, an electronic device (for example, a payment management module) may process card information registration. After the T&C check completion, the processor may output a user interface for requesting card information registration. According to an embodiment of the present disclosure, the processor may activate a camera in relation to card information registration and extract card information from an image obtained by the camera. Alternatively, the processor may output an input window relating to card information input and obtain card information corresponding to a virtual key button selected according to a user input. According to various embodiments of the present disclosure, the processor may also collect user voice input and obtain card information based on voice recognition.

In operation 1809, an electronic device (for example, a payment management module) may perform T&C permission processing of a card issuer. When card information input is completed, the processor may output T&C relating to the card issuer on a display. The processor may obtain the card issuer related T&C from a corresponding card server or financial server in advance or obtain it by requesting a corresponding server. The processor may output a card issuer T&C check related virtual button or virtual check button and complete T&C check when selecting a corresponding button.

In operation 1811, an electronic device (for example, an authentication module) may process fingerprint registration. After checking the card issuer related T&C, the processor may output a fingerprint registration related user interface. During this operation, the processor may output a UI guide for guiding fingerprint registration. When obtaining fingerprint information from a fingerprint sensor, the processor may complete the registration of the obtained fingerprint information. According to various embodiments of the present disclosure, when the fingerprint information registration of the processor is completed in advance, the fingerprint registration processing operation may be omitted.

In operation 1813, an electronic device (for example, an authentication module) may process PIN registration. When the fingerprint registration is completed or is previously performed, the processor may output a PIN registration related user interface. For example, the processor may output virtual key buttons for performing a PIN input. When the PIN information is inputted, the processor may process corresponding PIN information storage and registration.

In operation 1815, an electronic device (for example, an authentication module) may provide identification & verification (ID&V). When PIN registration is completed, the processor may perform ID&V processing. For example, the processor may receive identification information (for example, receive SMS based identification information) from a card server or a financial server. When the identification information is inputted through the ID&V related user interface, the processor may transmit the inputted identification information to a card server or a financial server. When receiving a signal corresponding to a correct identification information input from a card server or a financial server, the processor may complete the ID&V operation.

In operation 1817, an electronic device (for example, a payment management module) may complete payment means information registration. In relation to the payment means information registration completion, the processor may output a completion message to a display through a pop-up form. When the registration is completed, the processor may output the display of the payment means information in a different way in comparison to before the card completion. For example, the processor may display a payment card image relatively dark and dim before registration and display the payment card image relatively bright and clear after registration.

As mentioned above, the processor may register an account (for example, Samsung account) and perform login processing by executing a payment application first, and after the agreement on T&C of the payment application, perform support to input and edit card information through an OCR method or a manual method. After checking T&C of a financial (card) company, the processor may complete payment means information registration through fingerprint information registration, PIN registration, and ID&V process performance. During this operation, although PAN is stored in an electronic device, an electronic device may receive and store a token issued by a token server through a payment server instead of PAN and use it for payment.

Figure 19:
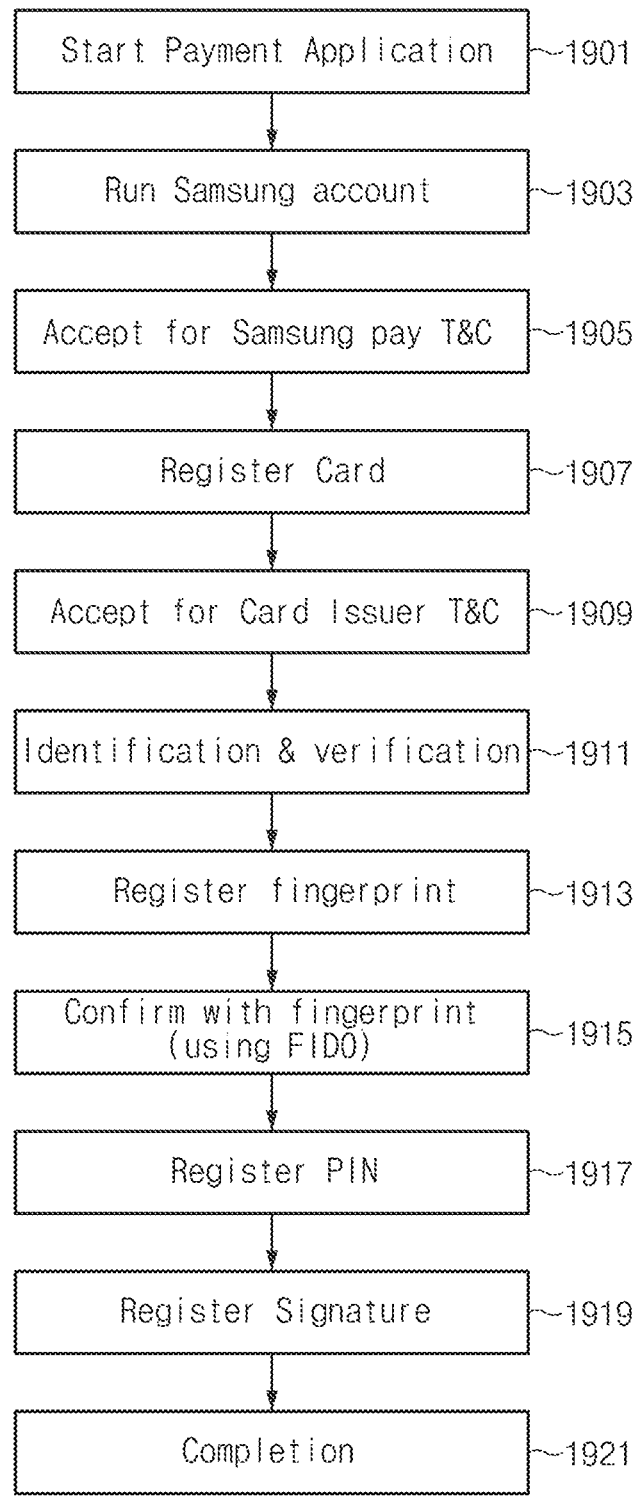
FIG. 19 is a flowchart illustrating a payment means information registration process according to an embodiment of the present disclosure.

FIG. 19 is a flowchart illustrating a payment means information registration process according to another embodiment of the present disclosure.

Referring to FIG. 19, in relation to payment means information registration, in operation 1901, a processor (for example, a payment management module) of an electronic device may execute a SAMSUNG pay application similar to operation 1801. Additionally, similar to the above-described operations 1803, 1805, 1807, and 1809, the processor may perform SAMSUNG account related operation processing in operation 1903, SAMSUNG pay T&C operation processing in operation 1905, card information registration processing in operation 1907, and card issuer T&C operation processing in operation 1909.

In operation 1911, the processor (for example, an authentication module) may process an ID&V related operation. The ID&V related operation may be performed identical or similar to the ID&V operation performed in operation 1815.

When the ID&V operation is completed, in operation 1913, a processor (for example, an authentication module) may process fingerprint information registration. The processor may output a fingerprint information input related user interface, and when fingerprint information is inputted, process a fingerprint information check in operation 1915. In relation to this, the processor may process the fingerprint information check based on FIDO for checking fingerprint information.

When the fingerprint information check is processed successfully, in operation 1917, the processor (for example, an authentication module) may process PIN information registration as shown in the above-mentioned operation 1813.

In operation 1919, the processor (for example, an authentication module) may process signature information registration. When PIN information registration is completed, the processor may output a signature input related user interface. The processor may register a signature inputted through a corresponding user interface in relation to payment means information. The user interface, for example, may include a touch interface for supporting a user's handwriting input.

When the signature input is completed, in operation 1921, a processor (for example, a payment management module) may complete payment means information registration. When the payment is completed, the processor may output a message for notifying the registration completion.

According to various embodiments of the present disclosure, when a payment application execution is requested, a processor (for example, a payment management module) checks a remaining battery amount and a network available state (or a state in which the data transmission speed of a network is greater than a specified size), and then executes the payment application when a specified condition is satisfied. During card information registration, the processor may perform support to input and edit card information through a camera based OCR method (for example, camera image acquisition and card information registration through analysis) or a manual method and process the input of a card password. In the above operations, the processor may not store raw data itself, such as a direct card number, and may store specific information (for example, virtual card information generated by mapping the raw data through a card server or a financial server) corresponding to the raw data.

According to various embodiments of the present disclosure, the processor (for example, an authentication module) may determine an authentication by registering an iris, voice, or face in addition to a method of registering a fingerprint or by using voice recognition or face recognition, and use it in addition to or instead of a fingerprint.

According to various embodiments of the present disclosure, a payment means registration (or payment card registration) method may include transmitting registration information relating to the payment means of a user to an external electronic device, receiving state information of a token for the payment means from the external electronic device, which is generated through the external electronic device by using the registration information, and displaying an indication corresponding to the state information of the token through a display in relation to an object for representing the payment means.

According to various embodiments of the present disclosure, the displaying of the indication may include when the state information satisfies a first condition (for example, a state in which a token stored in an electronic device is synchronized with a token server or token information stored in a token server), overlaying a specified text or image relatively dark, and when the state information satisfies a second condition (for example, a state in which the token is not synchronized), displaying the indication in a second state (for example, a state in which only a payment means or payment card image is displayed relatively bright).

According to various embodiments of the present disclosure, the displaying of the indication may include at least one of outputting a text or image corresponding to the token's synchronous or asynchronous state with the external electronic device or applying a display effect corresponding to the token's synchronous or asynchronous state to the object and displaying the object, outputting a text or image corresponding to the token's impending state by the external electronic device, or applying a display effect in a form corresponding to the token's impending state to the object and displaying the object and displaying the object, outputting a text or image corresponding to the token's expiration state by the external electronic device, or applying a display effect in a form corresponding to the token's expiration state and displaying the object, and outputting a text or image corresponding to the token's cancel or discard state by the external electronic device, or applying a display effect in a form corresponding to the tokens' cancel or discard state to the object and displaying the object.

The method may further include activating a camera in relation to the image acquisition corresponding to the payment means, automatically obtaining an image when a subject corresponding to a specified pattern is found, and outputting information extracted based on image analysis as registration information relating to the payment means on the display.

The method may further include modifying the registration information in correspondence to a user input.

Figure 20:
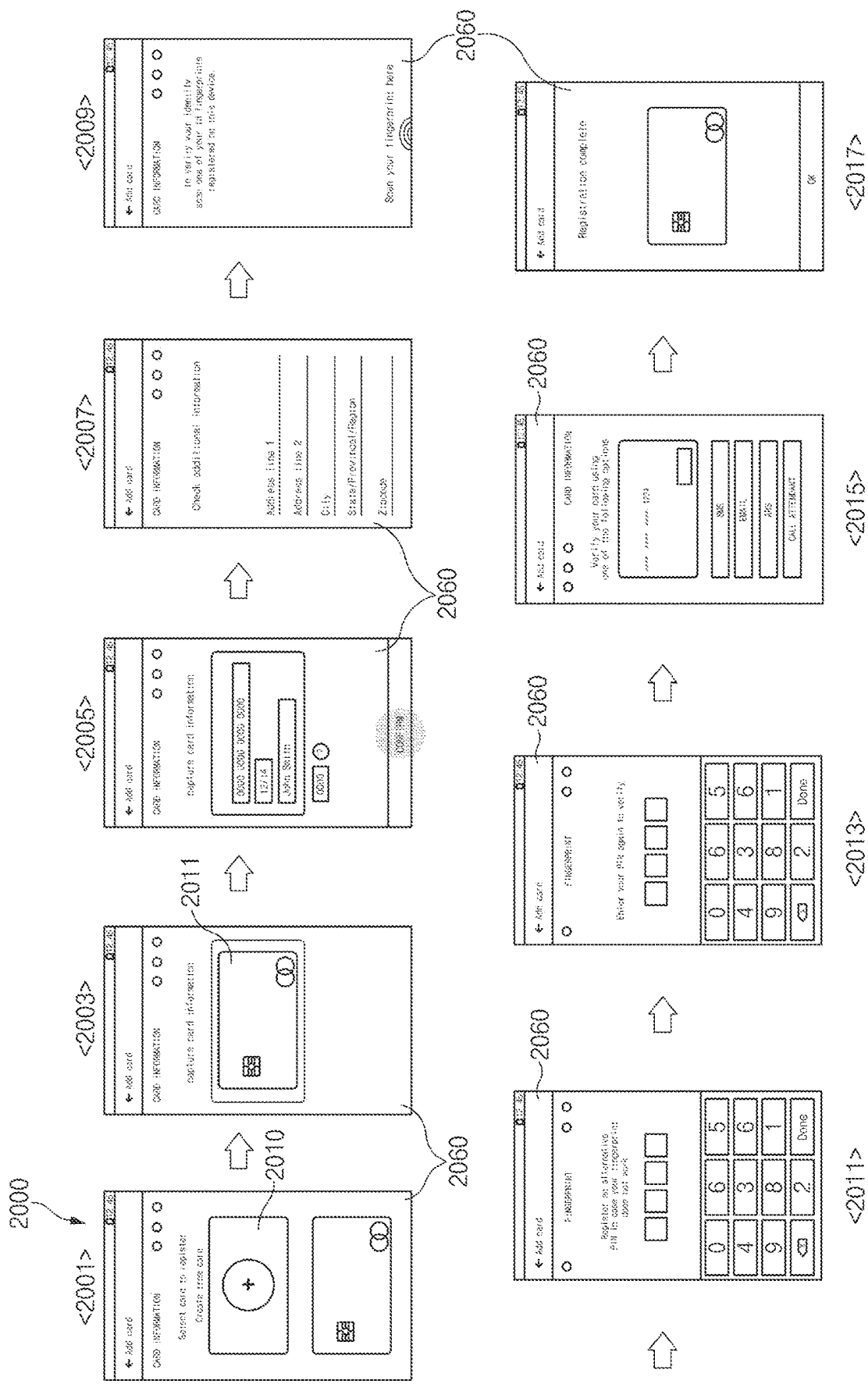
FIG. 20 is a display of multiple views illustrating a user interface of an electronic device relating to payment means information registration according to various embodiments of the present disclosure.

FIG. 20 is a display of multiple views illustrating a user interface of an electronic device relating to payment means information registration according to various embodiments of the present disclosure.

In order for actual use, mobile payment may register and store payment financial information such as a card (or payment means information or payment card information) in an electronic device in advance. The payment financial information may receive identification or authentication through a financial company such as a card issue company and a bank.

Referring to FIG. 20, an electronic device 2000 may output at least one payment UI to a display 2060 in relation to payment processing.

As shown in a state 2001, the electronic device 2000 may output a payment means information addition related UI on the display 2060. For example, the electronic device 2000 may output an additional virtual object 2010 for adding payment means information.

As shown in a state 2003, the electronic device 2000 may output a payment means information collection related UI on the display 2060. When the additional virtual object 2010 is selected, the electronic device 2000 may activate a camera and obtain a card related image 2011. The obtained card related image 2011 may be displayed to one side of the display 2060 as shown.

As shown in a state 2005, the electronic device 2000 may extract and output card information from the obtained image. A user may check card information and when OCR based checked card information is different, may modify it.

According to various embodiments of the present disclosure, as shown in a state 2007, the electronic device 2000 may output, on the display 2060, a UI relating to the input or modification of additional information relating to payment means information to be added. A user may input, for example, address information through a UI relating to the additional information input.

As shown in a state 2009, the electronic device 2000 may output a payment means information collection related UI on the display 2060. A user may register fingerprint information by touching a fingerprint sensor with a finger.

After fingerprint information registration completion, as shown in a state 2011, the electronic device 2000 may output a PIN information registration related UI on the display 2060. When the PIN information input is completed one time, as shown in a state 2013, the electronic device 2000 may output a PIN information repetition input related UI on the display 2060. When the one-time inputted PIN information matches repetitively inputted PIN information, the electronic device 2000 may complete the PIN information registration. If the PIN information is not matched, the electronic device 2000 may output an error message and output a PIN information re-input related UI (for example, a UI in a state 2011 or a state 2013).

When the PIN information registration is completed, as shown in a state 2015, the electronic device 2000 may output an ID&V related UI on the display 2060. The electronic device 200 may transmit a message for requesting authentication number transmission through a method according to a selected virtual button. When "call attendant" is selected, the electronic device 2000 may attempt a call connection with a related card server or a financial server. After the authentication number transmission request, the electronic device 2000 may output an authentication number input related UI and when the authentication number is inputted, transmit the inputted authentication number to a corresponding card server or financial server.

When an ID&V process is completed, as shown in a state 2017, the electronic device 2000 may output a payment means registration completion related UI on the display 2060.

During the operation, the electronic device 2000 may progress payment means information registration, stop payment means information registration, or output a network related message according to an electronic device's state, for example, a battery state or a network state. According to an embodiment of the present disclosure, when a specified level is not satisfied by checking a battery state during payment application execution, the electronic device 2000 may notify a user that the payment application cannot be used through a guide message (for example, popup notification) and then, does not progress the payment application related operation any further. According to various embodiments of the present disclosure, the electronic device 2000 may progress the payment application continuously or terminate it by checking whether a payment application operation related network is connected, whether a data transmission speed of more than a specified size is available, and whether a SIM is in an enabled state.

For example, when a remaining battery amount is less than 15%, the electronic device 2000 may notify a user about information on a power amount through at least one method of a pop-up message, sound or vibration for the power amount notification and then, execute the payment application. When the remaining battery amount is less than 10% or current is below a specified level, the electronic device 2000 may prevent the payment application from being executed and provide a warning message to a user. The size of the remaining battery amount relating to the above-mentioned payment application execution, guide message output, and payment application termination may vary according to a setting change.

According to various embodiments of the present disclosure, the electronic device 2000 may identify the stability of a device component specified to a specified time point (for example, when the payment application is executed, the booting, payment attempt, and token access of an electronic device where the payment application is installed) and then, when the stability is greater than a specified reference value, execute the payment application. Additionally, the electronic device 2000 may determine whether to execute the payment application and whether to stop the payment application during execution in consideration of a combination of whether a network is connected, a network data transmission speed of more than a predetermined value is available, a SIM is in an enabled state, or a battery is in a satisfactory state. When the payment application cannot be executed, the electronic device 2000 may notify a user that the payment application cannot be executed, through a message on a display such as pop-up notification, sound, vibration, or blinking LED.

Figure 21:
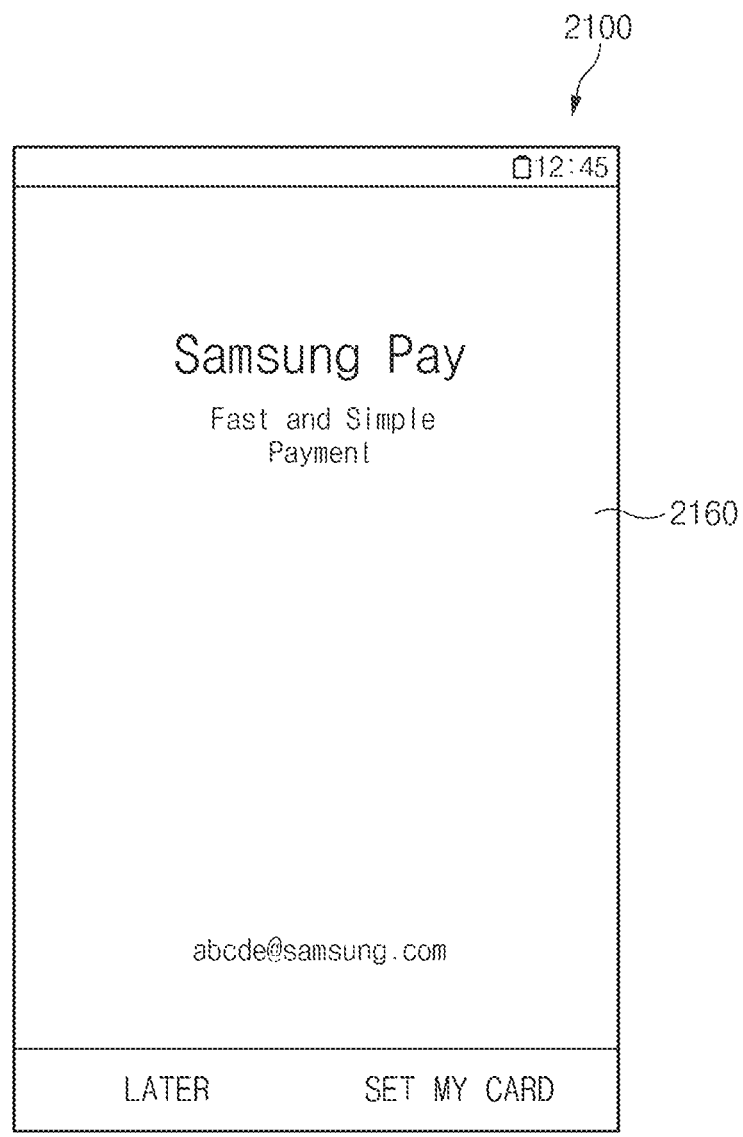
FIG. 21 is a view illustrating a payment application screen according to various embodiments of the present disclosure.

FIG. 21 is a view illustrating a payment application screen according to various embodiments of the present disclosure.

Referring to FIG. 21, an electronic device 2100 may output a screen on a display 2160 in relation to the payment application execution. According to an embodiment of the present disclosure, when performing an account login based on a specified account ID (for example, abcde), the electronic device 2100 may output a screen. As shown on the screen of FIG. 21, when a specified event (for example, a finger or pen based touch or hovering event on a corresponding area) occurs in relation to "set my card" listed at the right lower end of the display 2160, the electronic device 2100 may output a screen for card registration and setting on the display 2160. The specified event, for example, may include a tap event, double tap event, touch & hold event, flick event, hovering event, selection event by eye tracking, and voice recognition based input event. The expression "select" or "touch" a portion of a token server or a display device may include all of the above expressions (for example, expressions indicating tap, double tap, touch & hold, flick, hovering, eye tracking, and voice instruction). According to various embodiments of the present disclosure, when only one electronic device is used in relation to a user, an account processing operation may be omitted.

Figure 22:
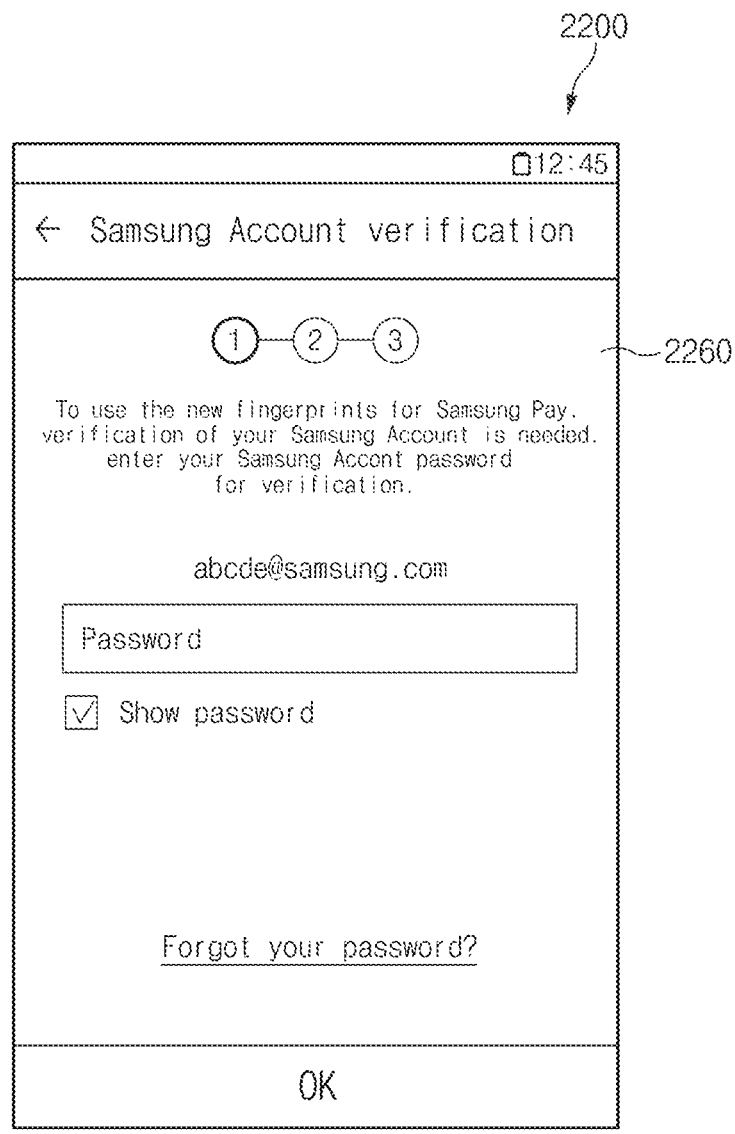
FIG. 22 is a view illustrating a payment application related account input screen according to various embodiments of the present disclosure.

FIG. 22 is a view illustrating a payment application related account input screen according to various embodiments of the present disclosure.

Referring to FIG. 22, an electronic device 2200 may output an account input related UI on a display 2260 as shown. When the same user uses several devices, the account input related UI may be used for transaction management, financial management, and card management through one account. For example, an account based payment means information registration or usage related system may integrate a plurality of electronic device through one account and it may be processed such that a card registered to the one account is selectively operated by the plurality of electronic devices.

According to an embodiment of the present disclosure, when a payment function is activated for each of a device A corresponding to an electronic device, a device B such as Galaxy Gear, and a device C that is a wearable device (for example, a fitness device), each of the three devices A, B, and C may view all transaction recordings. Additionally, when the device B is lost, the device A or C may deactivate the payment function of the device A. Based on this, by preventing the payment function of the lost device, the security aspect may be improved. Alternatively, when a specific device is lost, another device may deactivate the payment means or payment card of the specific device. Alternatively, according to another embodiment, when one card is registered by the device A, the device B or C may share the registered card information of the device A and use it in the same manner. In some cases, when it is necessary that a separate token is issued for each card of each device, the device A has the information of the device B or C and when one card is requested to be issued by a user, the payment application itself may request three cards to be used for the respective devices A, B, and C. Based on this, the device A may issue or register a card to be used for the device B or C. Based on the above-mentioned function, the inconvenience that the electronic device 200 requests the issue or registration of the same card redundantly for each device may be eliminated.

According to various embodiments of the present disclosure, a card registered to the device C is registered to the devices A and B together so that it may be used in the device A or B. According to various embodiments of the present disclosure, only some kinds of cards may be limited to be used according to a device. For example, according to a user setting, the device A may be set to use both a credit card and a debit card and the device B may be set to use the debit card.

Figure 23:
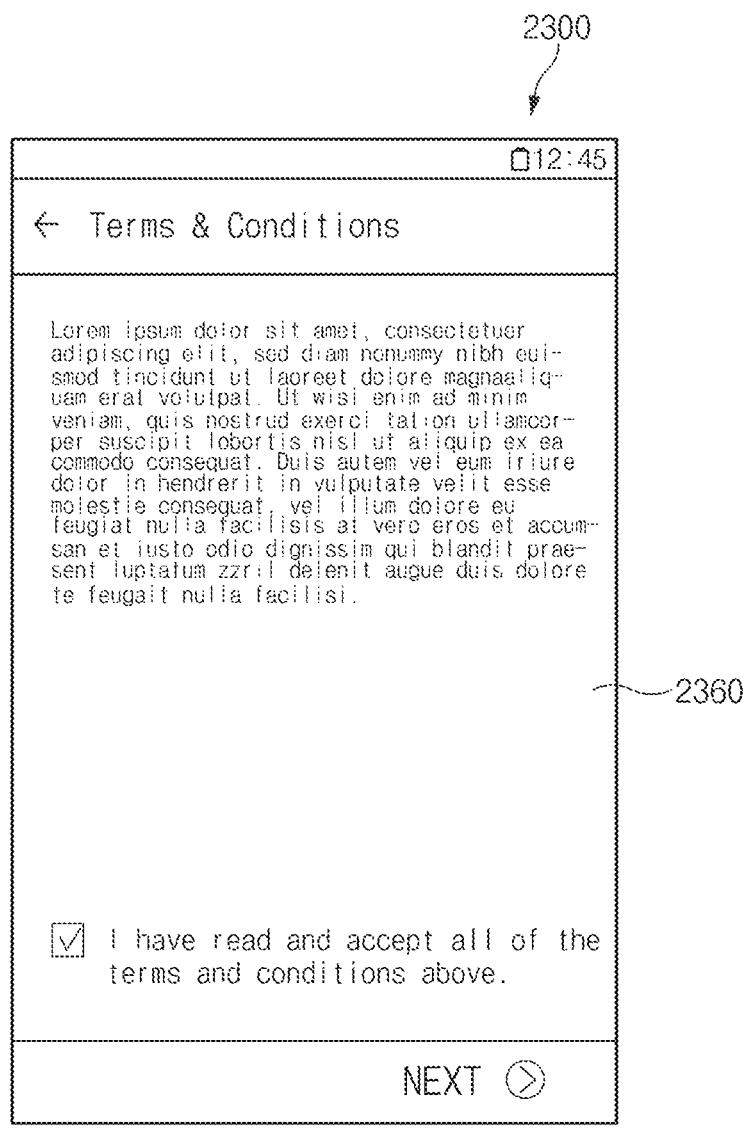
FIG. 23 is a view illustrating a terms and condition (T&C) display screen according to various embodiments of the present disclosure.

FIG. 23 is a view illustrating a T&C display screen according to various embodiments of the present disclosure.

Referring to FIG. 23, when account registration and login are completed, an electronic device 2300 may output, on a display 2360, T&C information relating to payment related conditions and transaction descriptions. When T&C agreement is performed, the electronic device 2300 may be limited to use payment application. The transaction T&C may vary according to countries and regions.

Figure 24:
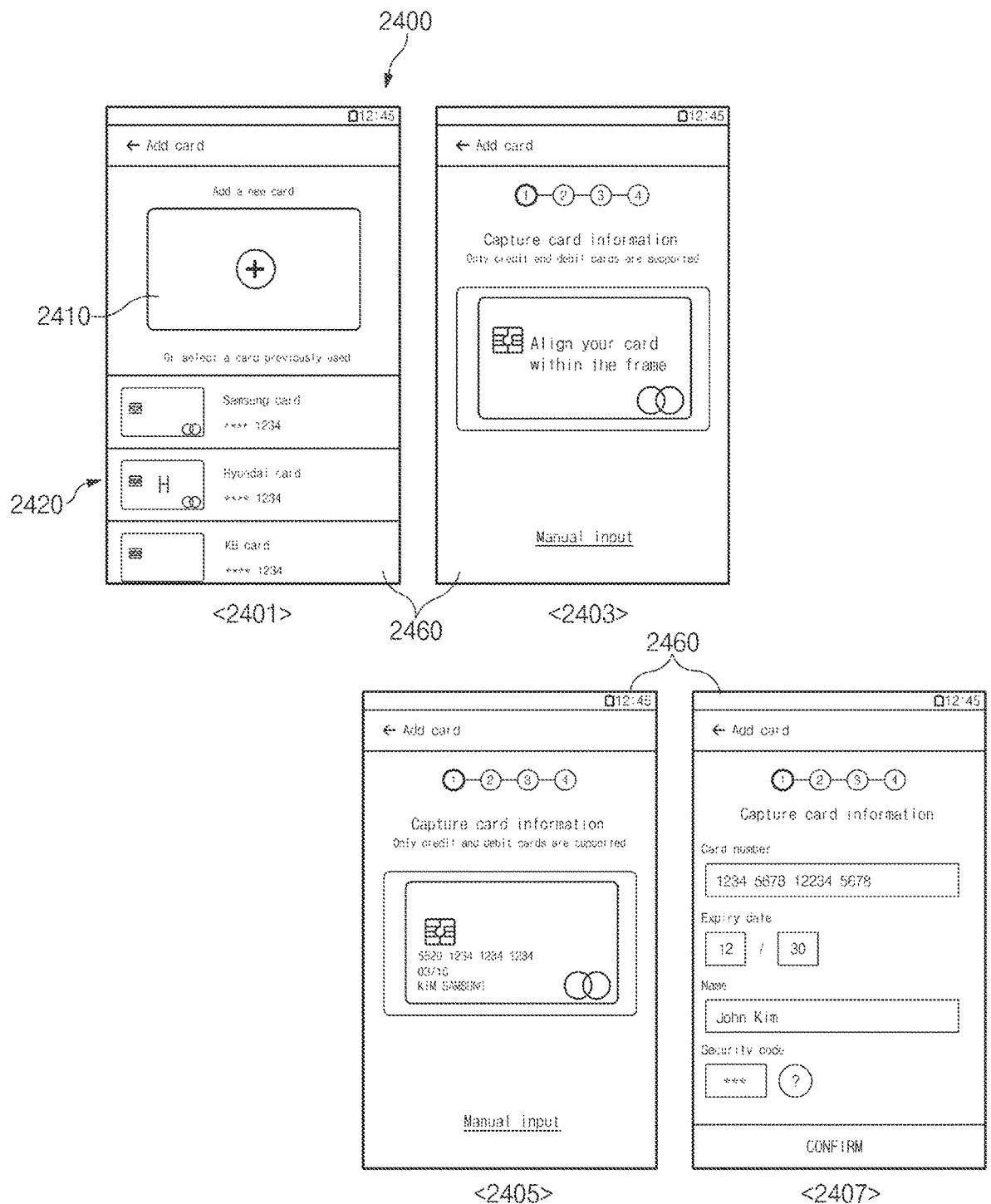
FIG. 24 is a display of multiple views illustrating a payment means information addition screen according to various embodiments of the present disclosure.

FIG. 24 is a display of multiple views illustrating a payment means information addition screen according to various embodiments of the present disclosure.

Referring to FIG. 24, an electronic device 2400 may output UIs in a state 2401, a state 2403, a state 2405, and a state 2407 in relation to payment means information addition as shown. In the state 2401, the electronic device may output, on a display 2460, an addition object 2410 for adding new payment means information and a card list 2420 relating to previously added cards. When an event relating to at least a partial area of the addition object 2410, for example, a symbol area disposed at the center, occurs, the electronic device 2400 may output the UI in the state 2403 on the display 2460. The UI provided in the state 2403, for example, may include an addition object area where a card image is to be disposed at the center and display a preview image obtained by a camera in the addition object area. Guide information relating to card image placement may be displayed in the addition object area.

According to various embodiments of the present disclosure, the electronic device 2400 may activate a camera automatically when an event relating to the selection of the addition object 2410 occurs. Additionally, when a preview image is disposed on the additional object area, the electronic device 2400 may execute an OCR module for analyzing an image obtained by a camera.

As shown in the state 2405, when a user adjusts a real card to be disposed at the screen center portion of the electronic device 2400, the electronic device 2400 may obtain an image automatically and obtain card information automatically through the obtained image. In relation to this, the electronic device 2400 may store a text image for the card image, and when a card image corresponding to the text image is captured as a preview image, capture and obtain the card image automatically. According to various embodiments of the present disclosure, a user may obtain a card related image. According to various embodiments of the present disclosure, when there is no camera or a camera cannot be executed, the electronic device 2400 may upload a real card related image file and when a card image is loaded, recognize card data automatically. The card image, for example, may be obtained from another electronic device or server. The camera may be built in an electronic device, have a form of an accessory communicating with an electronic device, or may be included in an external device.

The electronic device 2400 may automatically recognize data including a card type, card number (or PAN), valid date, name, and so forth, which are shown on a real card. The electronic device 2400 may allow a user to modify automatically-recognized data through a manual method or newly create data after deleting at least part of the automatically-recognized data.

In the state 2407, when a card is recognized through an OCR module or a card is recognized based on a card image, the electronic device 2400 may overwrap an actually-recognized text such as a card number, valid date, and name on the card image and display the image in order to allow a user to check the image immediately. A user may check whether card data automatically recognized through OCR is accurate data. According to various embodiments of the present disclosure, in the state 2407, the electronic device 2400 may change the transparency or color of a displayed card image and then, map, overwrap or overlay the text (for example, a card number, valid data, and name) thereon and display it. During this operation, the electronic device 2400 may change the text with a different color, size, or font type according to card image and display it.

When a manual input is selected or a specified time elapses in the state 2407, the electronic device 2400 may output a UI as shown in the state 2409. During this operation, the electronic device 2400 may display final card data, and receive a user's confirmation.

Figure 25:
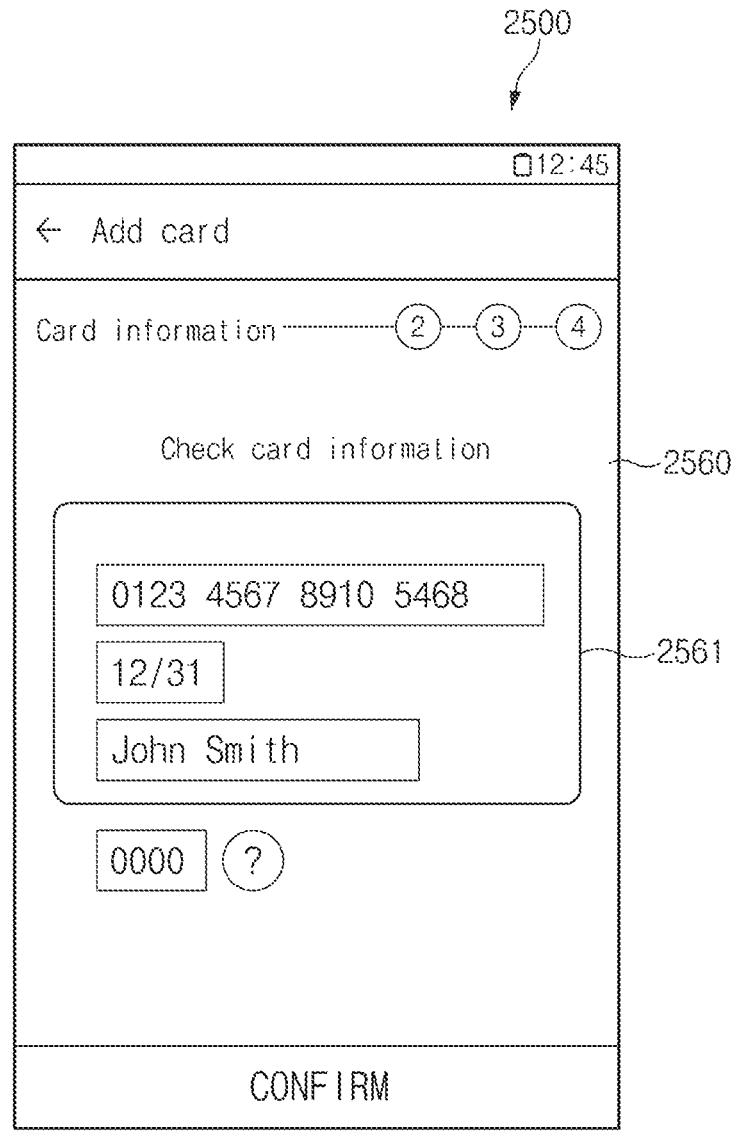
FIG. 25 is a view illustrating a user input based payment means operation support related screen according to various embodiments of the present disclosure.

FIG. 25 is a view illustrating a user input based payment means operation support related screen according to various embodiments of the present disclosure.

Referring to FIG. 25, when a payment means information registration or addition related request occurs, an electronic device 2500 may output an information input UI 2561 based on a user input on a display 2560. The information input UI 2561 may include a UI for inputting a PAN, user name, expiration date, and so forth, according to a user input. In relation to this, when a specific blank is selected from the information input UI 2561, the electronic device 2500 may output a number or character input available virtual keyboard or virtual keypad. A security code may be received through a user's manual input or the above-mentioned OCR routine.

When a PAN is inputted according to a payment application execution, the electronic device 2500 may transmit corresponding information to a token server through a payment server in relation to the enrollment of the inputted PAN. During this operation, the electronic device 2500 may transmit an encrypted PAN obtained through encryption to a payment server or a token server. Additionally, a device profile including whether to support an MST or an NFC, that is, a card payment method supported by an electronic device, may be transmitted to a server such as a token server.

Figure 26:
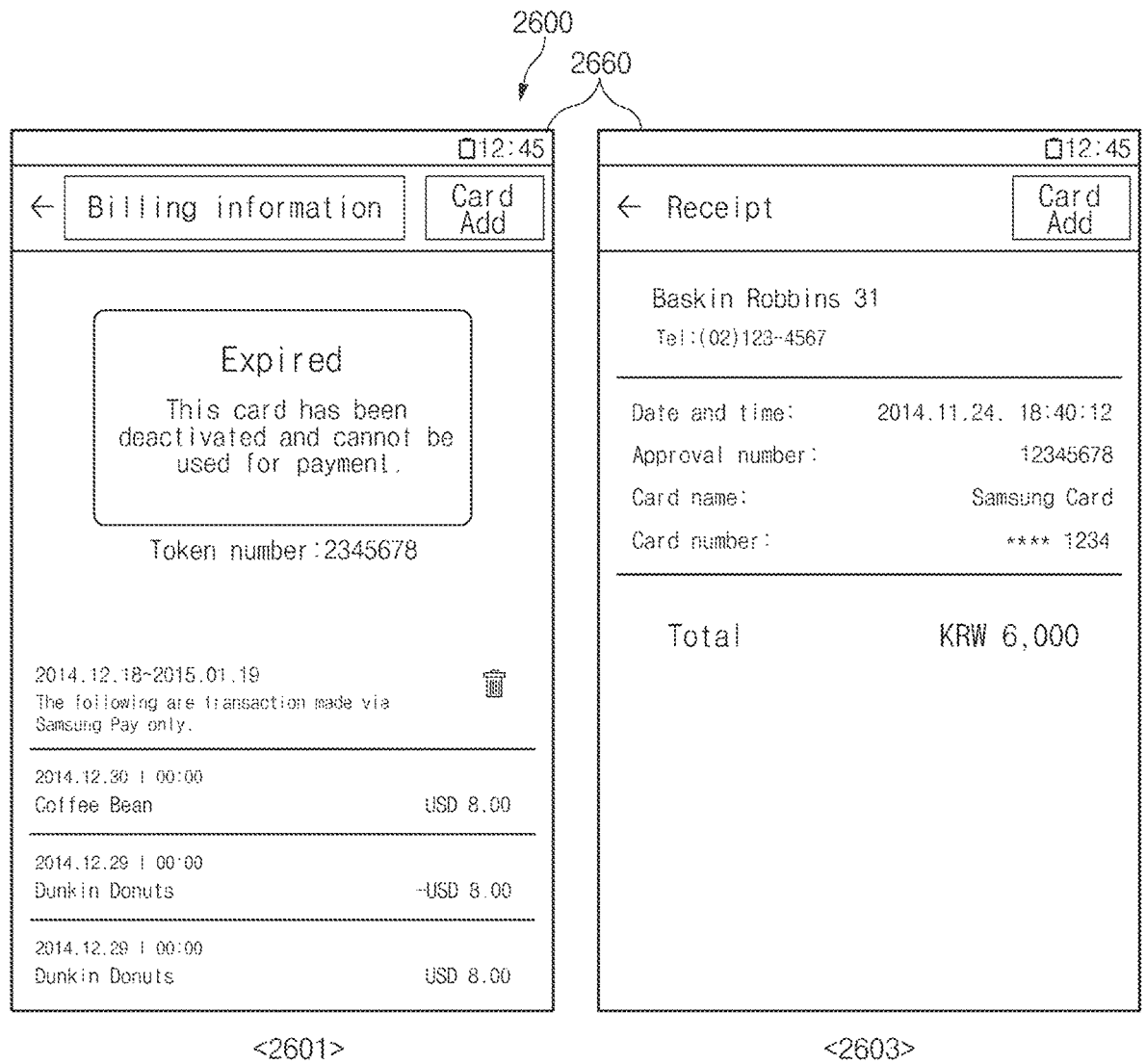
FIG. 26 is a display of multiple views illustrating a billing information based payment means information registration screen according to various embodiments of the present disclosure.

FIG. 26 is a display of multiple views illustrating a billing information based payment means information registration screen according to various embodiments of the present disclosure.

Referring to FIG. 26, an electronic device 2600 may process payment means information registration based on billing information of a previously used card. When a corresponding card is deleted from a payment application, the billing information, for example, may be stored in relation to a payment application. Accordingly, the electronic device 2600 may provide a menu or item using billing information in relation to payment means information registration or addition. When a billing information based payment means information registration is requested, the electronic device 2600 may output a UI as shown in a state 2601 including billing information. For example, the external electronic device 2600 may output a billing information related list on a display 2660. When a specific item is selected in a state 2601, the electronic device 2600 may output detail information relating to the selected item on the display 2660 as shown in a state 2603. The detail information, as shown in the drawing, for example, may include a card name and at least part of a card number.

When a billing information based payment means registration is requested, the electronic device 2600 may extract a card name and a card number, and output the extracted information through a payment means registration related UI (as shown for example, in FIG. 25). According to an embodiment of the present disclosure, when a portion that requires security such as a card number in billing information is not displayed clearly, the electronic device 2600 may allow a user to edit or supplement a corresponding portion (for example, a special character processed portion). According to an embodiment of the present disclosure, when an event (for example, a virtual button selection event corresponding to "Card Add") specified in a state 2601 of displaying billing information or a state 2603 for displaying a receipt occurs, the electronic device 2600 may extract card related information from billing information or receipt information and output a UI relating to the payment means information registration based on the extracted card related information.

Figure 27:
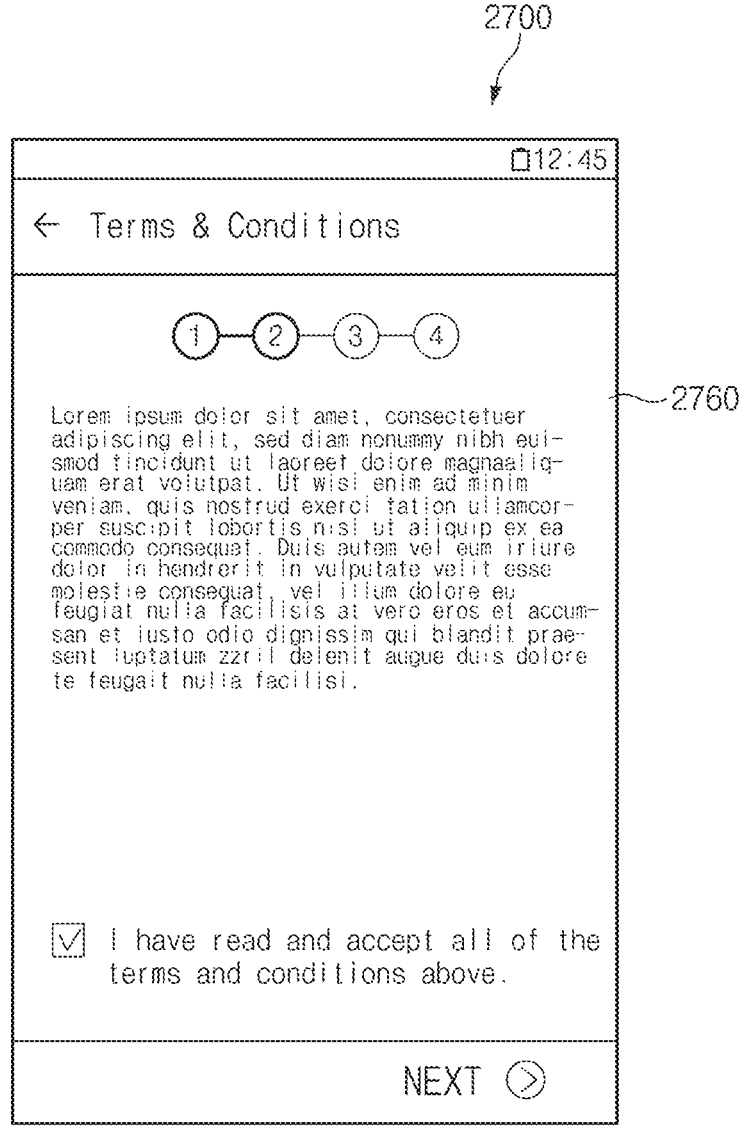
FIG. 27 is a view illustrating a T&C display screen according to various embodiments of the present disclosure.

FIG. 27 is a view illustrating a T&C display screen according to various embodiments of the present disclosure.

Referring to FIG. 27, after card data input completion, when a specified event (for example, a virtual button selection event for indicating the card data input completion) occurs, an electronic device 2700 may output card issuer related T&C information. During this operation, the electronic device 2700 may output an image or text for indicting the current operation in relation to the payment means information registration, to a predetermined position (for example, an upper end of a screen). A user may accept or reject corresponding card issuer related T&C information. The electronic device 2700 may output a T&C information agreement related virtual confirmation button or check button to a display 2760.

Figure 28:
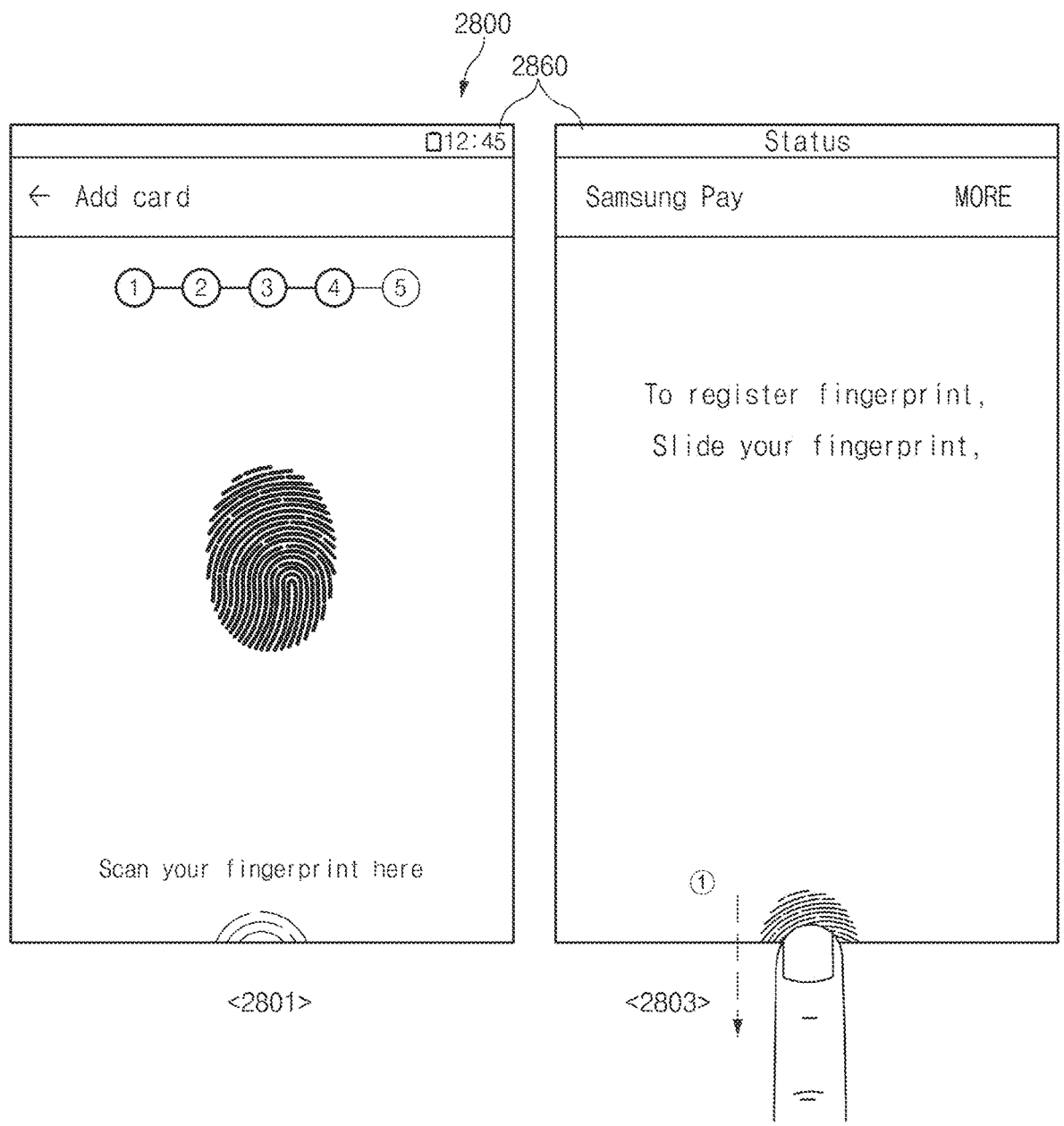
FIG. 28 is a display of multiple views illustrating fingerprint information processing according to various embodiments of the present disclosure.

FIG. 28 is a display of multiple views illustrating fingerprint information processing according to various embodiments of the present disclosure.

Referring to FIG. 28, an electronic device 2800 may use fingerprint information in order for user authentication in relation to payment application execution, payment application progressing, and payment processing. For example, in order to use the payment service of a payment application called Simple Pay or Quick Pay, the electronic device 2800 may request a security check process based on fingerprint information. In relation to this, the electronic device 2800 may output a fingerprint information acquisition related UI on a display 2860.

The electronic device 2800 may have a set state in which fingerprint information is set for security release relating to a basic operation (for example, a lock or release function and a specific application execution related lock or release function) of an electronic device or an unset state. Accordingly, when the fingerprint information is set in relation to the basic operation, the electronic device 2800 may omit a fingerprint information registration process in relation to payment application. When a fingerprint information registration process is omitted, the electronic device 2800 may output guide information for indicating that the fingerprint information is already registered. Additionally, when the fingerprint information registration process is omitted, the electronic device 2800 may omit an additional guide information input. When fingerprint information is already registered, the electronic device 2800 may perform processing to use the registered fingerprint information in a linkage to a payment application. According to various embodiments of the present disclosure, regardless of a state in which fingerprint registration is already performed or a state in which a fingerprint is not registered, the electronic device 2800 may omit a fingerprint registration process.

In relation to fingerprint recognition, the electronic device 2800 may support at least one of an area type shown in a state 2801 and a swipe type shown in a state 2803. For example, even when fingerprint information is registered based on the area type, the electronic device 2800 may process authentication, based on fingerprint information obtained through at least one of the area type and swipe type methods during a payment process. In relation to this, the electronic device 2800 may include a sensor and a fingerprint recognition module for supporting at least one of the area type and the swipe type. Additionally, the electronic device 2800 may separately output an area type or swipe type related user interface on the display 2860. The area type fingerprint sensor and the swipe type fingerprint sensor may be disposed at different surfaces of the electronic device 2800. For example, according to various embodiments of the present disclosure, the area type fingerprint related sensor may be disposed at a front surface (or a rear surface) of the electronic device 2800 and the swipe type related fingerprint sensor may be disposed at the rear surface (or the front surface) of the electronic device 2800.

Figure 29:
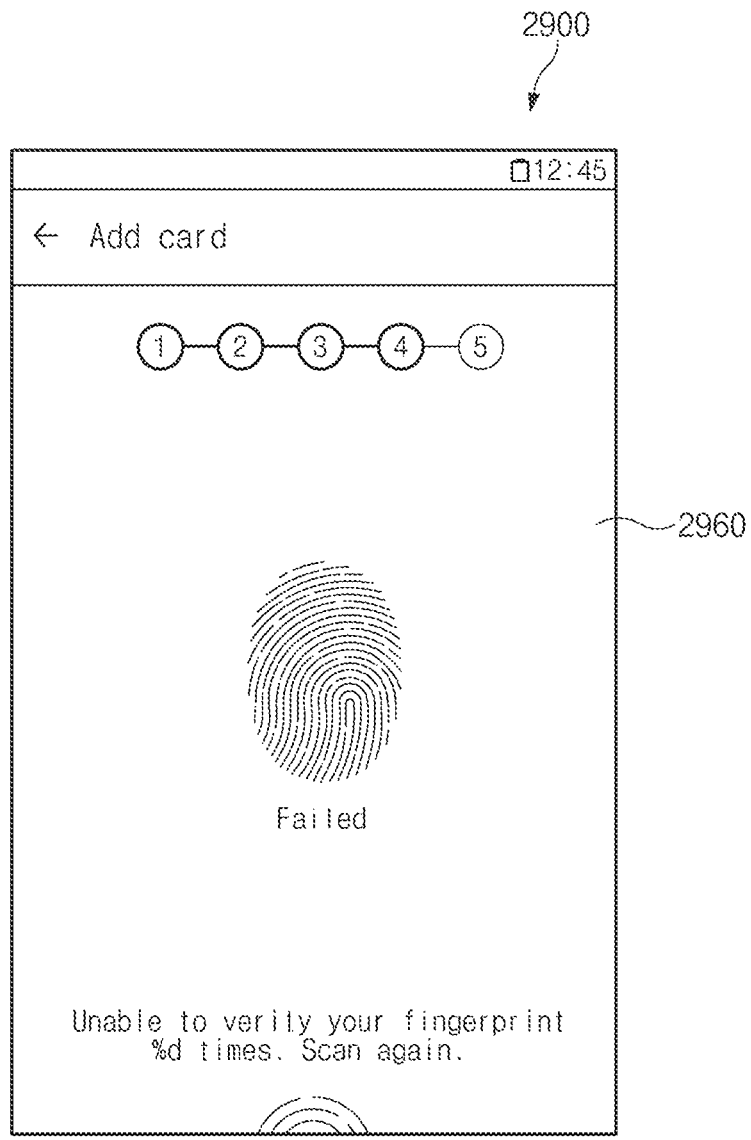
FIG. 29 is a view illustrating a fingerprint information processing error related UI according to various embodiments of the present disclosure.

FIG. 29 is a view illustrating a fingerprint information processing error related UI according to various embodiments of the present disclosure.

Referring to FIG. 29, during a fingerprint recognition operation, an electronic device 2900 may not recognize a user's fingerprint normally or output specified guide information, when an error occurs. For example, when fingerprint recognition fails, the electronic device 2900 may try again but only for a predetermined number of times. When fingerprint recognition failure occurs, the electronic device 2900 may allow a user to recognize the fingerprint recognition failure by outputting a specified sound and vibration (for example, haptic feedback). When the fingerprint recognition is successful, the electronic device 2900 may also output a specified sound and vibration (for example, haptic feedback) for indicating the fingerprint recognition success. The electronic device 2900 may output different sounds or vibrations used for the fingerprint recognition failure and success. According to various embodiments of the present disclosure, the electronic device 2900 may also output an image or text relating to fingerprint recognition failure or success on a display 2960. If fingerprint recognition fails more than a specified number of times, the electronic device 2900 may perform device lock processing in order to prevent the attempt of the fingerprint recognition process for a specified time. After the specified time elapses, the electronic device 2900 may allow attempts of the fingerprint recognition again. According to various embodiments of the present disclosure, when fingerprint recognition fails more than the specified number of times, the electronic device 2900 may transmit a fingerprint recognition failure related message to a specified external electronic device or network.

Figure 30:
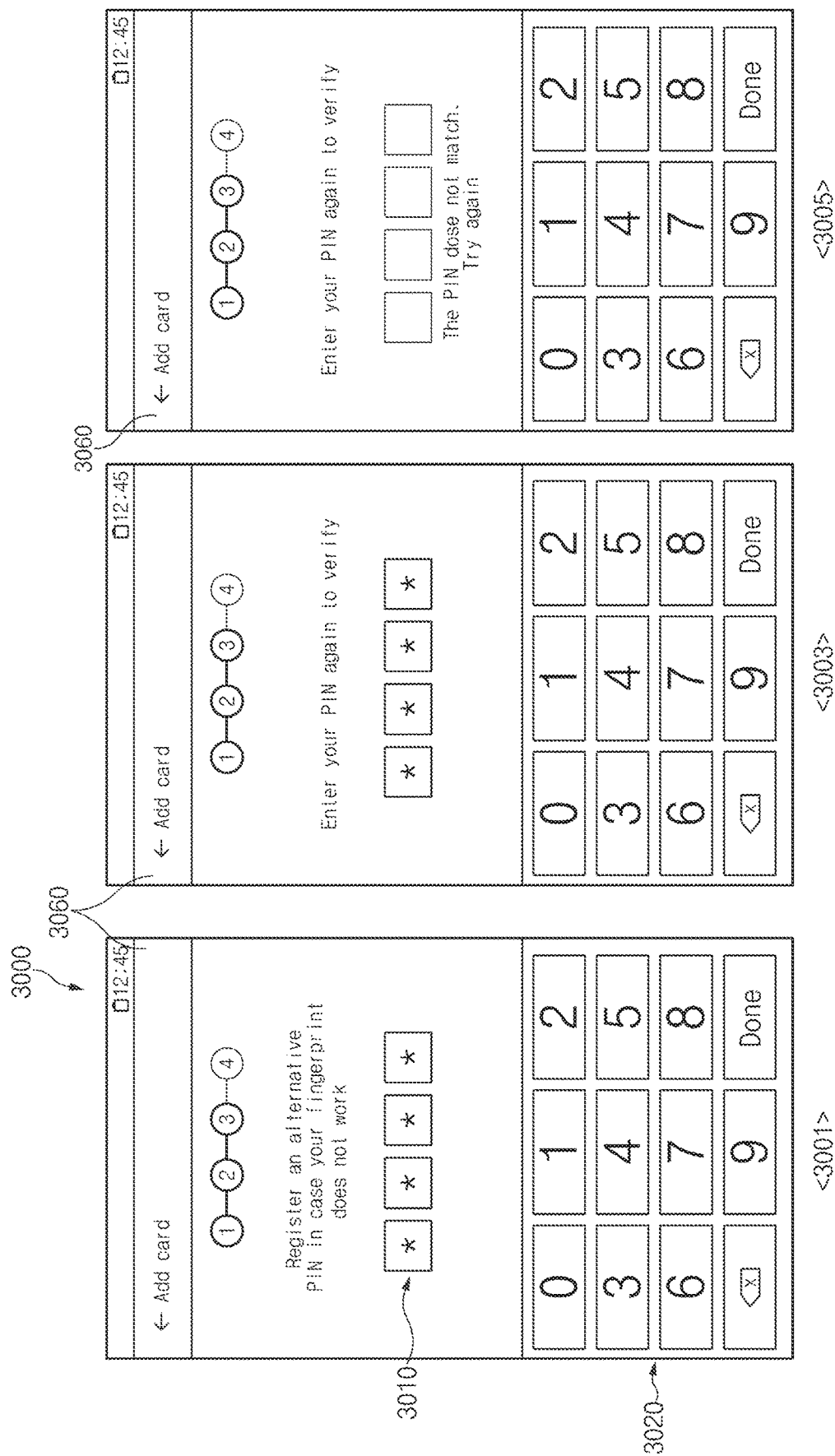
FIG. 30 is a display of multiple views illustrating an example of a personal identification number (PIN) information registration screen according to various embodiments of the present disclosure.

FIG. 30 is a display of multiple views illustrating an example of a PIN information registration screen according to various embodiments of the present disclosure.

Referring to FIG. 30, an electronic device 3000 may support PIN information registration in relation to the security authentication of a payment application. Although it is described above that both fingerprint information registration and PIN information registrations are performed, a payment application operation related authentication processing method may include a method of selectively applying at least one of the two information registrations. For example, according to a user setting or the policy of an electronic device 3000, only the fingerprint information operation may be applied in relation to a payment application operation or only PIN information operation may be applied in relation to a payment application. Additionally, the electronic device 3000 may support a security authentication function based on fingerprint information and PIN information.

In relation to the PIN information registration, the electronic device 3000 may process a PIN information registration process. In relation to this, the electronic device 3000 may output a PIN information registration related UI. A user may perform PIN information registration based on a PIN information registration related UI. When the PIN information registration is completed, the electronic device 3000 may request a PIN information input during payment application progressing and when correct PIN information is inputted, perform payment processing.

FIG. 30 illustrates a registration method of repeatedly inputting four digits as one embodiment of registering a PIN number. As shown in a state 3001, the electronic device 3000 may output a virtual keypad 3020 for inputting digit information on a display 3060 and output a PIN information display area 3010 for indicating the inputted information. In the PIN information display area 3010, the electronic device 3000 does not output a digit image corresponding to the inputted information and instead, may output only a specified image (for example, special characters).

When PIN information is inputted in the state 3001, the electronic device 3000 may request PIN information re-input as shown in a state 3003. When the PIN information inputted in the state 3003 is different from the PIN information inputted in the state 3001, as shown in a state 3005, the electronic device 3000 may output information notifying that the PIN information is not correct. In this case, the electronic device 3000 may reset previously inputted PIN information and return to the state 3001 and then, again perform the PIN information setting and re-input operation. Additionally, the electronic device 3000 may reset the PIN information inputted in the state 3003 and return to the state 3003 and then, request the PIN information re-input.

Figure 31:
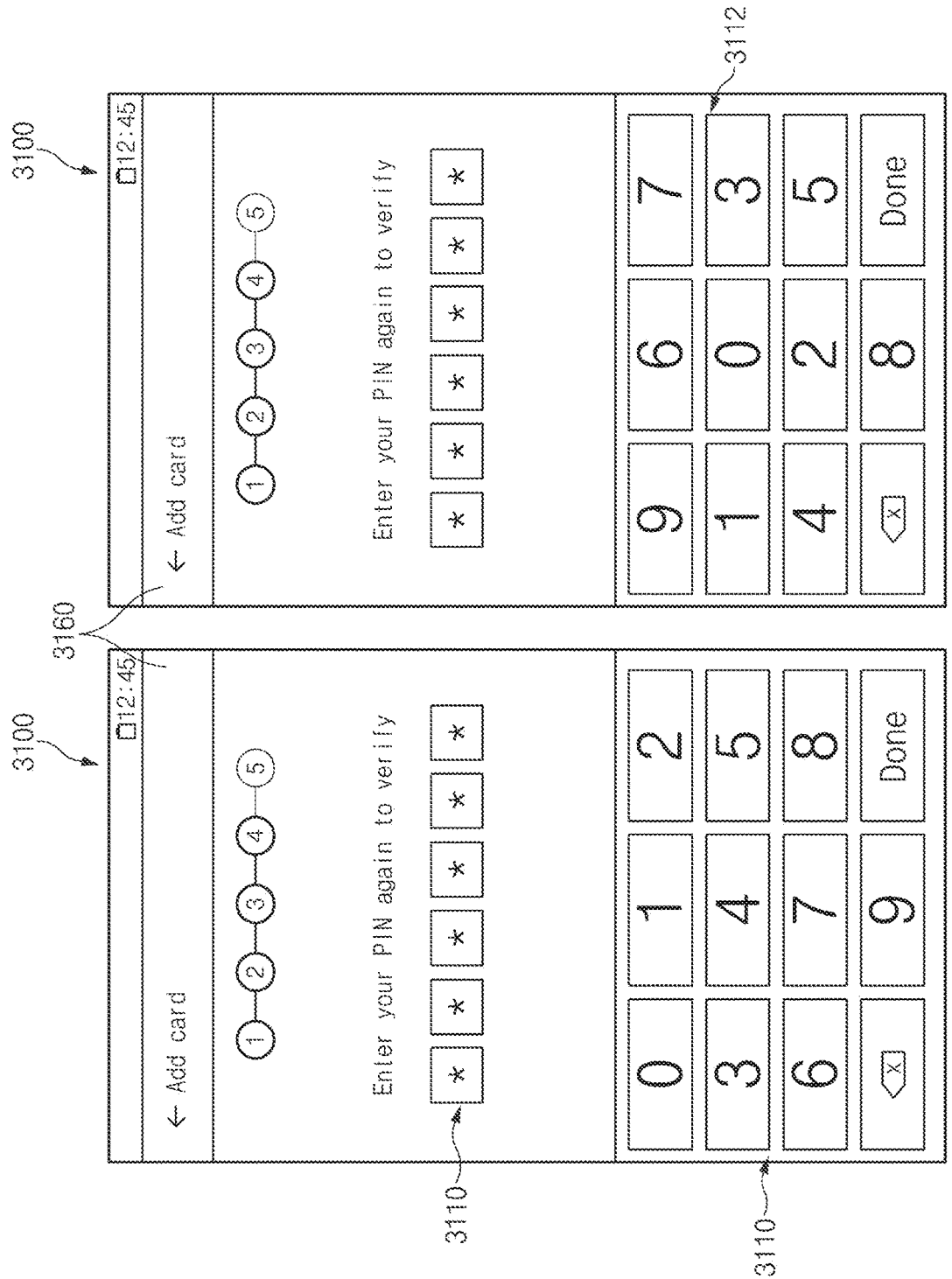
FIG. 31 is a display of multiple views illustrating another example of a PIN information registration screen according to various embodiments of the present disclosure.

FIG. 31 is a display of multiple views illustrating another example of a PIN information registration screen according to various embodiments of the present disclosure.

Referring to FIG. 31, an electronic device 3100 may support a PIN information input of various digit numbers in addition to the four-digit PIN information described with reference to FIG. 30. For example, as shown in a state 3101, the electronic device 3100 may support a six-digit PIN information input. In relation to this, the electronic device 3100 may output a six-digit PIN information display area 3110 on a display 3160. Additionally, the electronic device 3100 may output a first virtual keypad 3111 for PIN information input on the display 3160. A user may process the 6-digit PIN information input based on the first virtual keypad 3111. The first virtual keypad 3111 may be a keypad including numbers, characters (Alphabet, Hangul, and so forth), and special characters. The PIN information may include characters in addition to numbers.

When a first PIN information input is completed, the electronic device 3100, as shown in a state 3103, may output a second virtual keypad 3112 on the display 3160. The second virtual keypad 3112, for example, may have an arrangement different from that of numbers or characters disposed on the virtual keypad 3111. Information inputted through the second virtual keypad 3112 may be obtained as second PIN information and the second PIN information may be compared to the first PIN information. The PIN information input UI shown in the state 3101 and the state 3103, for example, may be a PIN information registration related interface or a PIN information authentication related interface. The first virtual keypad 3111 or the second keypad 3112 shown in the state 3101 and the state 3103 may be a layer operating in a secure mode.

Figure 32:
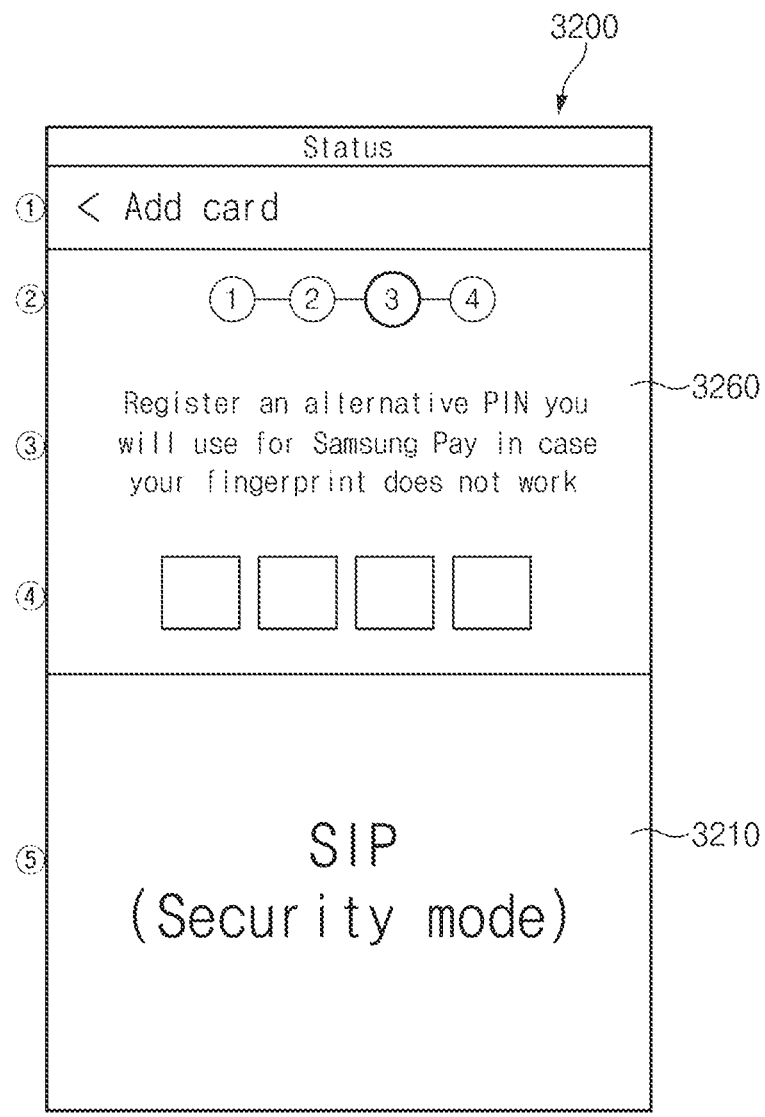
FIG. 32 is a view illustrating another example of a PIN information registration screen according to various embodiments of the present disclosure.

FIG. 32 is a view illustrating another example of a PIN information registration screen according to various embodiments of the present disclosure.

Referring to FIG. 32, an electronic device 3200 may output a keypad area 3210 for receiving a user's input during PIN number input as a layer form that separately operates in a secure mode. For example, the electronic device 3200 may output the keypad area 3210 and the remaining areas as another layer. The keypad area 3210, for example, is a trust UI layer, and may be set with a security function. According to an embodiment of the present disclosure, the keypad area 3210 may be displayed with a different arrangement of numbers each time it is shown or each time a screen is updated. Additionally, the electronic device 3200 may deliver only coordinates touched by a finger or a pen instead of inputted number or character information to a keypad processing module or a touch system, and the keypad processing module or the touch system may recognize which character or number is selected based on the coordinates. In relation to this, the electronic device 3200 may output a selected character or number information display area 3260.

According to various embodiments of the present disclosure, the number of characters of the keypad area 3210 may not be fixed and may be displayed differently according to a situation. For example, the numbers or characters displayed in the keypad area 3210 may be differently arranged each time a screen is updated so that information inputted through a number inputting pattern may be processed not to be identified. According to various embodiments of the present disclosure, the electronic device 3200 may omit payment application related PIN registration and PIN operation parts according to a user setting or a policy.

Figure 33:
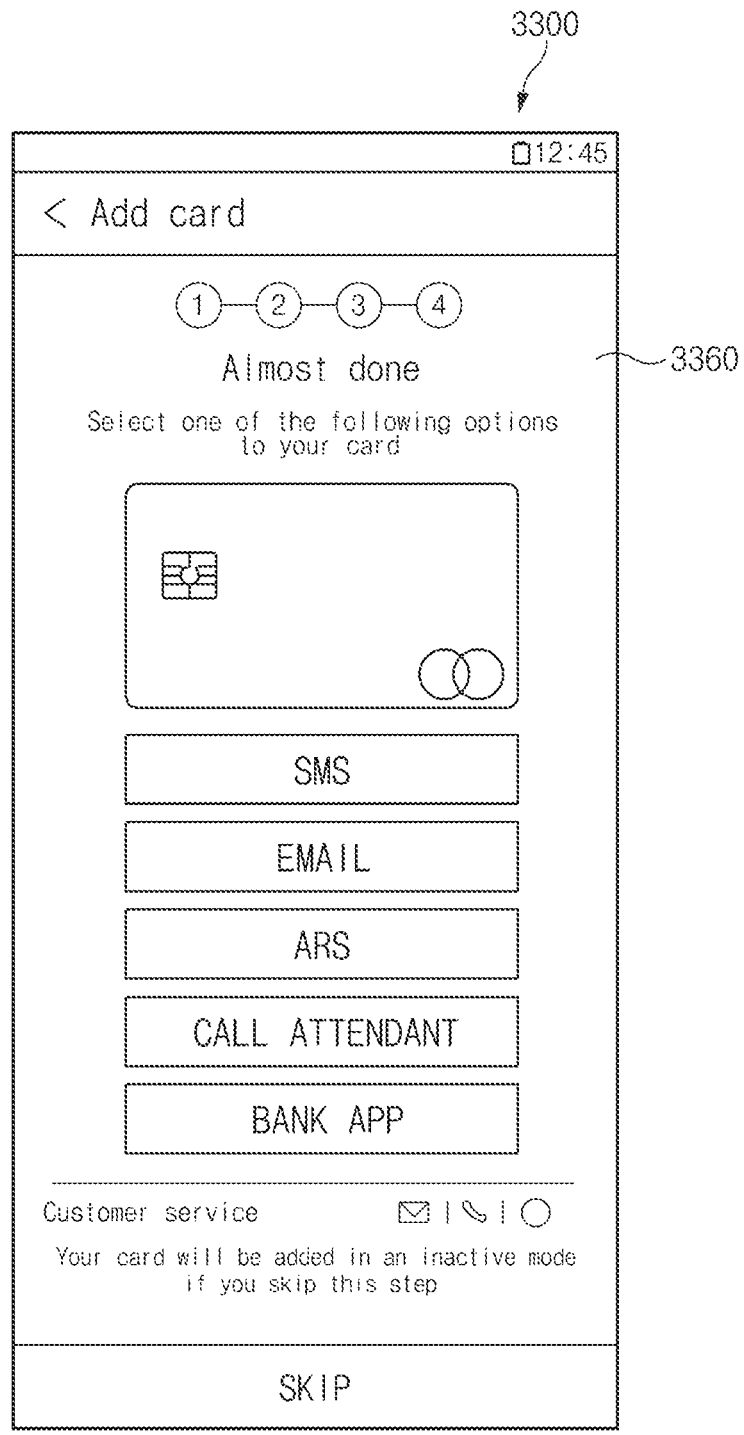
FIG. 33 is a view illustrating an identification and verification (ID&V) related UI according to various embodiments of the present disclosure.

FIG. 33 is a view illustrating an ID&V related UI according to various embodiments of the present disclosure.

Referring to FIG. 33, when fingerprint information or PIN information registration is completed, an electronic device 3300 may output an ID&V related UI on a display 3360. The electronic device 3300 may support at least one of various methods such as SMS, Email, ARS, Call attendant, and Bank App, as an ID&V process. In relation to this, the electronic device 3300 may output a virtual key button for selecting each ID&V method on the display 3360. The ID&V method may include various methods in addition to the above method. When various methods are added, a virtual key button corresponding to an added method may also be outputted on the display 3360.

According to various embodiments of the present disclosure, after token provisioning is performed technically in some countries and regions without token provisioning and a token is received from a token server, an ID&V process may be performed. According to various embodiments of the present disclosure, token provisioning may be performed together with an ID&V process.

During the ID&V processing, the electronic device 3300 may keep and store a token delivered through an external token server in at least one of a TEE, a REE, and a secure element. When the token is in a pending state still and push notification is received from a token server after an ID&V process, the electronic device 3300 may change a token state into an active state and perform synchronization.

Figure 34:
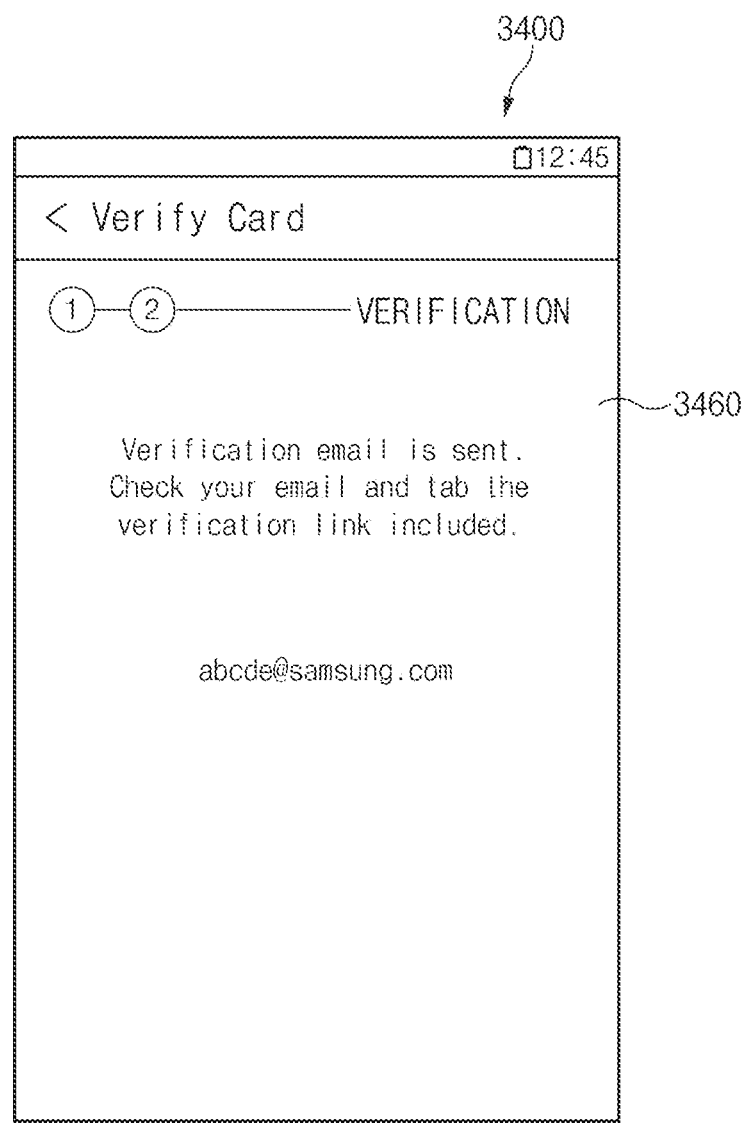
FIG. 34 is a view illustrating a UI depending on ID&V normal execution according to various embodiments of the present disclosure.

FIG. 34 is a view illustrating a UI depending on ID&V normal execution according to various embodiments of the present disclosure.

Referring to FIG. 34, an e-mail method may be selected among ID&V methods according to a user input or setting. When the e-mail method is selected, an electronic device 3400 may receive a verification e-mail through account information (for example, e-mail registered to a SAMSUNG account). In relation to this, the electronic device 3400 may provide a user e-mail input related UI during account registration. Additionally, when an e-mail related virtual key button is selected through the ID&V method, the electronic device 3400 may output an e-mail address input related UI. According to various embodiments of the present disclosure, the electronic device 3400 may output at least one of a message for guiding whether to use an image address registered to an account or a new e-mail address input message, on a display 3460. When an external server (for example, a token server, card server, financial server, and so forth) for performing an ID&V process receives an ID&V progress request related message, it may transmit a confirmation message to the electronic device 3400 in response to a method that the electronic device 3400 requests. When an external server transmits a confirmation message, the display 3460 may output a screen indicating the confirmation message transmission. The screen illustrates a form in which the confirmation message is transmitted through an e-mail address.

Figure 35:
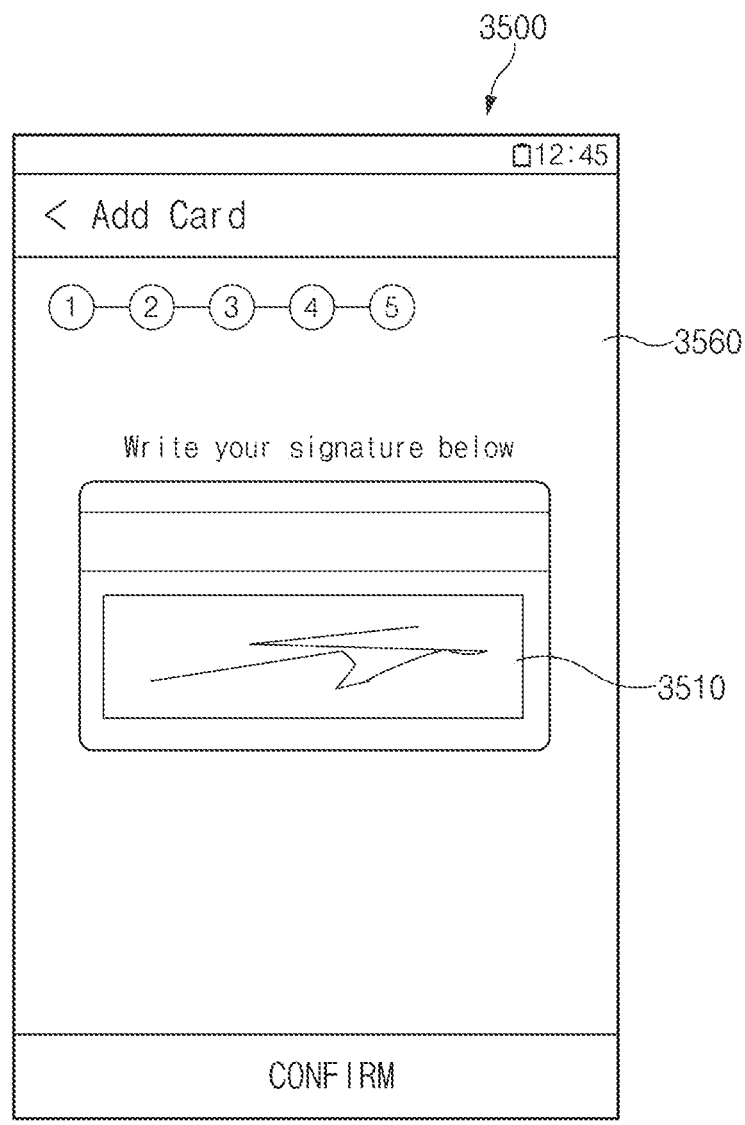
FIG. 35 is a view illustrating a signature information registration screen according to various embodiments of the present disclosure.

FIG. 35 is a view illustrating a signature information registration screen according to various embodiments of the present disclosure.

Referring to FIG. 35, an electronic device 3500 may support a signature registration process according to a policy selection or a user setting. A specific country, region, or company may require a user signature input during a payment progress process. The signature may be used as an authentication method when payment is made together with fingerprint information. Alternatively, a signature may be compared and checked with signature information stored in a card company and may be used as a method of checking whether a card registration request is normal. As mentioned above, a signature operation method may vary according to a situation and may be not used at all or may vary according to each financial company.

The electronic device 3500 may output a UI including a signature writing area 3510 for writing a signature in relation to signature registration, on a display 3560. When a signature is written in the signature writing area 3510, the electronic device 3500 may output a virtual key button (for example, a confirm button) for completing the signature process, on the display 3560. Alternatively, the electronic device 3500 may output the signature writing area 3510 and the virtual key button together. When the signature completion related virtual key button is selected, the electronic device 3500 may complete the payment means information registration.

Figure 36:
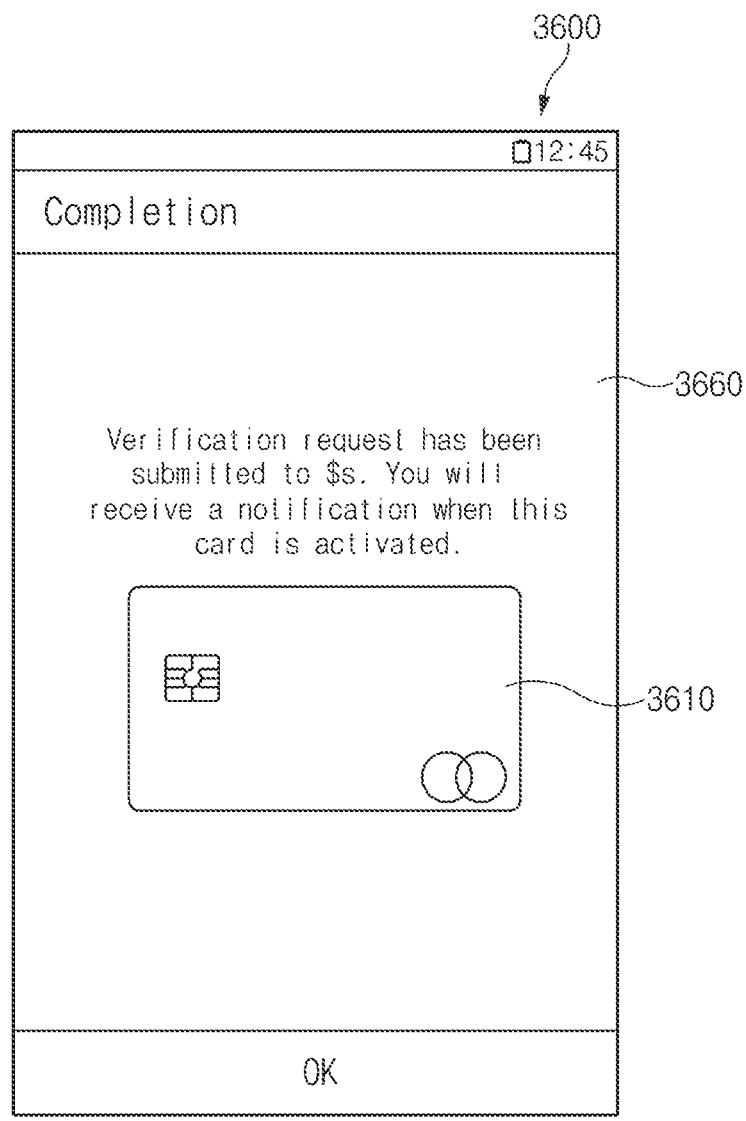
FIG. 36 is a view illustrating a card authentication completion screen according to various embodiments of the present disclosure.

FIG. 36 is a view illustrating a card authentication completion screen according to various embodiments of the present disclosure.

Referring to FIG. 36, when the payment means information registration of a payment application is completed, an electronic device 3600 may output a completion related screen on a display 3660. For example, when a token server transmits a push notification, a token state stored in the electronic device 3600 may change into an active state that is actually usable in a pending state, and may be synchronized with the token server.

In relation to payment means information registration completion, the electronic device 3600 may output a screen including a newly registered card image area 3610 and a payment means check related guide message. The card image area 3610, for example, may be an image generated based on an image captured during a process for inputting card data or a specific card image among a plurality of card images stored in the electronic device 3600. Alternatively, a card image displayed in the card image area 3610 may be a card image provided from a card server or a financial server, which issues a corresponding payment means. The displayed guide message may include contents for indicating an actual card usable state after the synchronization with a token server.

Figure 37:
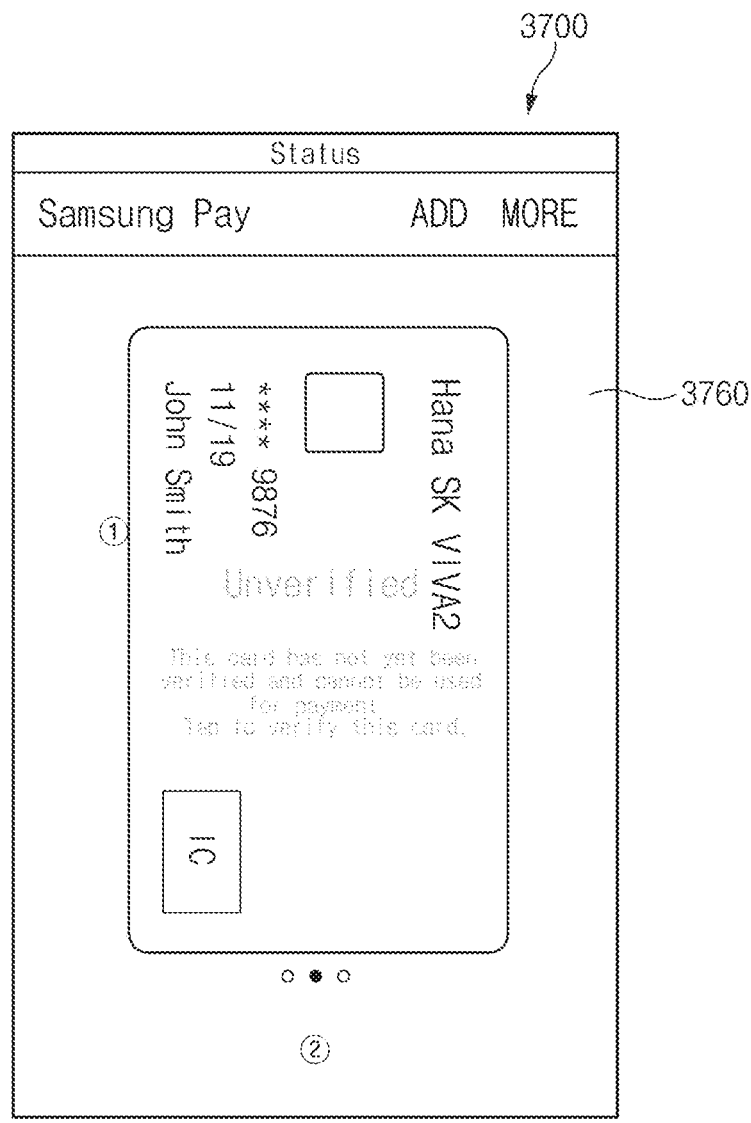
FIG. 37 is a view illustrating an unverified card related UI during payment means operation support according to various embodiments of the present disclosure.

FIG. 37 is a view illustrating an unverified card related UI during payment means operation support according to various embodiments of the present disclosure.

Referring to FIG. 37, an electronic device 3700 may vary a display form according to whether stored card data is registered. Additionally, the electronic device 3700 may change information displayed on an initial screen based on state information of a token relating to a card corresponding to a payment card image to be displayed on the initial screen. When state information of a token relating to a card displayed on the screen is "unverified", the electronic device 3700 may display a corresponding card image on an initial screen differently from other card images, or display a state information related text or image on a display 3760. The "unverified" state may include a state in which an authentication and configuration procedure for a corresponding card related token has not progressed. The electronic device 3700 may dimly display a card image corresponding to an unverified token. Alternatively, the electronic device 3700 may superimpose and display a translucent layer on a card image and display a text or image for describing a card state on the translucent layer. The card image of the specific state may include a screen for guiding a user to authenticate or check a corresponding card related token or a link for entering a screen for progressing an authentication and confirmation procedure of a card related token.

When a card corresponding to a payment unavailable token is displayed, for example, an "unverified" state, an electronic device may not display information relating to the payment mode entry, on a corresponding screen.

Figure 38:
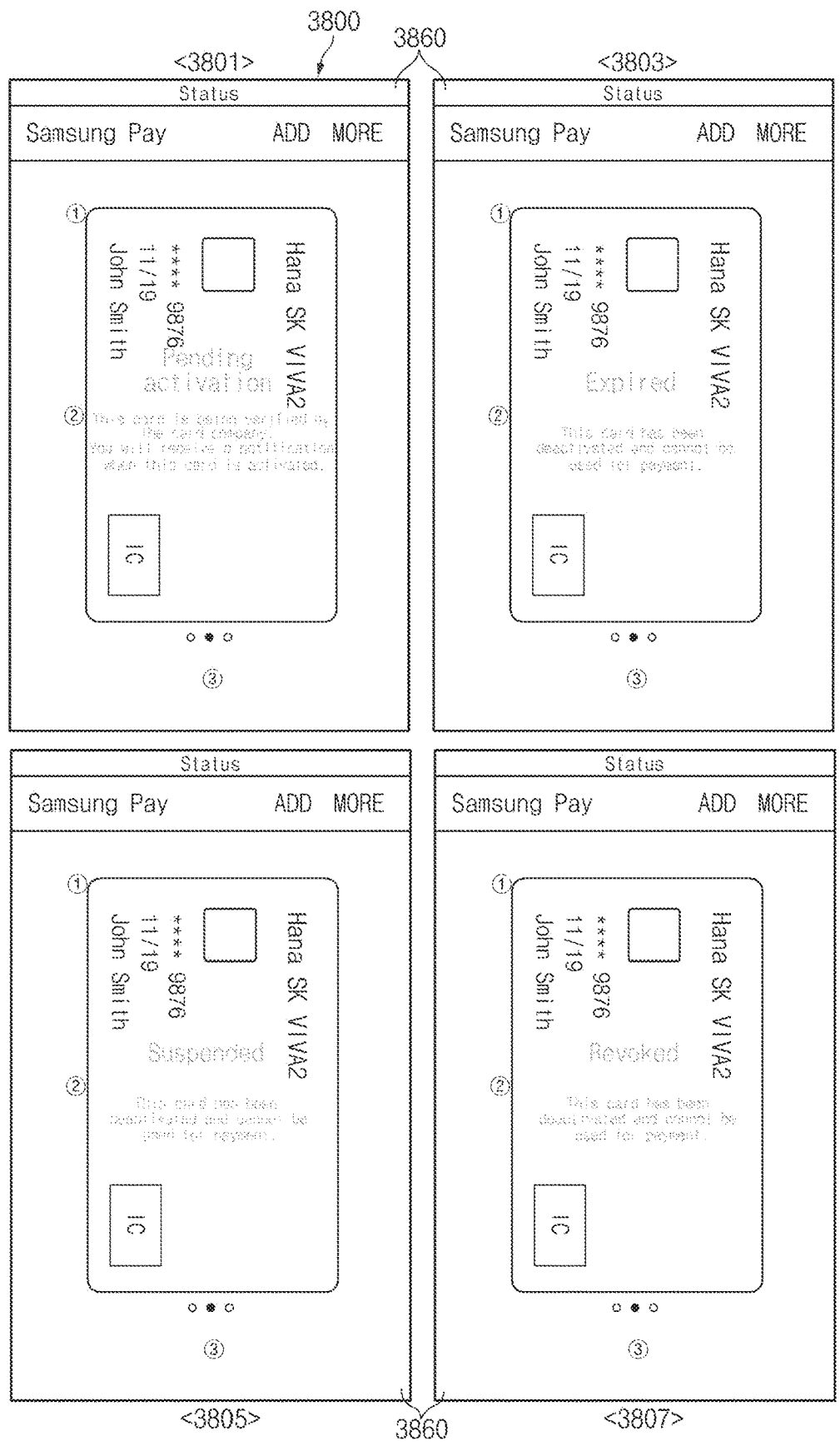
FIG. 38 is a display of multiple views illustrating a card related UI in various states during payment means operation support according to various embodiments of the present disclosure.

FIG. 38 is a display of multiple views illustrating a card related UI in various states during payment means operation support according to various embodiments of the present disclosure.

Referring to FIG. 38, an electronic device 3800 may output at least one UI corresponding to various states of a card. For example, the electronic device 3800 may output a screen corresponding to a "pending" state as shown in a state 3801, a screen corresponding to an "expired" state as shown in a state 3803, a screen corresponding to a "suspended" state as shown in a state 3805, and a screen corresponding to a "revoked" state as shown in a state 3807, on a display 3860.

The "pending" state may correspond to a case where a corresponding card related token is not authenticated yet from a card company. The "expired" state may correspond to a case where the expiration date of a corresponding card related token expires. The "suspended" state may correspond to a case where a corresponding card related token is suspended. The "revoked" state may correspond to a case where a corresponding card related token is canceled or discarded. The electronic device 3800 may obtain token state information relating to an initial screen relating to a payment application, change and display a corresponding token related card image according to a token state, or display a state information related text or image. For example, the electronic device 3800 may display the token related card image dimly, or superimpose and display a translucent layer where a specific text or image is entered on the card image. The changed card image may provide a guide corresponding to token usage to a user or include a link for entering a screen for card usage authentication and update. When a card having a payment unavailable token state is displayed on a screen, an electronic device may not display information relating to the payment mode entry on a corresponding screen and output a guide message that a payment mode cannot be entered.

According to various embodiments of the present disclosure, an electronic device relating to payment means registration may include a display and a processor, wherein the processor may transmit registration information relating to a user's payment means to an external electronic device, receive state information on the payment means, which is generated by the external electronic device using the registration information, from the external electronic device, and display an indication corresponding to the state information in relation to an object for representing the payment means, through the display.

According to various embodiments of the present disclosure, when the state information satisfies a first condition, the processor may display the indication in a first state, and when the state information satisfies a second condition, display the indication in a second state. The state information may include state information of a token relating to the payment means and the first condition may include a state in which the token is synchronized with a token server. The second condition may include a state in which the token is not synchronized with the token server, an impending state, an expired state, and a cancelled or discarded state. The first state or the second state may include a state of outputting different display effects or different images or texts.

According to various embodiments of the present disclosure, the processor may change the state information based on a user input and display an indication corresponding to the changed state information in relation to the object.

According to various embodiments of the present disclosure, the processor may obtain the user's authentication information based on the user input.

According to various embodiments of the present disclosure, the authentication information may include the user's biometric information or identification check information.

According to various embodiments of the present disclosure, the processor may receive information on the payment means including the state information, from the external electronic device.

According to various embodiments of the present disclosure, information on the payment means may include a token or token cryptogram corresponding to the payment means.

According to various embodiments of the present disclosure, the processor may output a text or image corresponding to the token's synchronous or asynchronous state with respect to the external electronic device or apply a display effect corresponding to the token's synchronous or asynchronous state to the object and display the object with the display effect.

According to various embodiments of the present disclosure, the processor may output a text or image corresponding to a token disable state by the external electronic device or apply a display effect in a form corresponding to the token disable state to the object and display the object with the display effect.

According to various embodiments of the present disclosure, the processor may output a text or image corresponding to an expiration state of the token by the external electronic device or apply a display effect in a form corresponding to the expiration state of the token to the object and display the object with the display effect.

According to various embodiments of the present disclosure, the processor may output a text or image corresponding to a cancel or discard state of the token by the external electronic device or apply a display effect in a form corresponding to the cancel or discard state of the token to the object and display the object with the display effect.

According to various embodiments of the present disclosure, the processor may activate a camera in relation to an image acquisition corresponding to the payment means when a subject corresponding to a specified pattern is found, automatically obtain an image, and output information extracted based on an image analysis as registration information relating to the payment means on the display.

According to various embodiments of the present disclosure, the processor may modify the registration information in correspondence to a user input.

According to various embodiments of the present disclosure, the processor may output a user interface for registering at least one of fingerprint information, PIN information, and signature information, which relate to the payment means.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted, and other operations may be added.

According to various embodiments of the present disclosure, a non-transitory computer readable recording medium for storing data relating to computing the above operations can be provided, and includes a memory or memories as described above. At least one instruction stored in the memory and executed by a processor as described above, may be set to perform transmission of registration information relating to the payment means of a user to an external electronic device, receive state information of a token for the payment means from the external electronic device, which is generated through the external electronic device by using the registration information, and display an indication corresponding to the state information of the token through a display in relation to an object for representing the payment means.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. An electronic device, comprising:
a display; and
a processor connected to the display,
wherein the processor is configured to:
transmit, to an external device, registration information of a payment device of a user,
receive, from the external device, state information of the payment device of the user, the state information being generated by the external device using the registration information, wherein the state information includes at least one of a token or a token cryptogram of the payment device of the user,
in response to the at least one of the token or the token cryptogram indicating a synchronous state with the external device, display a first indication of the synchronous state on an object representing the payment device of the user, and
in response to the at least one of the token or the token cryptogram indicating an asynchronous state with the external device, display at least one of a pending indication, a suspended indication, or a revoked indication of the asynchronous state in a region contained within the object, the object comprising a link based on information indicating the at least one of the pending indication, the suspended indication, or the revoked indication.

2. The electronic device of claim 1,
wherein, when the state information satisfies a first condition, the processor is further configured to display the first indication in a first state, and
wherein, when the state information satisfies a second condition, the processor is further configured to display the at least one of the pending indication, the suspended indication, or the revoked indication in a second state.

3. The electronic device of claim 1, wherein the processor is further configured to:
change the state information based on a user input, and
display one of the first indication or the at least one of the pending indication, the suspended indication, or the revoked indication corresponding to the changed state information in relation to the object.

4. The electronic device of claim 3, wherein the processor is further configured to obtain authentication information of the user based on the user input.

5. The electronic device of claim 4, wherein the authentication information comprises at least one of biometric information or identification check information.

6. The electronic device of claim 1, wherein the processor is further configured to receive information on the payment device of the user including the state information, from the external device.

7. The electronic device of claim 1, wherein the processor is further configured to:
apply a display effect corresponding to the synchronous state or the asynchronous state to the object, and
display the display effect together with the object.

8. The electronic device of claim 1, wherein the processor is further configured to:
display a text or an image corresponding to a disable state of the token by the external device, or
apply a display effect in a form corresponding to the disable state of the token to the object and display the object together with the display effect.

9. The electronic device of claim 1, wherein the processor is further configured to:
display a text or an image corresponding to an expiration state of the token by the external device, or apply a display effect in a form corresponding to the expiration state of the token to the object, and
display the object together with the display effect.

10. The electronic device of claim 1, wherein the processor is further configured to:
output a text or an image corresponding to a cancel state or a discard state of the token by the external device, or apply a display effect in a form corresponding to the cancel state or the discard state to the object, and
display the display effect together with the object.

11. The electronic device of claim 1, wherein the processor is further configured to:
control an image acquisition corresponding to the payment device, when a subject corresponding to a specified pattern is found, to automatically obtain an image, and
output information extracted from the obtained image based on an image analysis, as registration information of the payment device, on the display.

12. The electronic device of claim 11, wherein the processor is further configured to modify the registration information in correspondence to a user input.

13. The electronic device of claim 1, wherein the processor is further configured to output a user interface for registering at least one of fingerprint information, personal identification number (PIN) information, or signature information, related to the payment device.

14. The electronic device of claim 1,
wherein the external device comprises a server, and
wherein the state information comprises at least one of an impending state, a cancelled state, or a discarded state.

15. A method, comprising:
transmitting, to an external electronic device, registration information of a payment device of a user;
receiving, from the external electronic device, state information of a token corresponding to the payment device of the user, wherein the state information is generated by the external electronic device using the registration information;
in response to the state information corresponding to a synchronous state with the external electronic device, displaying a first indication of the synchronous state on an object representing the payment device of the user; and
in response to the state information corresponding to an asynchronous state with the external electronic device, displaying at least one of a pending indication, a suspended indication, or a revoked indication of the asynchronous state in a region contained within the object, the object comprising a link based on information indicating the at least one of the pending indication, the suspended indication, or the revoked indication.

16. The method of claim 15, wherein the displaying of the first indication or the at least one of the pending indication, the suspended indication, or the revoked indication comprises at least one of:
outputting a text or an image corresponding to the synchronous state or the asynchronous state with respect to the external electronic device;
displaying the displayed object with a display effect corresponding to the synchronous state or the asynchronous state of the token to the displayed object;
outputting a text or an image corresponding to a disable state of the token by the external electronic device;
displaying the displayed object together with a display effect corresponding to a disable state of the token to the displayed object;
outputting a text or an image corresponding to an expiration state of the token by the external electronic device;
displaying the displayed object together with a display effect corresponding to an expiration state of the token to the displayed object;
outputting a text or an image corresponding to a cancel state or a discard state of the token by the external electronic device; or
displaying the displayed object with a display effect corresponding to the cancel state or the discard state of the token to the displayed object.

17. The method of claim 15, further comprising:
activating an image acquisition corresponding to the payment device of the user;
obtaining an image when a subject corresponding to a specified pattern is found; and
outputting information extracted from the obtained image based on an image analysis as registration information relating to the payment device of the user, on a display.

18. The method of claim 17, further comprising modifying the registration information in correspondence to a user input.

19. A non-transitory computer readable recording medium for storing data relating to computing operations, the computer readable recording medium comprising a memory configured to store at least one instruction that, when executed by a processor, configures the processor to:
transmit, to an external electronic device, registration information associated with a payment device of a user;
receive, from the external electronic device, state information of a token corresponding to the payment device of the user, wherein the state information is generated through the external electronic device by using the registration information;
in response to the state information corresponding to a synchronous state with the external electronic device, displaying a first indication of the synchronous state on an object representing the payment device of the user; and
in response to the state information corresponding to an asynchronous state with the external electronic device, displaying at least one of a pending indication, a suspended indication, or a revoked indication of the asynchronous state in a region contained within the object, the object comprising a link based on information indicating the at least one of the pending indication, the suspended indication, or the revoked indication.

20. An electronic device, comprising:
a display; and
a processor, connected to the display,
wherein the processor is configured to:
transmit, to an external device, registration information relating to a payment device of a user,
receive, from the external device, state information on the payment device of the user, which is generated by the external device using the registration information, wherein the state information includes at least one of a token or a token cryptogram related to the payment device of the user, and
based on the state information received from the external device, display an object representing the payment device of the user together with information indicating at least one of a pending state, a suspended state, or a revoked state of the payment device of the user being displayed in a region contained within the object, the object comprising a link based on the information indicating the at least one of the pending state, the suspended state, or the revoked state,
wherein the pending state corresponds to a case where the token related to the payment device of the user is not authenticated from a server related to a card company,
wherein the suspended state corresponds to a case where the token related to the payment device of the user is suspended, and
wherein the revoked state corresponds to a case where the token related to the payment device of the user is canceled or discarded.

21. The electronic device of claim 20, wherein the object representing the payment device of the user comprises a shape similar to a physical shape of the payment device of the user.

* * * * *